US009210314B2

(12) United States Patent
Yasuda et al.

(10) Patent No.: US 9,210,314 B2
(45) Date of Patent: Dec. 8, 2015

(54) IMAGING APPARATUS CAPABLE OF ATTACHING AND DETACHING A LENS APPARATUS AND CONTROLLING AUTOMATIC FOCUS ADJUSTMENT, IMAGING APPARATUS CONTROLLING METHOD, LENS APPARATUS CONTROLLING METHOD, COMPUTER PROGRAM, AND IMAGING SYSTEM

(71) Applicant: CANON KABUSHIKI KAISHA, Tokyo (JP)

(72) Inventors: Hitoshi Yasuda, Tokyo (JP); Toshihiko Tomosada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/730,099

(22) Filed: Dec. 28, 2012

(65) Prior Publication Data
US 2013/0182127 A1   Jul. 18, 2013

(30) Foreign Application Priority Data

Jan. 13, 2012   (JP) ................. 2012-004559

(51) Int. Cl.
*H04N 5/232* (2006.01)
*G03B 13/36* (2006.01)
*G02B 7/36* (2006.01)

(52) U.S. Cl.
CPC .............. *H04N 5/23212* (2013.01); *G02B 7/36* (2013.01); *G03B 13/36* (2013.01)

(58) Field of Classification Search
CPC ....... H04N 5/23212; G02B 7/36; G03B 13/36
USPC ................. 348/207.99, 345–357; 396/79–83, 396/89–152; 250/201.4, 201.6, 201.7; 352/139, 140; 359/696, 698
See application file for complete search history.

(56) References Cited

U.S. PATENT DOCUMENTS 8,135,268 B2   3/2012   Hongu
8,792,011 B2   7/2014   Washisu et al.
(Continued)

FOREIGN PATENT DOCUMENTS

CN   101782675 A   7/2010
CN   102099737 A   6/2011
(Continued)

OTHER PUBLICATIONS

Mar. 10, 2015 Japanese Office Action, which is enclosed with an English Translation, that issued in Japanese Patent Application No. 2012-004559.
(Continued)

*Primary Examiner* — Dennis Hogue
(74) *Attorney, Agent, or Firm* — Cowan, Liebowitz & Latman, P.C.

(57) ABSTRACT

In a camera unit that is capable of attaching and detaching a lens unit, a camera control unit transmits a drive command for shifting a focus lens to a position corresponding to a focal point detected by use of an evaluation value for focus adjustment generated from an imaging signal by a TVAF signal processing unit to a lens control unit. The camera control unit acquires data indicating the amount of change in image magnification from the lens apparatus when performing center shift to thereby control the focus lens so as to suppress an out-of-focus blur of an image according to the image signal in response to the amount of change in image magnification relative to the shift amount of the focus lens in the vicinity of a focal point.

23 Claims, 28 Drawing Sheets

(56) References Cited

U.S. PATENT DOCUMENTS

| | | |
|---|---|---|
| 2002/0171750 A1 | 11/2002 | Kato |
| 2008/0165274 A1* | 7/2008 | Toguchi ................. 348/354 |
| 2010/0178045 A1* | 7/2010 | Hongu ..................... 396/80 |
| 2010/0231782 A1* | 9/2010 | Okamoto et al. ........... 348/345 |
| 2010/0232775 A1* | 9/2010 | Okamoto et al. ........... 396/81 |
| 2011/0305445 A1* | 12/2011 | Yasuda et al. ............. 396/78 |

FOREIGN PATENT DOCUMENTS

| | | |
|---|---|---|
| JP | 11-103408 A | 4/1999 |
| JP | 3943609 | 7/2007 |
| JP | 2010-271696 A | 12/2010 |
| JP | 2010-271697 | 12/2010 |
| JP | 2011-013519 A | 1/2011 |
| JP | 2011-150295 A | 8/2011 |

OTHER PUBLICATIONS

Aug. 6, 2015 Chinese Office Action, with an English Translation, that issued in Chinese Patent Application No. 201210589718.

Sep. 16, 2015 European Partial Search Report, issued in the corresponding European Patent Application No. 12199644.1.

Sep. 15, 2015 Japanese Office Action, issued in Japanese Patent Application No. 2012004531.

* cited by examiner (PRIOR ART)

(PRIOR ART)

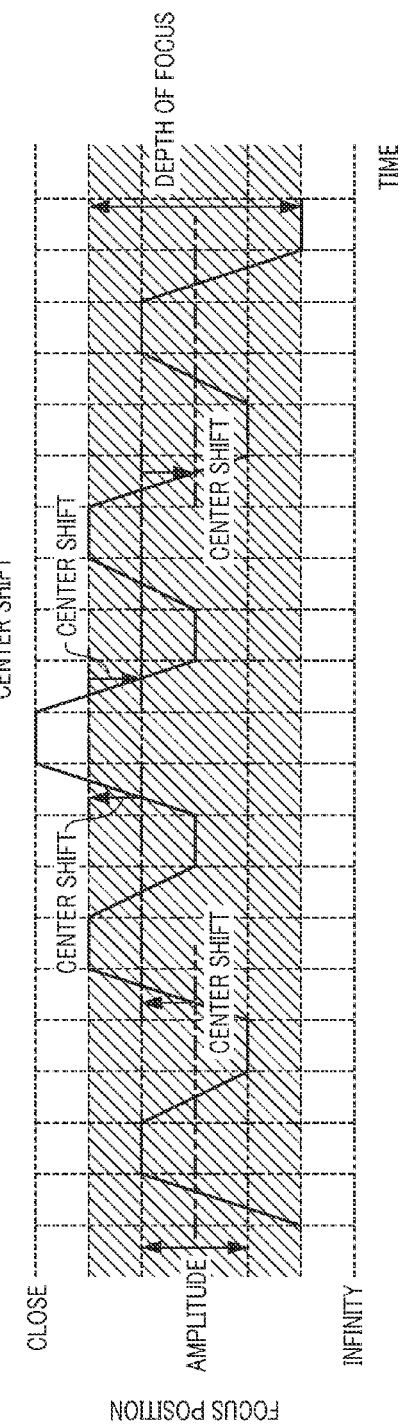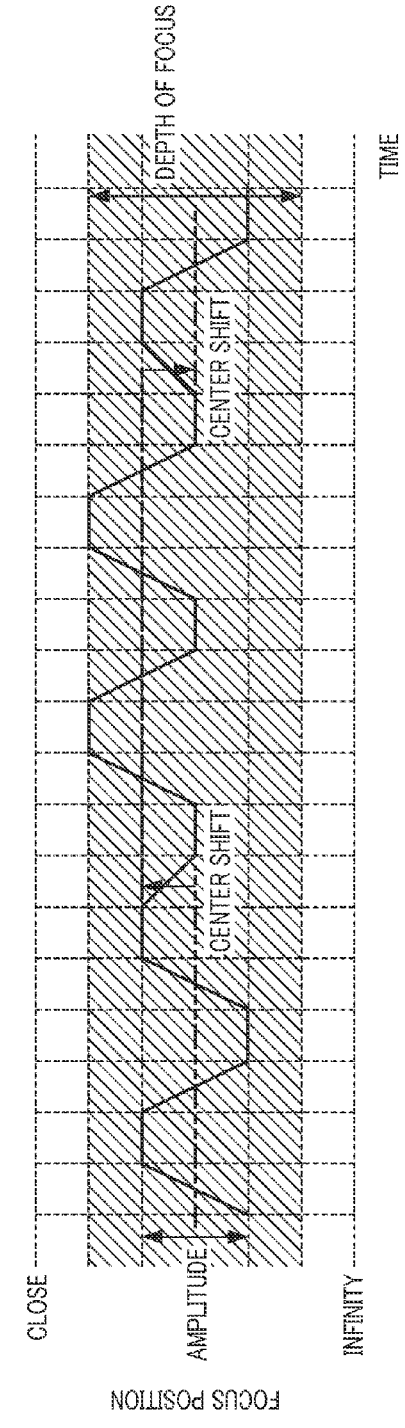
FIG. 28
FIG. 29 (PRIOR ART)

IMAGING APPARATUS CAPABLE OF ATTACHING AND DETACHING A LENS APPARATUS AND CONTROLLING AUTOMATIC FOCUS ADJUSTMENT, IMAGING APPARATUS CONTROLLING METHOD, LENS APPARATUS CONTROLLING METHOD, COMPUTER PROGRAM, AND IMAGING SYSTEM

BACKGROUND OF THE INVENTION

1. Field of the Invention

The present invention relates to an automatic focus adjustment technique suitable for use in an imaging apparatus such as a video camera having an interchangeable lens unit.

2. Description of the Related Art

In recent years, AF (auto focus) devices for video camera, that determine an AF evaluation value by detecting the sharpness of an image from an imaging signal and shift a focus lens to a position where the AF evaluation value becomes the highest to thereby perform focus adjustment, have been prevailing. Hereinafter, the above method is referred to as a "TVAF method". As a TVAF evaluation value, the high frequency component level of a visible-image signal extracted by a band-pass filter for a predetermined frequency band is typically used. When an object is captured by the imaging system, a TVAF evaluation value increases as the focus lens is being focused and reaches a maximum at a focal point as shown in FIG. 2A. In other words, FIG. 2A shows that the degree of focusing becomes lower with distance from the focal point. FIG. 2B shows an operation (hereinafter referred to as "reciprocating operation") for determining a focusing direction based on the change in the TVAF evaluation value obtained when the focus lens is vibrated at micro intervals. In the reciprocating operation, the influence of the movement of the lens on a capturing screen is not noticeable, and thus, the reciprocating operation is particularly used for a camera for capturing moving images. "Reciprocating operation" is also referred to as "wobbling operation".

On the other hand, in the case of interchangeable lens systems, the change in image magnification is great in some lens units for use upon performing a reciprocating operation, whereby the influence of the movement of a focus lens on a capturing screen may be noticeable. Japanese Patent Laid-Open No. 2010-271697 discloses an apparatus for use in an automatic focus adjustment type video camera having an interchangeable lens unit, where the apparatus passes information about the change in image magnification from the lens unit to a camera unit to thereby restrict the vibration amplitude during the reciprocating operation.

In the AF operation performed by the apparatus disclosed in Japanese Patent Laid-Open No. 2010-271697, the vibration amplitude is restricted in response to the change in image magnification, and thus, the difference between TVAF evaluation values obtained by the reciprocating operation decreases. Consequently, when the S/N (signal-to-noise) ratio for generating a TVAF evaluation value decreases, the direction detection accuracy is degraded.

Also, in auto focus (AF) control performed in lens-interchangeable type imaging apparatuses, an imaging apparatus (camera body) generates a focus signal indicating the contrast state of a visible image (i.e., the focus state of an imaging optical system) as disclosed in Japanese Patent No. 3943609. It is common to cause an interchangeable lens (lens unit) to shift a focus lens based on a focus signal acquired from a camera body to thereby perform AF control.

In AF control using the focus signal, an increase or decrease in focus signal is detected by the reciprocation driving (hereinafter referred to as "micro vibration") of a focus lens by a slight amount in the close direction and the infinity direction so as to determine a focusing direction which is the direction of movement of the focus lens in which the focus signal increases. Then, the center position (hereinafter referred to as "vibration center") of the micro vibration of a focus lens is shifted in the focusing direction. When the shift of the vibration center to the focusing direction is repeated for a predetermined number of times, it is determined that the direction is the true focusing direction and the focus position at which the focus signal is maximized is searched for by shifting the focus lens in the focusing direction at a constant speed. This operation will be referred to as "peak-climbing driving" during AF control. "Peak-climbing driving" is also referred to as "mountain-climbing driving". The micro vibration of the focus lens is performed again near the focused position to thereby determine whether or not the focus lens is in the focused state.

In such a case, since a camera body generates a focus signal tailored to characteristics of a lens unit mounted thereto and AF control is performed by the lens unit, the accuracy of focusing by AF control is determined by the combination of the camera body and the lens unit.

However, in recent years, the number of pixels of an imaging element such as a CMOS sensor or the like provided on a camera body side has been dramatically increasing. Since the depth of focus becomes shallow in an imaging element having a fine pixel pitch, the accuracy of focusing needs to be improved in accordance with the recent trend.

However, as an actuator for shifting a focus lens, a stepping motor or the like that has a restriction on drive resolution is often typically used. Thus, the position control resolution of a focus lens is also limited. In this case, when the micro vibration of the focus lens (also including the shift of the vibration center) is performed near the focused position over a shallow depth of focus of an imaging element having a fine pixel pitch, a focusing fluctuation in which an image captured by the imaging element is close to or away from the focused state occurs.

FIG. 27 illustrates the movement of a focus lens during peak-climbing driving, where the focus lens position (focused position) is plotted on the horizontal axis and the focus signal value is plotted on the vertical axis. The focus signal forms a bell shape such that the value increases as it approaches the focused position. During peak-climbing driving, a focus lens is shifted toward the focused position, at which a focus signal value is maximized (peak), at constant speed so as to search the focused position.

For the shift of the focus lens shown in A of FIG. 27, a focus signal decreases beyond its peak, and thus, it is determined that the focus lens has already passed over its focused position to thereby end peak-climbing driving. Then, the focus lens returns to a position at which the focus signal reaches its peak to thereby start micro vibration. On the other hand, for the shift of the focus lens shown in B of FIG. 27, a focus signal decreases without reaching its peak, and thus, it is determined that an improper direction has been set as the focusing direction and the shift direction of the focus lens is reversed so that peak-climbing driving is continued. In the micro vibration after detection of the focused position at which the focus signal value reaches its peak by means of peak-climbing driving, the focus determination of whether or not the focus lens position falls within the range of the depth of focus indicated by a hatched region shown in FIG. 27 is performed. When the focus lens is in focus, the focus lens is stopped and AF control ends.

FIG. 28 illustrates how the micro vibration of a focus lens is performed near its focused position for focus determination, where time is plotted on the horizontal axis and focus lens position (focused position) is plotted on the vertical axis. Thin horizontal dotted lines denote a position (position corresponding to the control resolution of an actuator) at which a focus lens can be stopped and a hatched region indicates a range of the depth of focus. The depth of focus has a width which is equally spaced from the vibration center (here, the focused position) indicated by chain-double dashed lines in the close direction and the infinity direction. The vibration amplitude amount and the shift amount of the vibration center upon micro vibration are set smaller than the range of the depth of focus.

FIG. 28 shows how the vibration center of a shift amount corresponding to one drive step of a stepping motor is repeatedly shifted while a focus lens is being shifted from the vibration center toward the close side and the infinity side by a vibration amplitude amount corresponding to one drive step of the stepping motor. If the vibration center falls within the range of the depth of focus successively for a predetermined number of times (e.g., three times), the focus determination is made and the shift of the focus lens is stopped.

Here, the shift amount of the focus lens when the vibration center shifts is set to an amount (summation shift amount) in which the vibration amplitude amount is added to the shift amount of the vibration center. Thus, as shown near the middle of FIG. 28, the position of the focus lens after being shifted including the shift of the vibration center undesirably exceeds the range of the depth of focus, whereby a focusing fluctuation of an image may be recognized by a user.

If the shift amount of the focus lens including the shift of the vibration center can be set to be small by setting the vibration amplitude and the center shift amount to be extremely small, the focus lens can be sufficiently subjected to micro vibration within the width of the shallow depth of focus, whereby a focusing fluctuation of an image is not recognized by a user.

However, the minimum value of each of the vibration amplitude amount and the shift amount of the vibration center is determined by the position control resolution of a focus lens corresponding to the drive resolution of a stepping motor, and thus, cannot be set too small. Even if the vibration amplitude and the shift amount of the vibration center can be set small, the shift of the focus lens in the focusing direction becomes slow in AF control, resulting in a reduction in responsiveness to AF control.

SUMMARY OF THE INVENTION

The imaging apparatus of the present invention realizes control of an automatic focus adjustment operation with less degradation in performance in lens-exchange type imaging apparatuses while the influence of the change in image magnification is not noticeable on a screen.

In addition, even when the imaging apparatus of the present invention is combined with various types of interchangeable lenses, the imaging apparatus of the present invention realizes control of a focusing fluctuation of an image due to micro vibration of a focus lens in a case of a shallow depth of focus while ensuring an excellent responsiveness to AF control.

According to an aspect of the present invention, an imaging apparatus is provided that is capable of attaching and detaching a lens apparatus provided with a focus lens. The imaging apparatus includes a signal processing unit configured to generate an evaluation value for focus adjustment from an imaging signal obtained by an imaging element; a transmitting unit configured to transmit information corresponding to the vibration center and the vibration amplitude of the focus lens, wherein the lens apparatus is configured to vibrate the focus lens based on the received information corresponding to the vibration center and the vibration amplitude; a camera controlling unit configured to transmit to the lens apparatus a drive command for shifting the focus lens to a position corresponding to a focal point detected by use of the evaluation value; and an acquiring unit configured to acquire from the lens apparatus data indicating the amount of a change in image magnification. The camera controlling unit is configured to, in a case of performing center shift for shifting the vibration center of the focus lens in the detected focusing direction, and if the amount of change in image magnification relative to the shift amount of the focus is a first amount of change, decrease the vibration amplitude when compared to a second amount of change, wherein the first amount of change is greater than the second amount of change.

Further features of the present invention will become apparent from the following description of exemplary embodiments with reference to the attached drawings.

BRIEF DESCRIPTION OF THE DRAWINGS

FIG. 28 is a diagram illustrating a relationship between the depth of focus and the position of a focus lens subject to micro vibration.

FIG. 29 is a diagram illustrating a relationship between the depth of focus and the position of a focus lens subject to subtraction scheme micro vibration.

DESCRIPTION OF THE EMBODIMENTS

Hereinafter, embodiments of the present invention will be described with reference to the drawings.

First Embodiment

Figure 1:
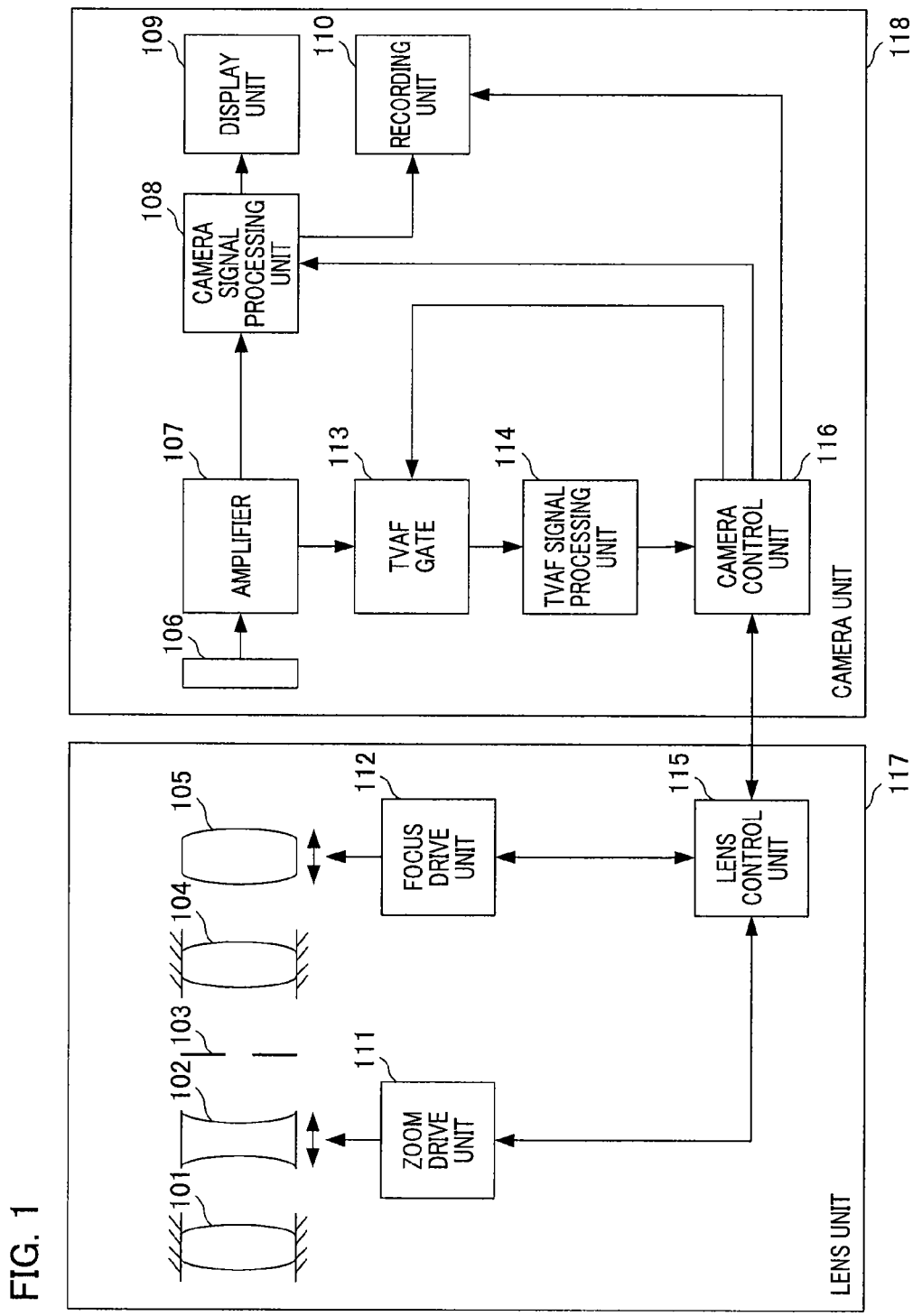
FIG. 1 is a block diagram illustrating an example of the configuration of an imaging system including a lens unit and an imaging apparatus in order to describe a first embodiment of the present invention in conjunction with FIGS. 2 to 10.

FIG. 1 is a block diagram illustrating an example of the configuration of an imaging system including a lens unit and a video camera as an imaging apparatus according to a first embodiment of the present invention. The imaging apparatus includes an attachable/detachable lens unit 117 and a camera unit 118 served as a body which is used by being mounted with the lens unit 117. In other words, the lens unit 117 is attachable to or detachable from the camera unit 118 and a so-called interchangeable lens system is constituted.

Light reflected from an object passes through an image capturing optical system consisting of a fixed first lens group 101, a movable second lens group 102, an aperture 103, a fixed third lens group 104, and a movable fourth lens group 105, all of which are provided in the lens unit 117, to thereby be focused on an imaging element 106 provided within the camera unit 118. The second lens group 102 performs a zooming operation. The fourth lens group (hereinafter referred to as "focus lens") 105 includes both a focus adjustment function and a compensation function for compensating the shift of a focal plane due to the zooming operation.

The imaging element 106 is a photoelectric conversion element constituted by a CMOS (Complementary Metal Oxide Semiconductor) image sensor or the like. The imaging signal photoelectrically converted by the imaging element 106 is amplified to an optimum level by an amplifier 107, and then is output to a camera signal processing unit 108. The camera signal processing unit 108 applies various image processing to an output signal obtained from the amplifier 107 to thereby generate a visible-image signal. A display unit 109 is constituted by a liquid crystal display device (LCD) or the like and displays an image in accordance with a visible-image signal obtained from the camera signal processing unit 108. A recording unit 110 records a visible-image signal obtained from the camera signal processing unit 108 in a recording medium such as a semiconductor memory or the like.

Figure 2A:
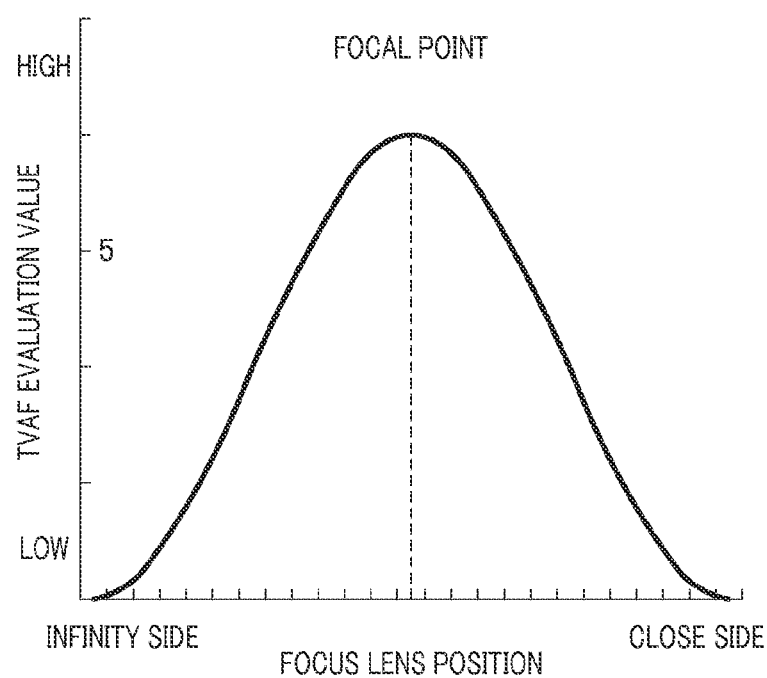
FIG. 2A is a diagram illustrating an exemplary TVAF evaluation value.
Figure 2B:
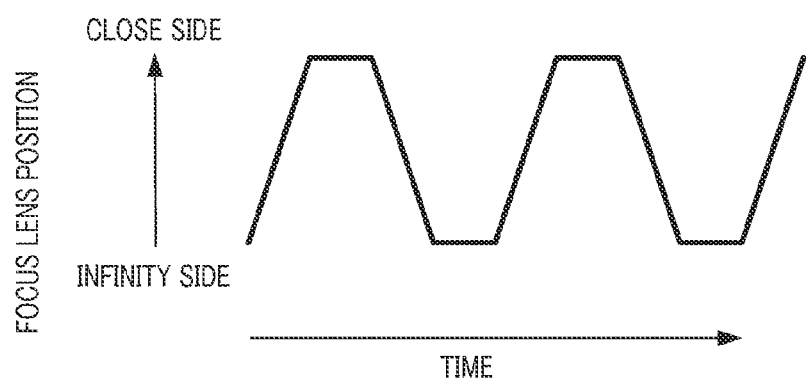
FIG. 2B is a diagram illustrating an exemplary reciprocating operation.

A TVAF gate 113 serves to pass signals only within a region for use in focus detection from among the output signals of all pixels obtained from the amplifier 107. A TVAF signal processing unit 114 is an evaluation value generation unit that extracts a high frequency component from the signals passed through the TVAF gate 113 and generates a TVAF evaluation value signal as a signal required for automatic focus adjustment control to thereby output the generated TVAF evaluation value signal to a camera control unit 116. The TVAF evaluation value signal represents the sharpness (contrast state) of a visible image generated on the basis of the output signal for the imaging element 106. Since sharpness may vary depending on the focus state of an imaging optical system, the value (TVAF evaluation value) indicated by the TVAF evaluation value signal represents focus adjustment information indicating the focus state of the image capturing optical system. FIG. 2A is a graph illustrating an example of the relationship between the position of the focus lens 105 and a TVAF evaluation value where the position of the focus lens 105 is plotted on the horizontal axis and TVAF evaluation value is plotted on the vertical axis. The position (hereinafter referred to as "peak position") of the focus lens 105 when the TVAF evaluation value reaches its peak value corresponds to the focal point.

The camera control unit 116 serving as a control unit controls the operation of the entire imaging apparatus. The camera control unit 116 controls the TVAF gate 113 so as to set a TVAF frame at a predetermined percentage of an image capturing screen and performs TVAF control based on the TVAF evaluation value signal acquired from the TVAF signal processing unit 114. A drive command for the focus lens 105 from the camera control unit 116 is transmitted to a lens control unit 115.

FIG. 1 shows a drive unit and its control unit within the lens unit 117. A zoom drive unit 111 drives the second lens group 102, and a focus drive unit 112 drives the focus lens 105. Each of the zoom drive unit 111 and the focus drive unit 112 is constituted by an actuator such as a stepping motor, a DC motor, a vibrating motor, a voice coil motor, or the like. The lens control unit 115 receives a drive command for the focus lens 105 from the camera control unit 116, controls the focus drive unit 112 in accordance with the command, and shifts the focus lens 105 in the optical axis direction to thereby perform focus adjustment. Also, the lens control unit 115 transmits position information about the focus lens 105 acquired from the focus drive unit 112 to the camera control unit 116.

Next, a description will be given of TVAF control performed by the camera control unit 116 with reference to FIG. 3 to FIG. 10. The TVAF control is preferably executed in accordance with a computer program stored in a memory provided in the camera control unit 116.

Figure 3:
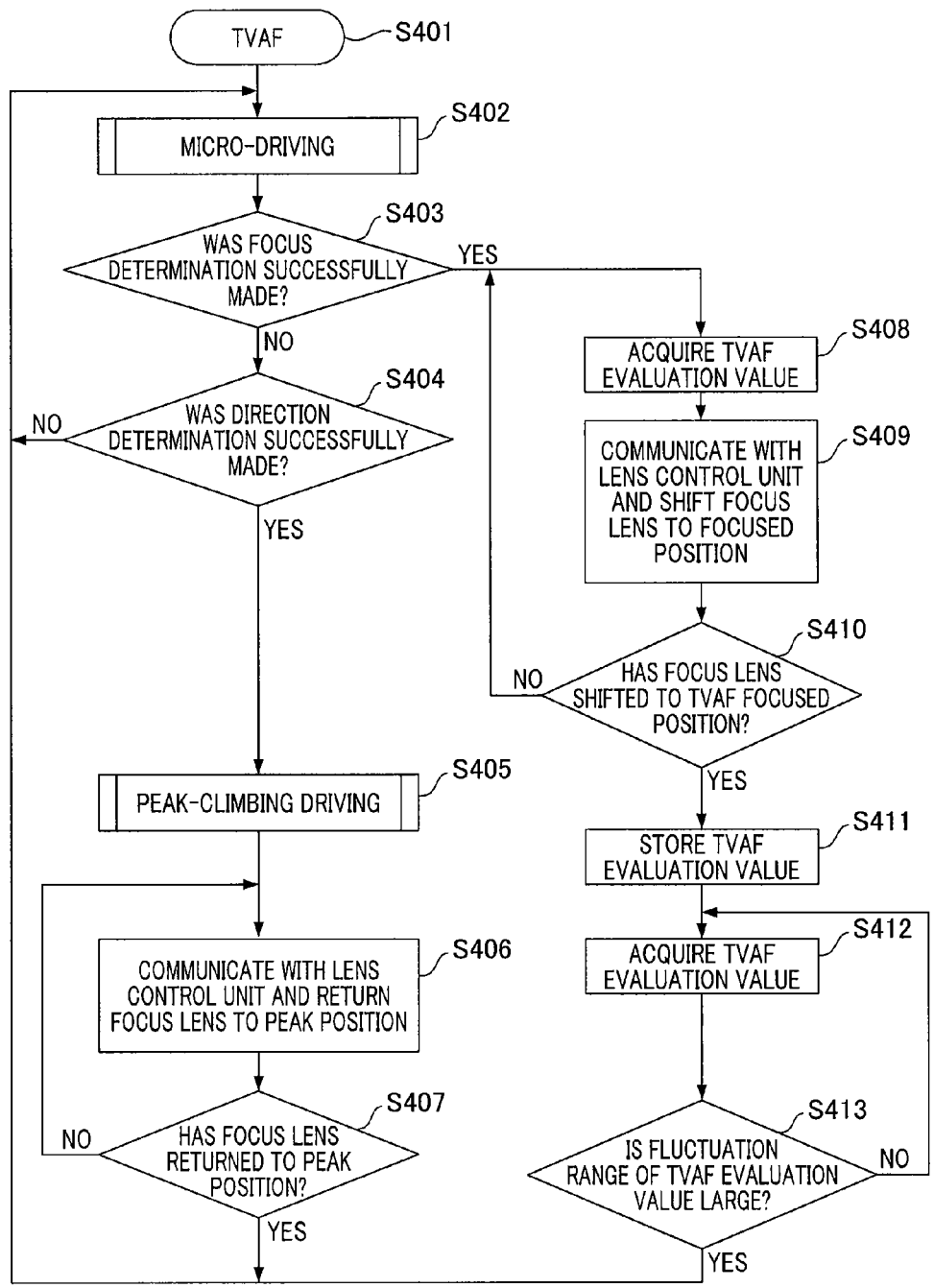
FIG. 3 is a flowchart illustrating an example of processing associated with TVAF control.

As shown in FIG. 3, in step S401, the process starts. In step S402, micro-driving operation for driving the focus lens 105 at micro intervals is performed. The micro-driving operation corresponds to a first mode in which the camera control unit 116 performs center shift for shifting the vibration center of the focus lens in a focusing direction detected by the change in TVAF evaluation value. In the operation, focus determination of whether or not the focus lens 105 is in a focused state or direction determination to determine which direction a focal point exists if the focus lens 105 is in a non-focused state can be made. The detailed description will be given below of the operation with reference to FIG. 4. In step S403, determination processing whether or not focus determination was successfully made is performed. If focus determination was successfully made, the process advances to step S408. If focus determination was not successfully made, the process advances to step S404. In step S404, determination processing whether or not direction determination was successfully made is performed. If direction determination was successfully made, the process advances to step S405 and peak-climbing driving is performed. If direction determination was not successfully made, the process returns to step S402.

In step S405, the peak-climbing driving for the focus lens 105 is executed at a predetermined speed along the determined direction. The peak-climbing driving corresponds to a second mode in which the camera control unit 116 searches a peak value of an evaluation value by shifting the focus lens and shifts the focus lens to a position corresponding to a focal point. The processing for searching the peak position of the focus lens 105 by associating the TVAF evaluation value with the focus lens position acquired from the lens control unit 115 is performed. The detailed description will be given below with reference to FIG. 8. In the next step S406, the camera control unit 116 communicates with the lens control unit 115 in order to return the focus lens 105 to the focus lens position (peak position) where the TVAF evaluation value during the peak-climbing driving operation indicates its peak value. In step S407, the camera control unit 116 communicates with the lens control unit 115 to acquire position information about the focus lens 105 so as to determine whether or not the focus lens 105 has returned to the peak position. If it is determined that the focus lens 105 has returned to the peak position, the process returns to step S402 and the micro-driving operation is performed again. If it is determined that the focus lens 105 has not returned to the peak position, the process returns to step S406 and the operation for returning the focus lens 105 to the peak position continues.

Next, a description will be given of focus stop and reactivation determination processing starting from step S408. In step S408, the camera control unit 116 acquires a TVAF evaluation value. In step S409, the camera control unit 116 communicates with the lens control unit 115 in order to shift the focus lens 105 to the focus lens position determined as the focused position. In step S410, the camera control unit 116 acquires position information about the focus lens 105 from the lens control unit 115 to thereby determine whether or not the focus lens 105 has shifted to a peak position corresponding to the focal point of TVAF control. If the focus lens 105 has shifted to a peak position corresponding to the focal point, the process advances to step S411, whereas if the focus lens 105 has not shifted to a peak position corresponding to the focal point, the process returns to step S408.

In step S411, the camera control unit 116 stops the focus lens 105 at a peak position corresponding to the focal point and stores a TVAF evaluation value at the focal point. In step S412, the camera control unit 116 acquires a new TVAF evaluation value from the TVAF signal processing unit 114. In step S413, processing for determining whether or not the fluctuation range of the TVAF evaluation value is greater than a threshold value is performed by comparing the TVAF evaluation value stored in step S411 with the latest TVAF evaluation value acquired in step S412. If the fluctuation range of the TVAF evaluation value is greater than a threshold value, the camera control unit 116 determines that an object has been changed, and the process returns to step S402 and then the camera control unit 116 resumes the micro-driving operation. If the fluctuation range of the TVAF evaluation value is equal to or less than a threshold value, the process returns to step S412.

Next, a description will be given of the micro-driving operation with reference to FIG. 4. In step S501, the process starts. In step S502, the camera control unit 116 calculates a vibration amplitude and a center shift amplitude during micro-driving in response to the depth of focus determined by an aperture, a zoom position, and the like. The vibration amplitude is a reciprocation width when drive control is performed by vibrating the focus lens 105 during the reciprocating operation. The center shift amplitude is a shift distance of the vibration center upon changing the vibration center of the focus lens 105. When the change in image magnification is large, the following control switching processing is performed such that the influence of micro-driving is not visibly recognizable on a screen.

In step S503, the camera control unit 116 transmits data regarding the allowable diameter of the circle of confusion, which is determined by a pixel pitch or the like of the imaging element 106, to the lens control unit 115, and receives data regarding the change in image magnification per depth of focus from the lens control unit 115. In step S512, the camera control unit 116 increases a threshold value "th" for a predetermined amount of change in image magnification when the TVAF evaluation value is small. The reason for this is because the change in image magnification does not involve a problem when a large blur occurs in an object image (when focusing degree is low). In step S504, the camera control unit 116 determines a micro-driving scheme in response to the vibration amplitude, and the center shift amplitude determined in step S502 and data regarding the change in image magnification per depth of focus acquired in step S503.

Here, FIGS. 7A and 7B show how the reciprocating operation is performed in the vicinity of the focal point. While details will be described below, in the reciprocating operation, a focus lens is vibrated back and forth along the optical axis at all times and the center of vibration is shifted in the focusing direction to thereby repeatedly perform the operation for making the focus lens surpass and return to a focal point. The amount of change in image magnification caused by the difference between a lens position when the focus lens is at the close end position and that when the focus lens is at the infinity end position during the vibration of the focus lens in the vicinity of the focal point can be determined based on the ratio of the difference between the focus lens positions to the depth of focus. The region between a close-side dotted line and an infinity-side dotted line shown in FIGS. 7A and 7B corresponds to the difference between a lens position when the focus lens is at the close end position and that when the focus lens is at the infinity end position.

Figure 4:
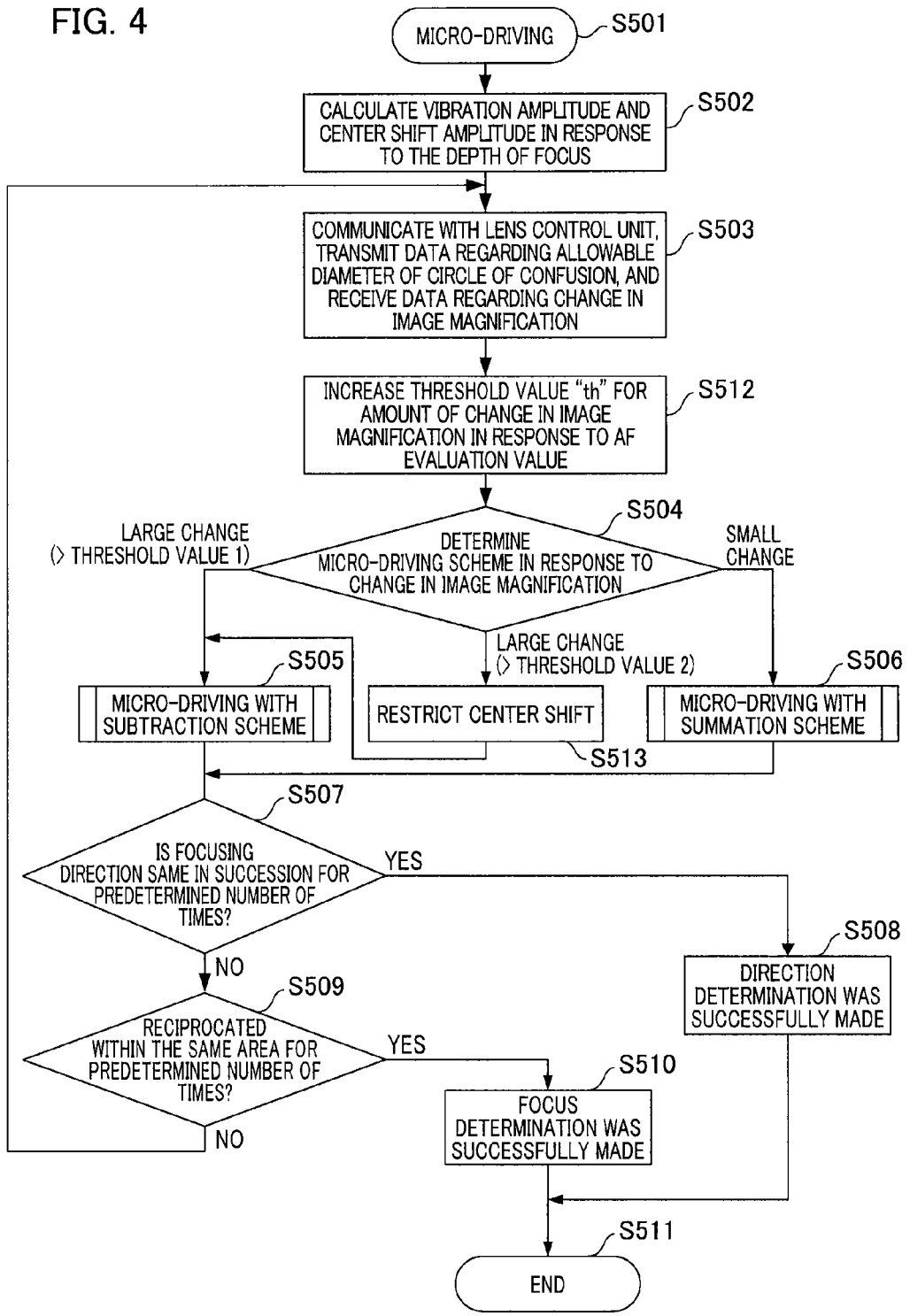
FIG. 4 is a flowchart illustrating an example of processing for switching a micro-driving scheme.

In step S504 shown in FIG. 4, triple branching processing is executed in response to the results of a determination. A first threshold value for use in the following determination processing is a threshold value 1 and a second threshold value for use in the same is a threshold value 2, where the threshold value 1 is less than the threshold value 2. When the amount of change in image magnification relative to the difference between a focus lens position at the close end and a focus lens position at the infinity end during the vibration of the focus lens in the vicinity of the focal point is greater than the threshold value 1 and the influence of micro-driving appears on a captured image (see "(>threshold value 1)" in FIG. 4), the process advances to step S505. In step S505, the camera control unit 116 performs micro-driving in a first drive scheme (hereinafter referred to as "subtraction scheme"). The details of micro-driving with the subtraction scheme will be described below. Furthermore, in step S504, the amount of change in image magnification relative to the difference between a focus lens position at the close end and a focus lens position at the infinity end during the vibration of the focus lens in the vicinity of the focal point is compared with the threshold value 2. If the amount of change in image magnification is greater than the threshold value 2 and the influence of micro-driving appears on a captured image (see "(>threshold value 2)" in FIG. 4), the process advances to step S513. The camera control unit 116 restricts the center shift amplitude in step S513, and the process advances to step S505 and the camera control unit 116 performs micro-driving with the subtraction scheme. On the other hand, when the amount of change in image magnification relative to the difference between a focus lens position at the close end and a focus lens position at the infinity end during the vibration of the focus lens in the vicinity of the focal point is equal to or less than the threshold value 1 and the appearance of a captured image under the influence of micro-driving does not involve a problem, the process advances to step S506. The camera control unit 116 performs micro-driving in a second drive scheme (hereinafter referred to as "summation scheme"). The details of micro-driving with the summation scheme will be described below. In other words, when the amount of change in image magnification is a first amount of change (the threshold value 1 or 2) that is greater than a second amount value, the vibration amplitude is decreased, whereas when the amount of change in image magnification relative to the shift amount of the focus lens is equal to or less than the second amount of change the vibration amplitude is increased.

As described above, in the present embodiment, the camera control unit 116 uses micro-driving with the subtraction scheme if the change in image magnification relative to the difference between a focus lens position at the close end and a focus lens position at the infinity end during the vibration of the focus lens in the vicinity of the focal point is large. On the other hand, the camera control unit 116 switches processing to use micro-driving with the summation scheme if the difference between a focus lens position at the close end and a focus lens position at the infinity end during the vibration of the focus lens in the vicinity of the focal point is small. In this manner, when the change in image magnification is large, the adverse effects on the appearance of a captured image due to the difference between a focus lens position at the close end and a focus lens position at the infinity end during the vibration of the focus lens in the vicinity of the focal point can be suppressed.

After the processes in steps S505 and S506, the process advances to step S507, and the camera control unit 116 determines whether or not directions determined as the focusing direction are the same in succession for a predetermined number of times. If the camera control unit 116 determines that directions determined as the focusing direction are the same in succession for a predetermined number of times, the process advances to step S508, whereas if otherwise, the process advances to step S509. In step S509, the camera control unit 116 determines whether or not the focus lens 105 has been reciprocated repeatedly within the same area for a predetermined number of times. If the focus lens 105 has been reciprocated repeatedly within the same area for a predetermined number of times, the process advances to step S510, otherwise, the process returns to step S502.

In step S508, the camera control unit 116 determines that direction determination was successful, and the process advances to step S511. The series of processes are ended and the process shifts to peak-climbing driving. In step S510, the camera control unit 116 determines that focus determination was successful, and the process advances to step S511. The series of processes are ended and the process shifts to reactivation determination.

In the present embodiment, when the change in image magnification relative to the difference between a focus lens position at the close end and a focus lens position at the infinity end during the vibration of the focus lens in the vicinity of the focal point is large, the micro-driving operation for realizing the center shift by a subtraction of amplitude is performed by means of the subtraction scheme to be described below. When the change in image magnification relative to the difference is small, the micro-driving operation for realizing the center shift by an addition of amplitude is performed by means of the summation scheme to be described below. By switching the drive scheme, the adverse effects on the change in focus state on a screen during micro-driving can be reduced when the change in image magnification is large. When the change in image magnification relative to the difference between a focus lens position at the close end and a focus lens position at the infinity end during the vibration of the focus lens in the vicinity of the focal point is small, AF performance can be realized without interfering with responsiveness.

Figure 5:
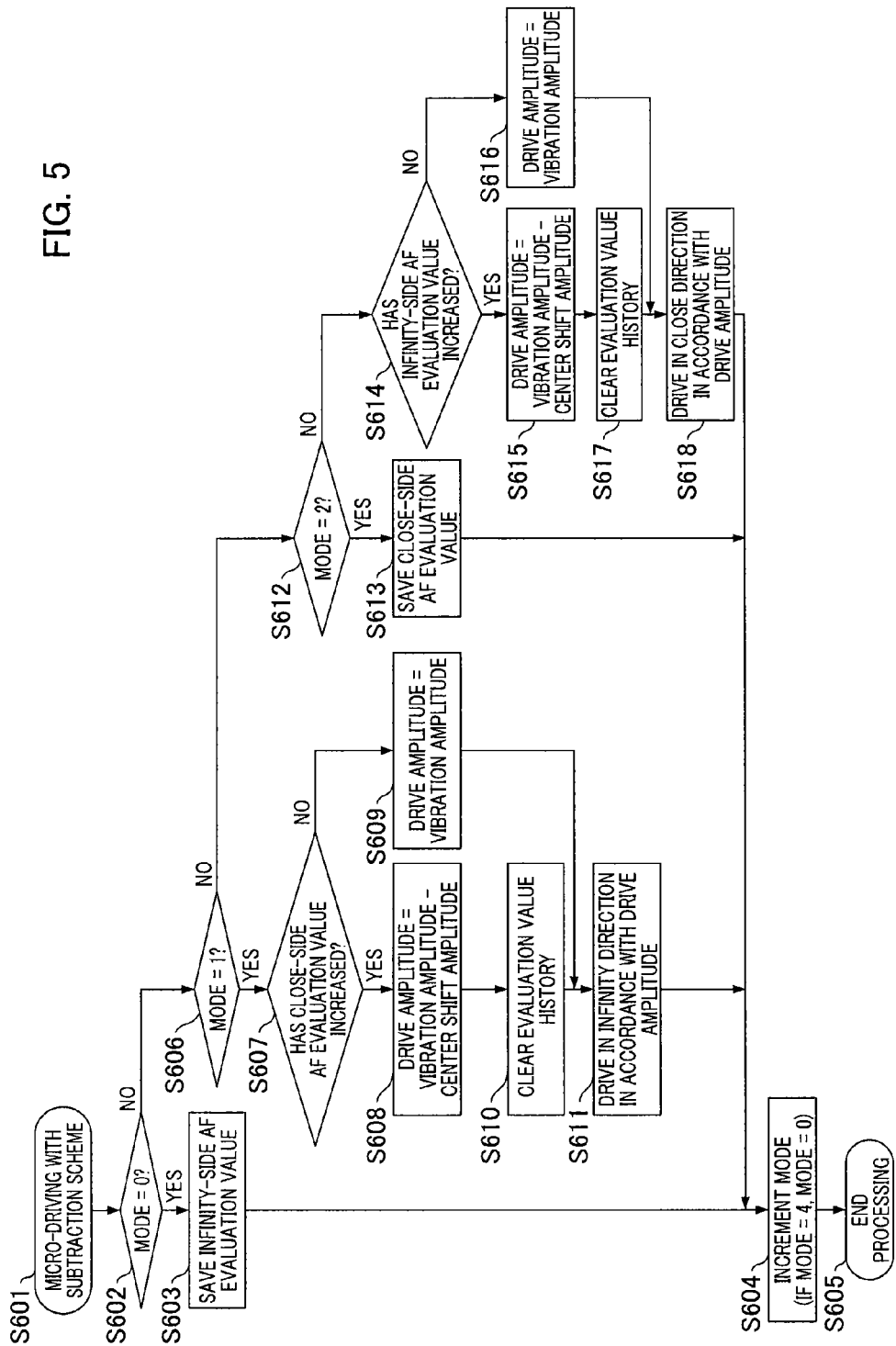
FIG. 5 is a flowchart illustrating an example of processing associated with micro-driving with the subtraction scheme.

Next, a description will be given of the micro-driving operation with the subtraction scheme with reference to FIG. 5. In step S601, the process starts. In step S602, the camera control unit 116 determines whether or not the value of the current variable Mode is zero. The Mode is an internal variable representing a difference in control state from zero to three. If the value is zero, the process advances to step S603, whereas if the value is other than zero, the process advances to step S606.

In step S603, the camera control unit 116 saves the TVAF evaluation value as the infinity side TVAF evaluation value. The TVAF evaluation value to be described below is an evaluation value based on electric charge accumulated in the imaging element 106 while the focus lens 105 remains stayed at the infinity side when the Mode value is equal to one. In step S604, the Mode value increments by one, and the process advances to step S605 and the process ends. If the Mode value becomes four, the value returns to zero.

In step S606, the camera control unit 116 determines whether or not the current Mode value is one. If the current Mode value is one, the process advances to step S607 and the camera control unit 116 executes processing for driving the focus lens 105 to the infinity-side. If the current Mode value is other than one, the process advances to step S612. In step S607, the infinity-side TVAF evaluation value obtained when the Mode value is zero is compared with the close-side TVAF evaluation value obtained when the Mode value is two. If the close-side TVAF evaluation value is greater than the infinity-side TVAF evaluation value, the process advances to step S608. If the close-side TVAF evaluation value is equal to or less than the infinity-side TVAF evaluation value, the process advances to step S609.

In step S608, the camera control unit 116 makes a setting of "drive amplitude=vibration amplitude−center shift amplitude" so as to limit a drive amplitude upon center shift to be less than an amplitude upon vibration. In other words, the center shift to the close direction is performed by reducing the drive amount of the focus lens 105 in the infinity direction. In this manner, the drive amplitude during micro-driving can be limited, and thus, focus adjustment control can be made such that the change in focus state due to micro-driving does not appear on a screen. Next, the process advances to step S610, and the camera control unit 116 deletes history information about the TVAF evaluation value and determines the next center shift using the TVAF evaluation value acquired after center shift by micro-driving. Then, the process advances to step S611.

In step S609, the camera control unit 116 makes a setting of "drive amplitude=vibration amplitude" and the process advances to step S611. In step S611, the camera control unit 116 transmits a drive command to the lens control unit 115 in order to drive the focus lens 105 in the infinity direction in accordance with the drive amplitude determined in step S608 or step S609. Then, the process advances to step S604.

If the camera control unit 116 determines in step S606 that the current Mode value is other than one, the process advances to step S612, and the camera control unit 116 determines whether or not the current Mode value is two. If the current Mode value is two, the process advances to step S613, whereas if the current Mode value is other than two, the process advances to step S614. In step S613, the camera control unit 116 saves the acquired TVAF evaluation value as the close-side TVAF evaluation value. The TVAF evaluation value is calculated based on a visible-image signal generated from electric charge accumulated in the imaging element 106 while the focus lens 105 remains stayed at the close-side when the Mode value is three. In the next step S604, the Mode value increments by one. If the Mode value becomes four, the value returns to zero. The process advances to step S605 and the process ends.

In step S614 and subsequent steps, processing for driving the focus lens 105 in the close direction is executed. In step S614, the infinity-side TVAF evaluation value (see step S603) obtained when the Mode value is zero is compared with the close-side TVAF evaluation value (see step S613) obtained when the Mode value is two. If the infinity-side TVAF evaluation value is greater than the close-side TVAF evaluation value, the process advances to step S615, whereas if the infinity-side TVAF evaluation value is equal to or less than the close-side TVAF evaluation value, the process advances to step S616.

In step S615, the camera control unit 116 makes a setting of "drive amplitude=vibration amplitude−center shift amplitude". In other words, the center shift to the infinity direction is performed by reducing the drive amount of the focus lens 105 to the close direction. In this manner, the drive amplitude during micro-driving can be limited, and thus, focus adjustment control can be made such that the change in focus state due to micro-driving in a shallow depth of focus does not appear on a screen. In the next step S617, the camera control unit 116 deletes history information about the TVAF evaluation value and determines the next center shift in accordance with the TVAF evaluation value acquired after center shift induced by the micro-driving operation. If the infinity-side AF evaluation value has not increased then, in step S616, the camera control unit 116 makes a setting of "drive amplitude=vibration amplitude". After steps S616 and S617, the process advances to step S618, and the camera control unit 116 transmits a drive command to the lens control unit 115 in order to drive the focus lens 105 in the close direction in accordance with the drive amplitude determined in step S615 or step S616. Then, the process advances to step S604.

FIG. 7A shows an example of the time profile of the focus lens operation, where time is plotted on the horizontal axis and focus lens position is plotted on the vertical axis, and a single cycle of a vertical synchronization signal for the imaging element 106 is used as a unit time. Here, each of $EV_A$, $EV_B$, and $EV_C$ indicates a TVAF evaluation value.

A TVAF evaluation value $EV_A$ for electric charges (see a shaded ellipse) accumulated in the imaging element 106 during the first period is captured by the camera control unit 116 at a time TA. Next, a TVAF evaluation value $EV_B$ for electric charges accumulated in the imaging element 106 during the second period is captured by the camera control unit 116 at a time $T_B$. Furthermore, a TVAF evaluation value $EV_C$ for electric charges accumulated in the imaging element 106 during the third period is captured by the camera control unit 116 at a time $T_C$. After the time $T_C$, processing for comparing the TVAF evaluation values $EV_A$, $EV_B$, and $EV_C$ is performed. If the camera control unit 116 determines that "$EV_B > EV_A$" and "$EV_B > EV_C$", the camera control unit 116 performs drive control for shifting a vibration center, whereas if the condition is not satisfied, a vibration center is not shifted. After the vibration center is shifted, the camera control unit 116 vibrates the focus lens 105 back and force at a new center position and acquires a new TVAF evaluation value to thereby determine whether or not a center shift is required. The feature of this scheme is that the maximum drive amplitude remains a vibration amplitude and a new TVAF evaluation value is captured by vibrating the focus lens 105 back and force at the position to realize the center shift so that the excess passage of a lens drive position is reduced. In this example, the difference between a focus lens position at the close end and a focus lens position at the infinity end during the vibration of the focus lens in the vicinity of the focal point is a product of 3 and Fδ/4.

Figure 6:
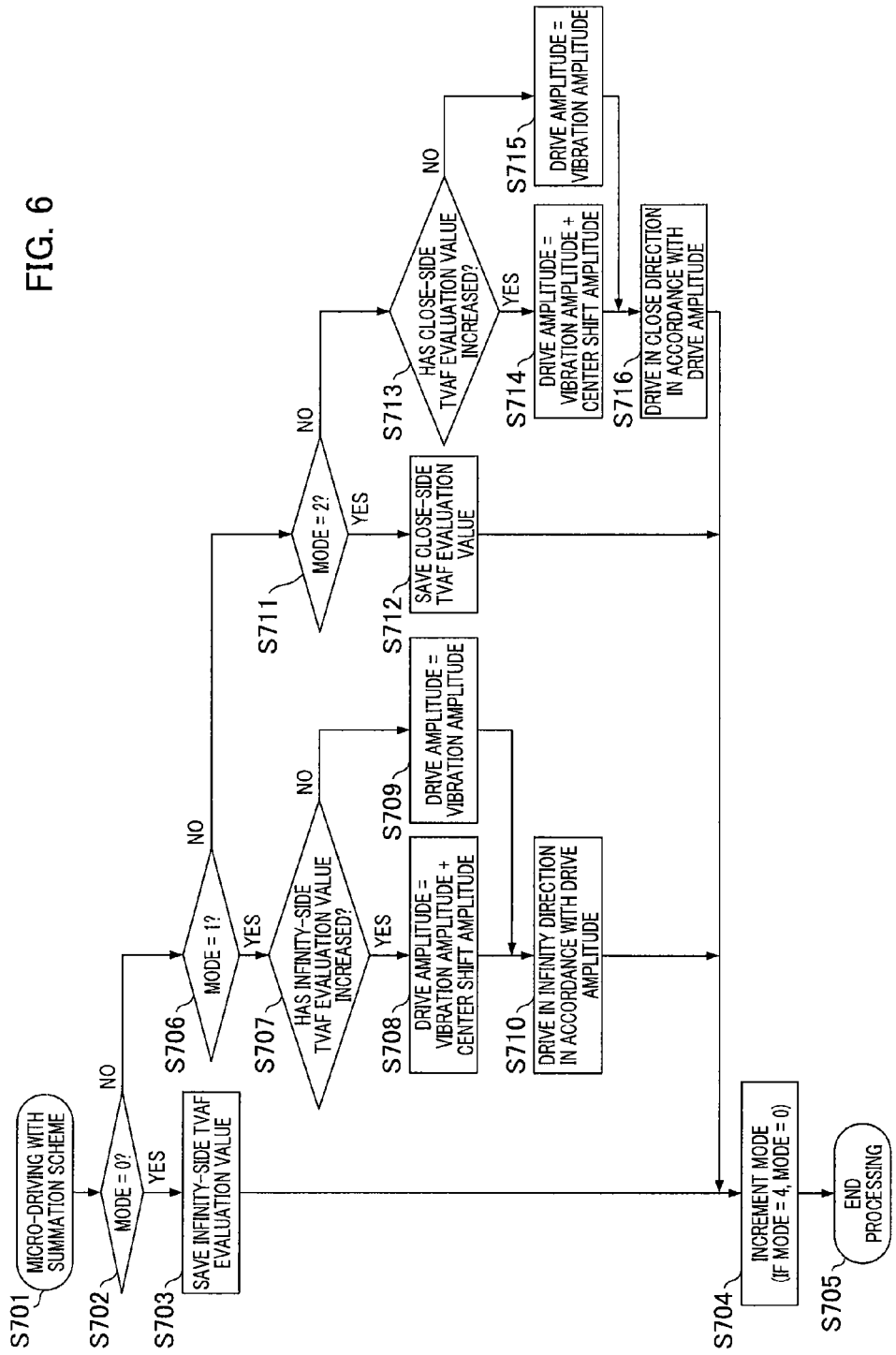
FIG. 6 is a flowchart illustrating an example of processing associated with micro-driving with the summation scheme.
Figure 7:
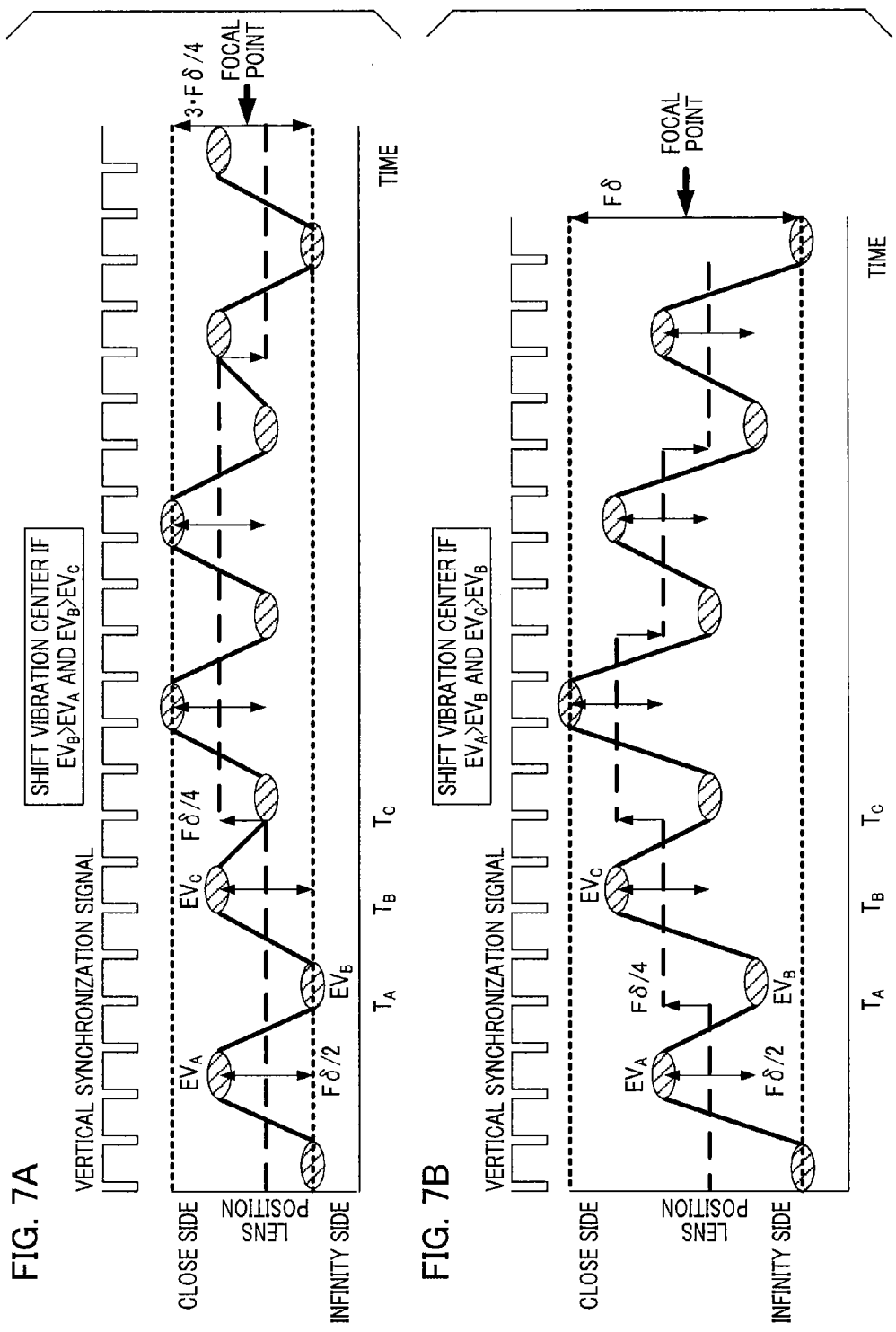
FIG. 7A and FIG. 7B are diagrams illustrating micro-driving.

Next, a description will be given of the micro-driving operation with the summation scheme with reference to the flowchart shown in FIG. 6. The processes from step S702 to step S705 are the same as those from step S602 to step S605 shown in FIG. 5. The process in step S706 shown in FIG. 6 is the same as that in step S606 shown in FIG. 5. The processes in step S711 and step S712 shown in FIG. 6 are the same as those in step S612 and step S613 shown in FIG. 5. Hereinafter, a description will be given mainly of the processes in steps S707 to S710 and steps S713 to S716 that are different from those shown in FIG. 5.

In step S701, the process starts. If it is determined in step S702 that the current Mode value is not zero and it is further determined in step S706 that the current Mode value is one, the process advances to step S707. In step S707, the infinity-side TVAF evaluation value (see step S703) is compared with the close-side TVAF evaluation value (see step S712). If the infinity-side TVAF evaluation value is greater than the close-side TVAF evaluation value, the process advances to step S708, whereas if the infinity-side TVAF evaluation value is equal to or less than the close-side TVAF evaluation value, the process advances to step S709. In step S708, the camera control unit 116 makes a setting of "drive amplitude=vibration amplitude+center shift amplitude", that is, sets a drive amplitude upon center shift to be equal to or greater than an amplitude upon vibration. The camera control unit 116 performs the shifting of the vibration center of the focus lens in the infinity direction by increasing the drive amount in the infinity direction. In step S709, the camera control unit 116 makes a setting of "drive amplitude=vibration amplitude". After step S708 or step S709, the process advances to step S710, and the camera control unit 116 transmits a drive command to the lens control unit 115 in order to drive the focus lens 105 in the infinity direction in accordance with the drive amplitude determined in step S708 or step S709. Then, the process advances to step S704 and the Mode value increments by one.

On the other hand, in step S706, if it is determined that the current Mode value is other than one, the process advances to step S711. In step S711, if it is determined that the current Mode value is not two, the process advances to step S713. In step S713, the infinity-side TVAF evaluation value (see step S703) is compared with the close-side TVAF evaluation value (see step S712). If the close-side TVAF evaluation value is greater than the infinity-side TVAF evaluation value, the process advances to step S714, whereas if the close-side TVAF evaluation value is equal to or less than the infinity-side TVAF evaluation value, the process advances to step S715. In step S714, the camera control unit 116 makes a setting of "drive amplitude=vibration amplitude+center shift amplitude". The camera control unit 116 performs the shifting of the vibration center of the focus lens in the close direction by increasing the drive amount in the close direction. In step S715, the camera control unit 116 makes a setting of "drive amplitude=vibration amplitude". After step S714 or step S715, the process advances to step S716, and the camera control unit 116 transmits a drive command to the lens control unit 115 in order to drive the focus lens 105 in the close direction in accordance with the drive amplitude determined in step S714 or step S715.

FIG. 7B shows an example of the time profile of the focus lens operation, the settings of the horizontal axis and the vertical axis are the same as those shown in FIG. 7A. The TVAF evaluation values $EV_A$, $EV_B$, and $EV_A$ are captured by the camera control unit 116 at the times $T_A$, $T_B$, and $T_C$, respectively. After the time $T_C$, processing for comparing the TVAF evaluation values $EV_A$, $EV_B$, and $EV_C$ is performed. If the camera control unit 116 determines that "$EV_A > EV_B$" and "$EV_C > EV_B$", the camera control unit 116 shifts a vibration center, whereas if the condition is not satisfied, a vibration center is not shifted. In this scheme, the maximum drive amplitude is the summation of "vibration amplitude+center shift amplitude" and a center shift is successively performed. Thus, when the focus lens 105 is shifted successively in the same direction, focus adjustment can be performed quickly. In this example, the difference between a focus lens position at the close end and a focus lens position at the infinity end during the vibration of the focus lens in the vicinity of the focal point is Fδ.

Figure 8:
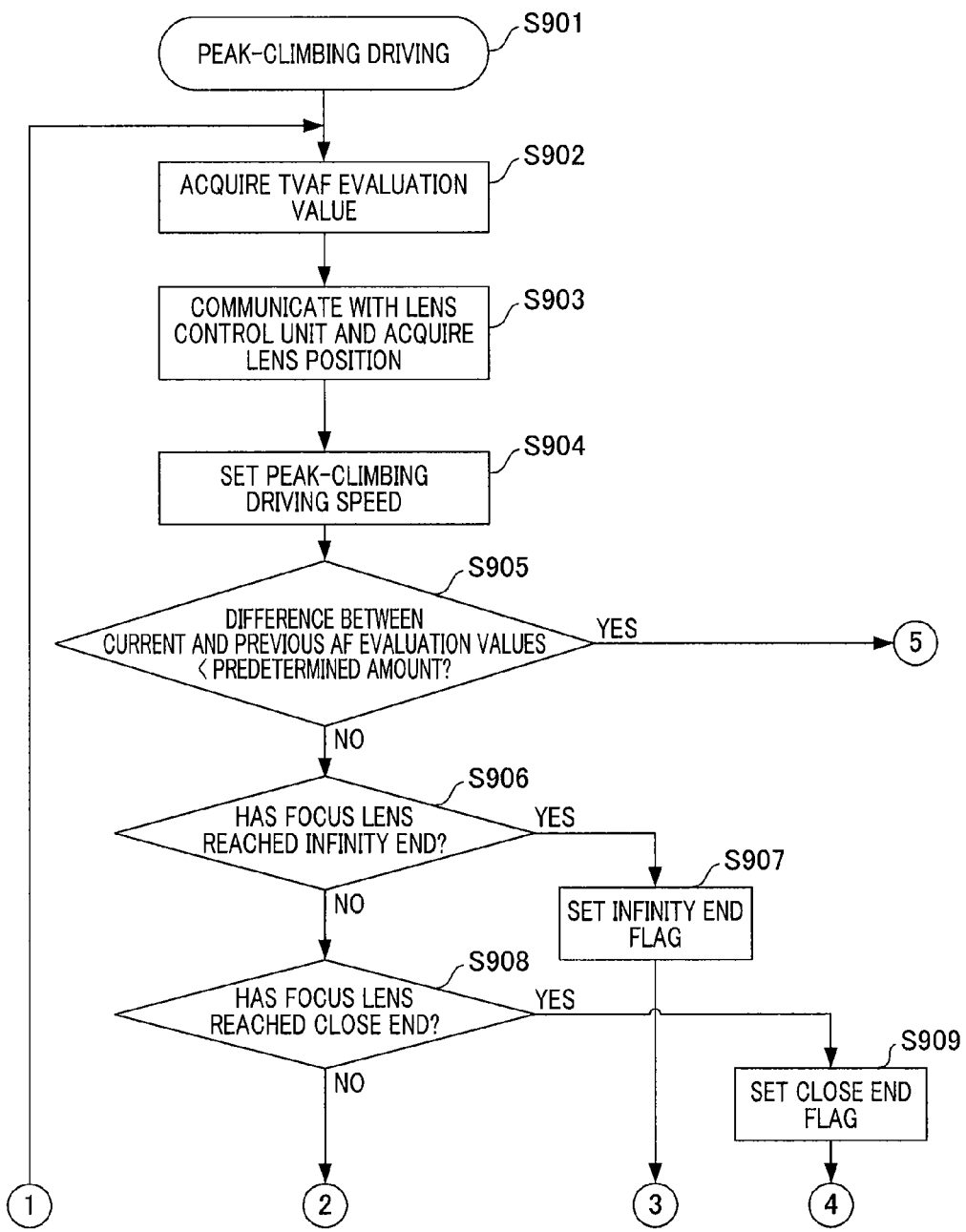
FIG. 8 is a flowchart illustrating the former half of processing in order to explain peak-climbing driving in conjunction with FIG. 9.

Next, a description will be given of the peak-climbing driving operation with reference to the flowcharts shown in FIGS. 8 and 9. In step S901, the process starts. In step S902, the camera control unit 116 acquires a TVAF evaluation value. In step S903, the camera control unit 116 communicates with the lens control unit 115 to thereby acquire position information about the focus lens 105. In step S904, the camera control unit 116 sets a peak-climbing driving speed. Note that processing for setting a low drive speed when the depth of focus is shallow and for setting a high drive speed when the depth of focus is deep is performed. In this manner, the change amount of sharpness is substantially constant without providing a sense of unnatural impression.

In step S905, the camera control unit 116 compares the TVAF evaluation value captured in step S902 with the previous TVAF evaluation value. The camera control unit 116 determines whether or not the difference between the current and the previous TVAF evaluation values is smaller than a predetermined amount (threshold value). If the current TVAF evaluation value is smaller than the previous TVAF evaluation value by a predetermined amount, the process advances to step S912 shown in FIG. 9, whereas if the current TVAF evaluation value is not smaller than the previous TVAF evaluation value by a predetermined amount, the process advances to step S906. Here, the predetermined amount is a determination reference value which is determined in consideration of the S/N (signal-to-noise) ratio of the TVAF evaluation value and is set to be equal to or greater than the fluctuation range of the TVAF evaluation value under the condition that the focus lens position is constant by fixing the object. If such settings are not made, the focus lens position may be affected by the fluctuation of the TVAF evaluation value, whereby the peak-climbing driving cannot be made in the correct direction.

In step S906, processing for determining whether or not the focus lens 105 has reached the infinity end is performed. The infinity end is the end position closest to the infinity side in the movable range of the focus lens 105 by design. If the focus lens 105 has reached the infinity end, the process advances to step S907, whereas if the focus lens 105 has not reached the infinity end, the process advances to step S908.

In step S908, processing for determining whether or not the focus lens 105 has reached the close end is performed. The close end is the end position closest to the close side in the movable range of the focus lens 105 by design. If the focus lens 105 has reached the close end, the process advances to step S909, whereas if the focus lens 105 has not reached the close end, the process advances to step S910 shown in FIG. 9. In steps S907 and S909, a flag for storing an end in which the drive direction is reversed is set. In step S907, an infinity end flag is set. In step S909, a close end flag is set. Then, the process advances to step S914 shown in FIG. 9. In step S914, the focus lens 105 continues peak-climbing driving by reversing the drive direction to the backward direction.

Figure 9:
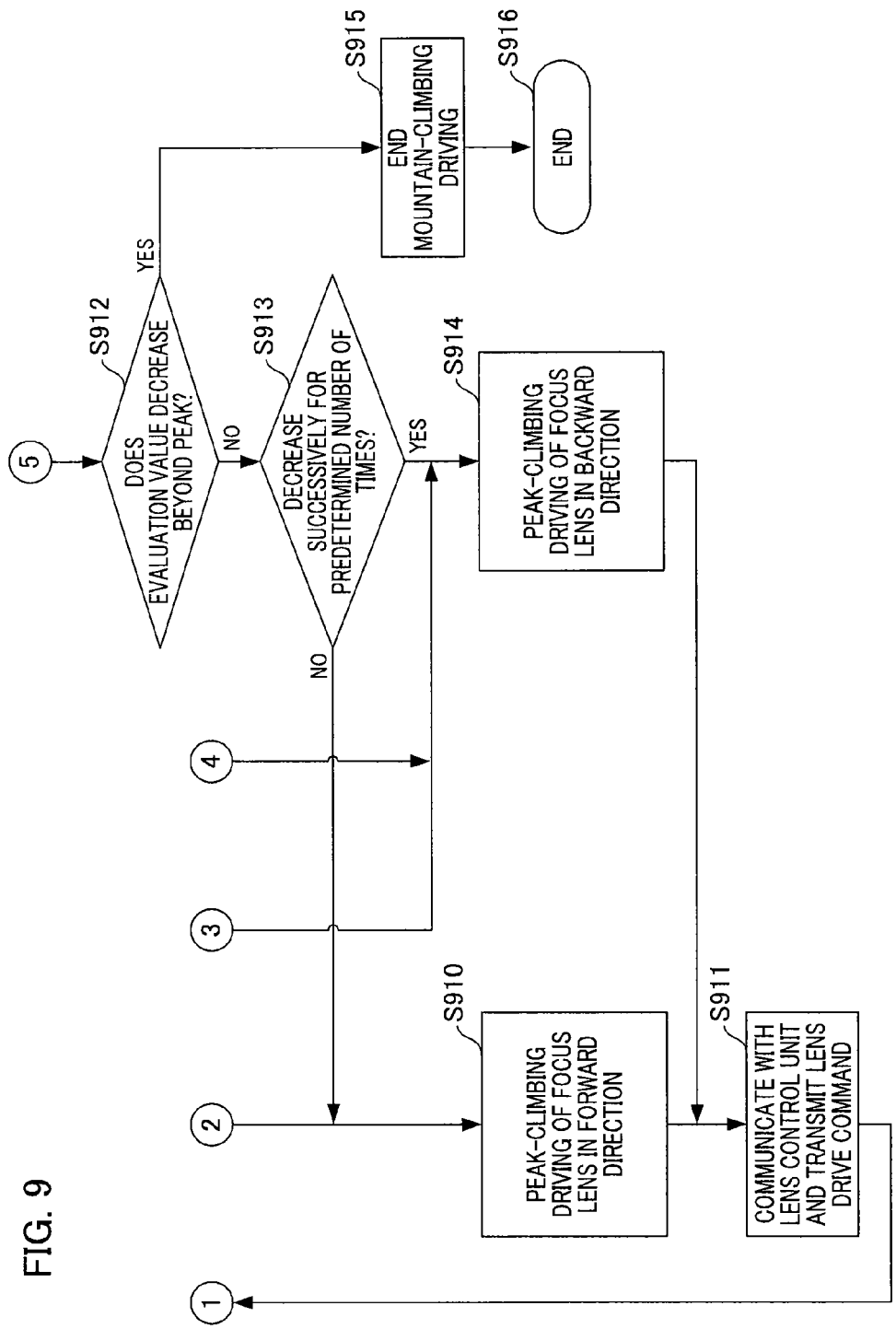
FIG. 9 is a flowchart illustrating the latter half of processing from the continuation of FIG. 8.

In step S910 shown in FIG. 9, the camera control unit 116 determines to perform the peak-climbing driving of the focus lens 105 at the speed determined in step S904 along the same forward direction as the previous direction. In step S911, the camera control unit 116 transmits the determined drive command to the lens control unit 115, and the process returns to step S902 to thereby continue processing.

In step S912, processing for determining whether or not the TVAF evaluation value decreases beyond its peak position is performed. If the TVAF evaluation value does not decrease without passing over its peak value, the process advances to step S913. If the focus lens 105 passes over the peak position and the TVAF evaluation value decreases, the process advances to step S915 to thereby end peak-climbing driving. Then, the process advances to step S916. The series of processes are ended and the process shifts to the micro-driving operation. In step S913, it is determined whether or not the TVAF evaluation value successively decreases for a predetermined number of times. If it is determined that the TVAF evaluation value successively decreases for a predetermined number of times, the process advances to step S914, whereas if otherwise, the process advances to step S910.

In step S914, the camera control unit 116 determines to perform the peak-climbing driving of the focus lens 105 at the speed determined in step S904 in a direction opposite to the previous direction. Then, the process advances to step S911, and the camera control unit 116 transmits the drive command determined in step S914 to the lens control unit 115.

Figure 10:
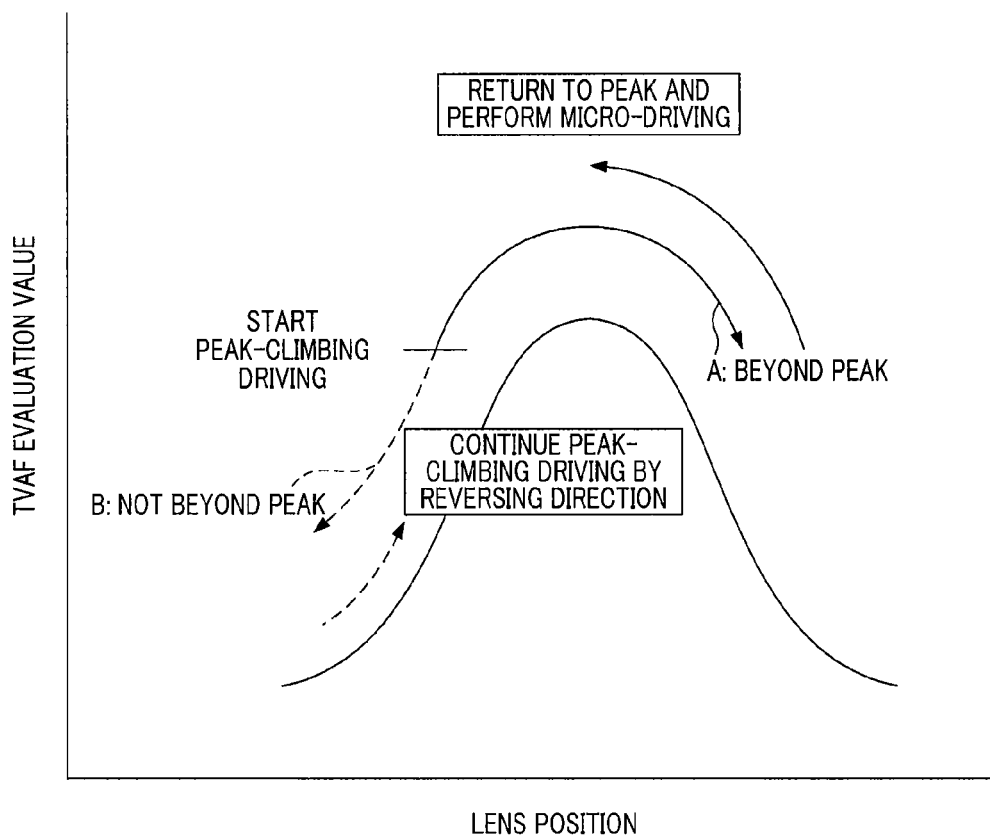
FIG. 10 is an explanatory diagram illustrating peak-climbing driving.

FIG. 10 illustrates the movement of the focus lens 105 during the peak-climbing driving operation. In the symbol A shown in FIG. 10, the TVAF evaluation value decreases beyond its peak value. Thus, the camera control unit 116 determines that a lens position has passed a focal point corresponding to the peak position and ends the peak-climbing driving operation. The process shifts to the micro-driving operation. On the other hand, in the symbol B shown in FIG. 10, the TVAF evaluation value decreases without finding the peak value, the camera control unit 116 reverses the drive direction to thereby continue the peak-climbing driving operation.

As described above, the focus lens 105 shifts while repeating the sequence of "reactivation determination→micro-driving→peak-climbing driving→micro-driving→reactivation determination". The imaging apparatus maintains the focused state by performing focus adjustment control such that the TVAF evaluation value always becomes its peak value.

According to the first embodiment, in the interchangeable lens system, a camera unit receives data indicating the amount of change in image magnification from a lens unit and thereby switches the drive scheme of micro-driving in response to the data. In this manner, an automatic focus adjustment operation with less degradation in performance can be realized while the change in image magnification is not noticeable on a screen.

Variant Example of First Embodiment

Next, a description will be given of a variant example of the first embodiment of the present invention. The configuration of the imaging apparatus of the variant example is the same as that of the first embodiment shown in FIG. 1. The same reference numerals as used in the first embodiment are used to denote the components of the variant example, and detailed description thereof will be omitted. The following description will be given of the differences from the first embodiment. Note that the methodology applied here in describing the variant of the first embodiment, in which detailed description of elements already described above is omitted, is also applied to other embodiments described below.

Figure 11:
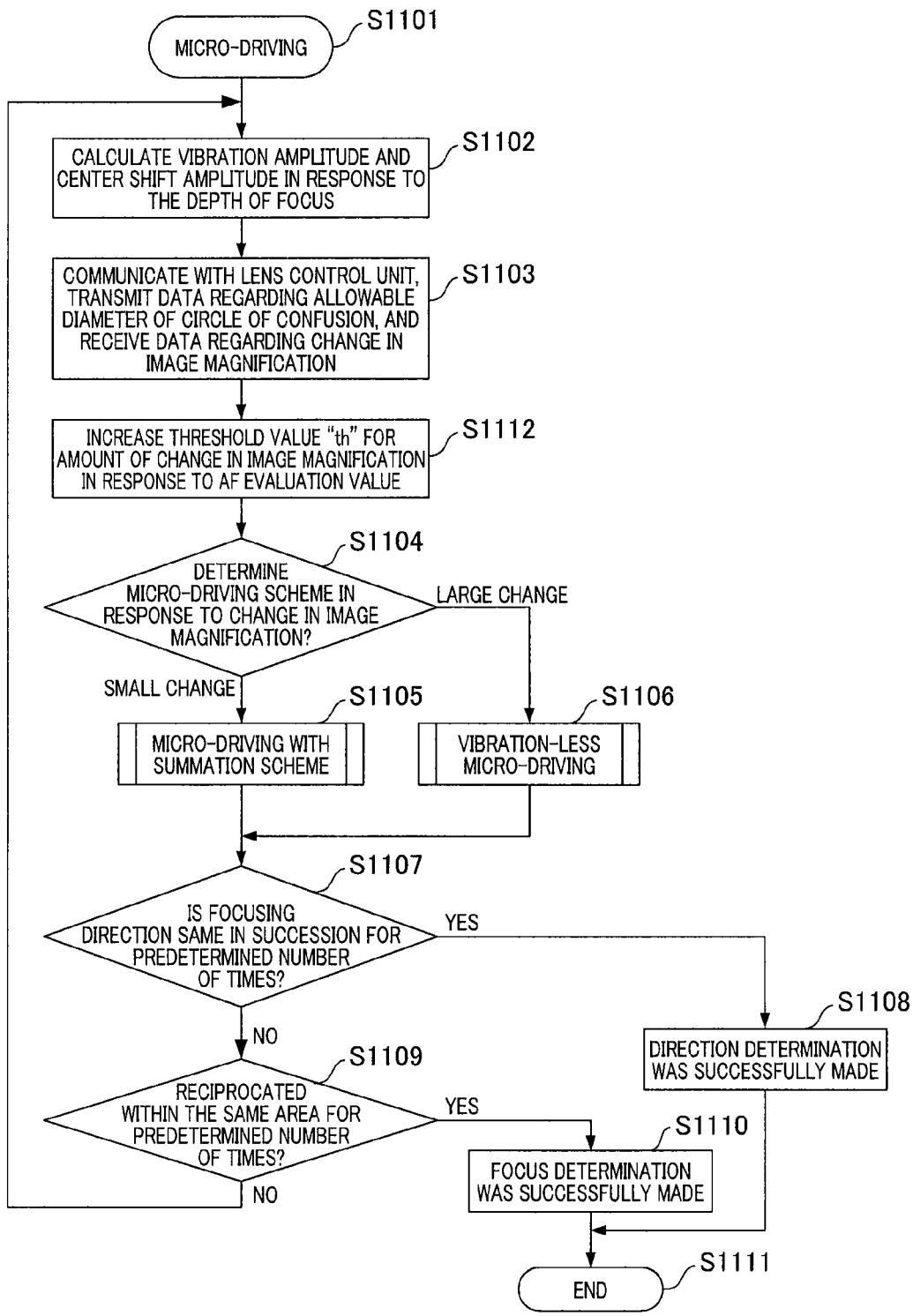
FIG. 11 is a flowchart illustrating an example of processing for switching a micro-driving scheme in order to explain a variant example of the first embodiment of the present invention in conjunction with FIGS. 12 and 13.

FIG. 11 is a flowchart illustrating control of the micro-driving operation among AF control performed by the camera control unit 116 according to the variant example of the first embodiment and corresponds to FIG. 4 of the first embodiment. The operations other than the micro-driving operation are the same as described with reference to FIGS. 6, 8, and 9.

In step S1101, the process starts. In step S1102, the camera control unit 116 calculates a vibration amplitude and a center shift amplitude in response to the depth of focus determined by an aperture, a zoom position, and the like. In step S1103, the camera control unit 116 communicates with the lens control unit 115 and transmits data regarding the allowable diameter of the circle of confusion, which is determined based on a pixel pitch or other values associated with properties of the imaging element 106, to the lens control unit 115. Also, the camera control unit, 116 acquires data regarding the change in image magnification per depth of focus from the lens control unit 115. In step S1112, the camera control unit 116 increases a threshold value "th" for a predetermined amount of change in image magnification when the TVAF evaluation value is small. The reason for this is because the change in image magnification does not involve a problem when a large blur occurs with an object image (when focusing degree is low).

In step S1104, the camera control unit 116 determines a micro-driving scheme in response to the vibration amplitude and the center shift amplitude determined in step S1102 and data regarding the change in image magnification per depth of focus acquired in step S1103. Here, FIGS. 7A and 7B show how the reciprocating operation is performed in the vicinity of the focal point. The amount of change in image magnification caused by the difference between a lens position when the focus lens is at the close end position and that when the focus lens is at the infinity end position during the vibration of the focus lens in the vicinity of the focal point is determined by the ratio of the difference between the focus lens positions to the depth of focus. In the present embodiment, the first drive scheme (hereinafter referred to as "vibration-less micro-driving") and the second drive scheme are switched. In other words, when the amount of change in image magnification relative to the difference between a focus lens position at the close end and a focus lens position at the infinity end during the vibration of the focus lens in the vicinity of the focal point is greater than a threshold value, and thus, the appearance of a captured image under the influence of micro-driving involves a problem, the process advances to step S1106 and vibration-less micro-driving is performed. The details of vibration-less micro-driving will be described below with reference to FIG. 12.

On the other hand, when the amount of change in image magnification relative to the difference between a focus lens position at the close end and a focus lens position at the infinity end during the vibration of the focus lens in the vicinity of the focal point is equal to or less than a threshold value, and thus, the appearance of a captured image under the influence of micro-driving does not involve a problem, the process advances to step S1105. In step S1105, the aforementioned micro-driving with the summation scheme is performed. Although, in the present embodiment, a summation scheme is employed as the second drive scheme, the subtraction scheme may also be employed depending on specifications. As described above, a drive scheme is switched in response to whether or not the amount of change in image magnification relative to the difference between a focus lens position at the close end and a focus lens position at the infinity end during the vibration of the focus lens in the vicinity of the focal point is greater than a threshold value. In this manner, when the change in image magnification is large, the change in focus state, which may have adverse effect on a screen, can be suppressed. However, in this case, the change in TVAF evaluation value can only be obtained due to shift of the focus lens in one direction. Hence, in comparison with the case where the focus lens 105 is vibrated in both directions, the reliability of direction determination is low. In contrast, when the change in image magnification relative to the difference between a focus lens position at the close end and a focus lens position at the infinity end during the vibration of the focus lens in the vicinity of the focal point is small, the change in TVAF evaluation value in both back and forth directions can be acquired by vibration, and thus, AF control can be reliably realized.

After steps S1105 and S1106, the process advances to step S1107. The processes in steps S1107 to S1111 are the same as those in steps S507 to S511 described in FIG. 4, and thus, a detailed description thereof will be omitted.

Figure 12:
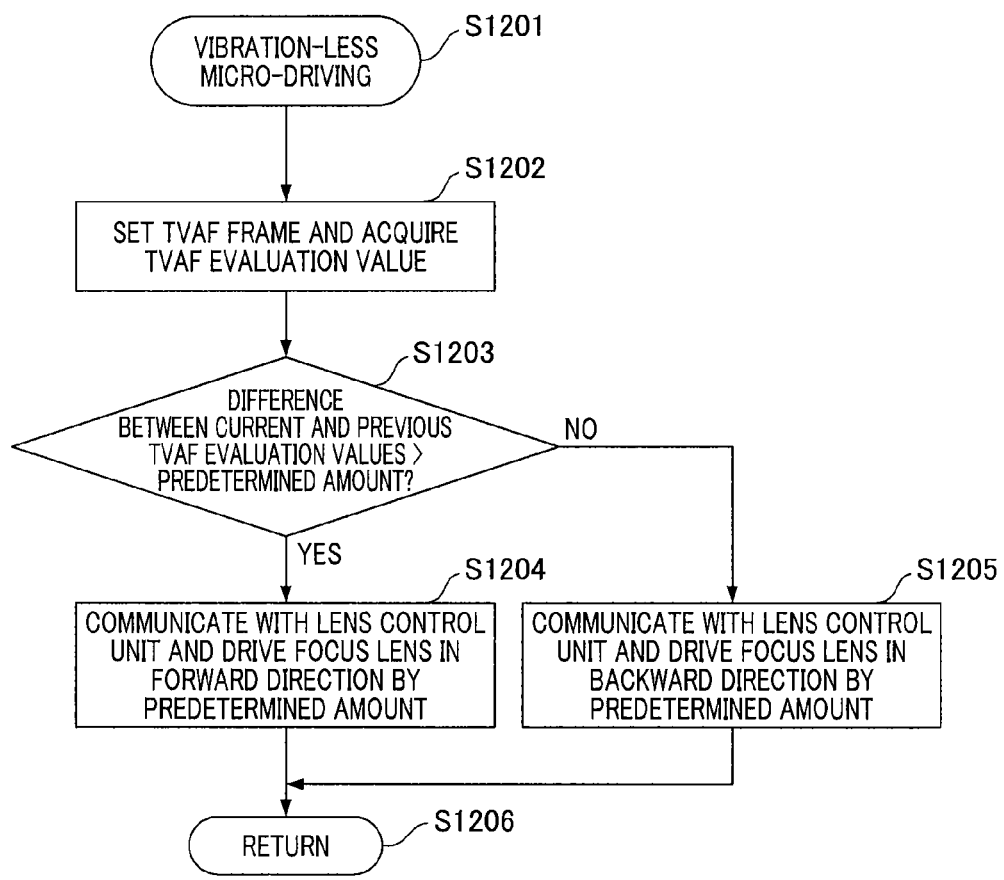
FIG. 12 is a flowchart illustrating an example of micro-driving processing according to the first embodiment.

Next, a description will be given of the vibration-less micro-driving operation with reference to FIG. 12. In step S1201, the process starts. In step S1202, the camera control unit 116 sets a TVAF frame by controlling the TVAF gate 113 and acquires a TVAF evaluation value from the TVAF signal processing unit 114. In step S1203, the camera control unit 116 compares the TVAF evaluation value captured in step S1202 with the previous TVAF evaluation value. If the current TVAF evaluation value is greater than the previous TVAF evaluation value, the process advances to step S1204, whereas if the current TVAF evaluation value is equal to or less than the previous TVAF evaluation value, the process advances to step S1205. In step S1204, the camera control unit 116 transmits a drive command to the lens control unit 115 in order to drive the focus lens 105 along the same forward direction as the previous direction by a predetermined amount. On the other hand, in step S1205, the camera control unit 116 transmits a drive command to the lens control unit 115 in order to drive the focus lens 105 in a direction opposite to the previous direction by a predetermined amount. After steps S1204 and S1205, the process advances to return processing in step S1206.

Figure 13:
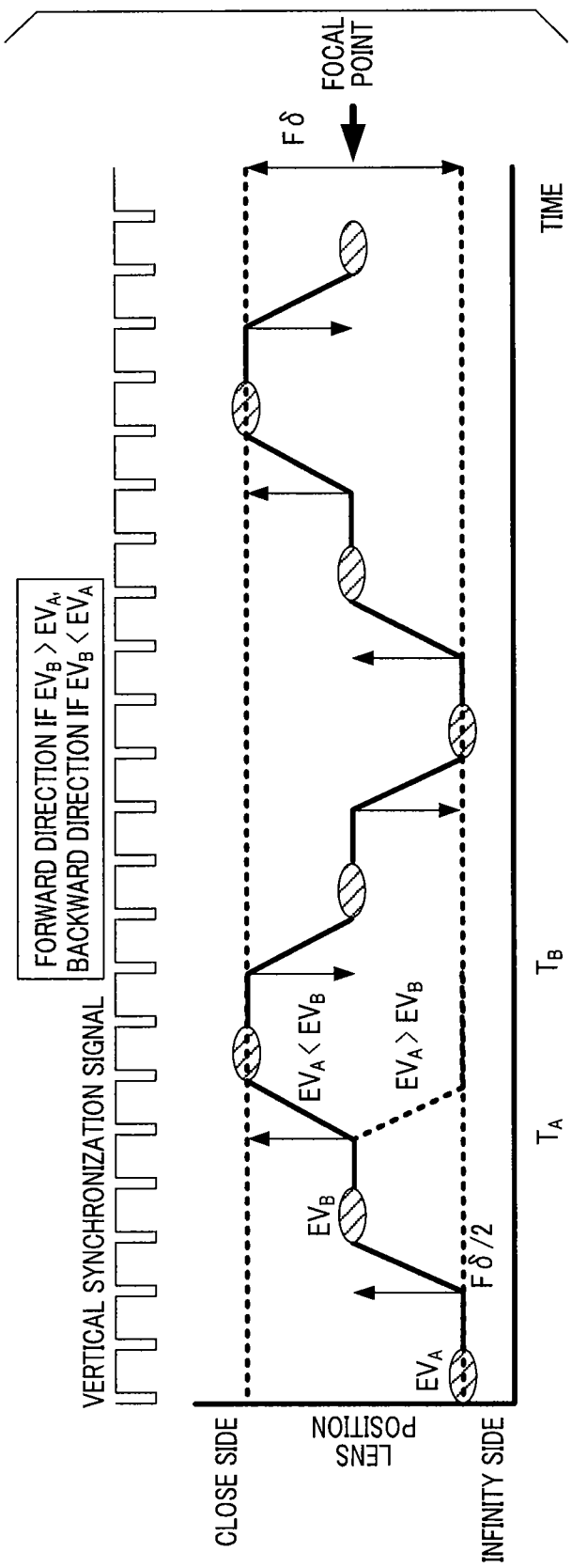
FIG. 13 is an explanatory diagram illustrating a micro-driving operation according to the first embodiment.

FIG. 13 shows an example of the time profile of the focus lens operation in the vibration-less micro-driving operation, where time is plotted on the horizontal axis and focus lens position is plotted on the vertical axis. A TVAF evaluation value $EV_A$ for electric charge accumulated in the imaging element 106 during the first period is captured at a time $T_A$. Next, a TVAF evaluation value $EV_B$ for electric charges accumulated in the imaging element 106 during the second period is captured at a time $T_B$. After the time $T_B$, the camera control unit 116 compares the TVAF evaluation value $EV_A$ with the TVAF evaluation value $EV_B$. If $EV_A < EV_B$, the camera control unit 116 shifts the focus lens 105 in the forward direction as it is, whereas if $EV_A > EV_B$, the camera control unit 116 shifts the focus lens 105 in the reverse direction. Here, the drive amount of the focus lens 105 is an amount such that the change in image capturing cannot be visibly recognized on a screen by the movement of the focus lens in a one-time shift and is determined on the basis of the depth of focus. In the present scheme, only the change in TVAF evaluation value can be obtained when the focus lens 105 is shifted in one direction without vibrating the focus lens 105. Hence, in comparison with the case where the focus lens 105 is vibrated in both directions, the reliability of direction determination is low. However, the difference between a focus lens position at the close end and a focus lens position at the infinity end during the vibration of the focus lens in the vicinity of the focal point does not change but the focus lens 105 is not vibrated, thus the present scheme is advantageous because the change in image magnification is hardly noticeable.

In addition to the effects of the first embodiment, the variant example of the first embodiment can provide effects in which a drive scheme is switched to vibration-less micro-driving when the amount of change in image magnification relative to the difference between a focus lens position at the close end and a focus lens position at the infinity end during the vibration of the focus lens in the vicinity of the focal point is greater than a threshold value. In this manner, an AF operation can be realized while the influence of the change in image magnification is not noticeable.

Another Variant Example of First Embodiment

Next, a description will be given of another variant example of the first embodiment of the present invention. A description will be given of TVAF control performed by the camera control unit 116 of another variant example with reference to FIGS. 14 and 15. The processes of another variant example are the same as those of the first embodiment except that FIGS. 14 and 15 correspond to FIG. 3 and FIG. 16 corresponds to FIG. 4 as described in the first embodiment.

Figure 14:
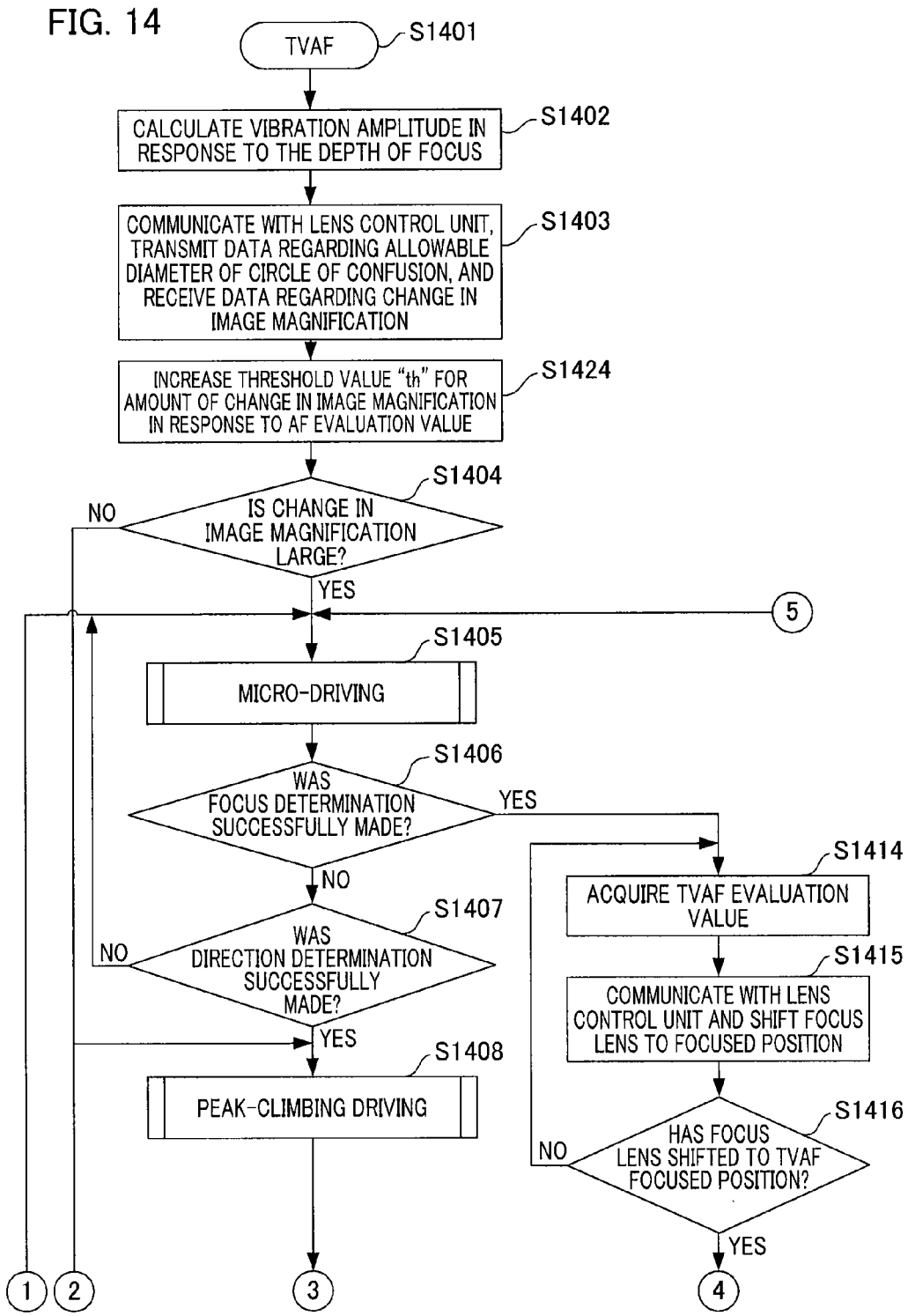
FIG. 14 is a flowchart illustrating an example of the former half processing associated with TVAF control in order to explain another variant example of the first embodiment of the present invention in conjunction with FIGS. 15 and 16.

In step S1401 shown in FIG. 14, the process starts. In step S1402, the camera control unit 116 calculates a vibration amplitude and a center shift amplitude in response to the depth of focus determined by an aperture, a zoom position, and the like. In step S1403, the camera control unit 116 communicates with the lens control unit 115, and transmits data regarding the allowable diameter of the circle of confusion, which is determined by a pixel pitch or other value(s) associated with another property of the imaging element 106, to the lens control unit 115 and receives data regarding the change in image magnification per depth of focus from the lens control unit 115. In step S1424, the camera control unit 116 increases a threshold value "th" for a predetermined amount of change in image magnification when the TVAF evaluation value is small. The reason for this is because the change in image magnification does not involve a problem when a large blur occurs with an object image (when focusing degree is low).

In step S1404, the camera control unit 116 determines a drive scheme in response to the vibration amplitude and the center shift amplitude determined in step S1402 and data regarding the change in image magnification per depth of focus acquired in step S1403. The amount of change in image magnification relative to the difference between a lens position when the focus lens is at the close end position and that when the focus lens is at the infinity end position during the vibration of the focus lens in the vicinity of the focal point is determined by the ratio of the difference between a lens position when the focus lens is at the close end position and that when the focus lens is at the infinity end position to the depth of focus. If the amount of change in image magnification relative to the difference between a focus lens position at the close end and a focus lens position at the infinity end during the vibration of the focus lens in the vicinity of the focal point is greater than a threshold value, the camera control unit 116 advances the process to step S1405. If the amount of change in image magnification relative to the difference between a focus lens position at the close end and a focus lens position at the infinity end during the vibration of the focus lens in the vicinity of the focal point is equal to or less than a threshold value, the camera control unit 116 advances the process to step S1408.

In step S1405, the micro-driving operation is performed as the first mode. Next, focus determination is performed, that is, processing for determining whether or not the focus lens 105 is in a focused state and which direction a focal point exists if the focus lens 105 is in a non-focused state is executed. In other words, in step S1406, the camera control unit 116 determines whether or not focus determination was successfully made. If the camera control unit 116 determines that focus determination was successfully made, the process advances to step S1414. If the camera control unit 116 determines that focus determination was not successfully made, the process advances to step S1407. In step S1407, the camera control unit 116 determines whether or not direction determination was successfully made. If direction determination was successfully made, the process advances to step S1408, and the camera control unit 116 performs peak-climbing driving as the second mode. If direction determination was not successfully made in step S1407, the process returns to step S1405. In step S1408, the camera control unit 116 performs drive control for shifting the focus lens 105 in peak-climbing driving at a predetermined speed along the direction determined in step S1405. At this time, the camera control unit 116 searches a focus lens position (peak position) where the TVAF evaluation value reaches its peak by associating the TVAF evaluation value with the focus lens position acquired from the lens control unit 115.

Figure 15:
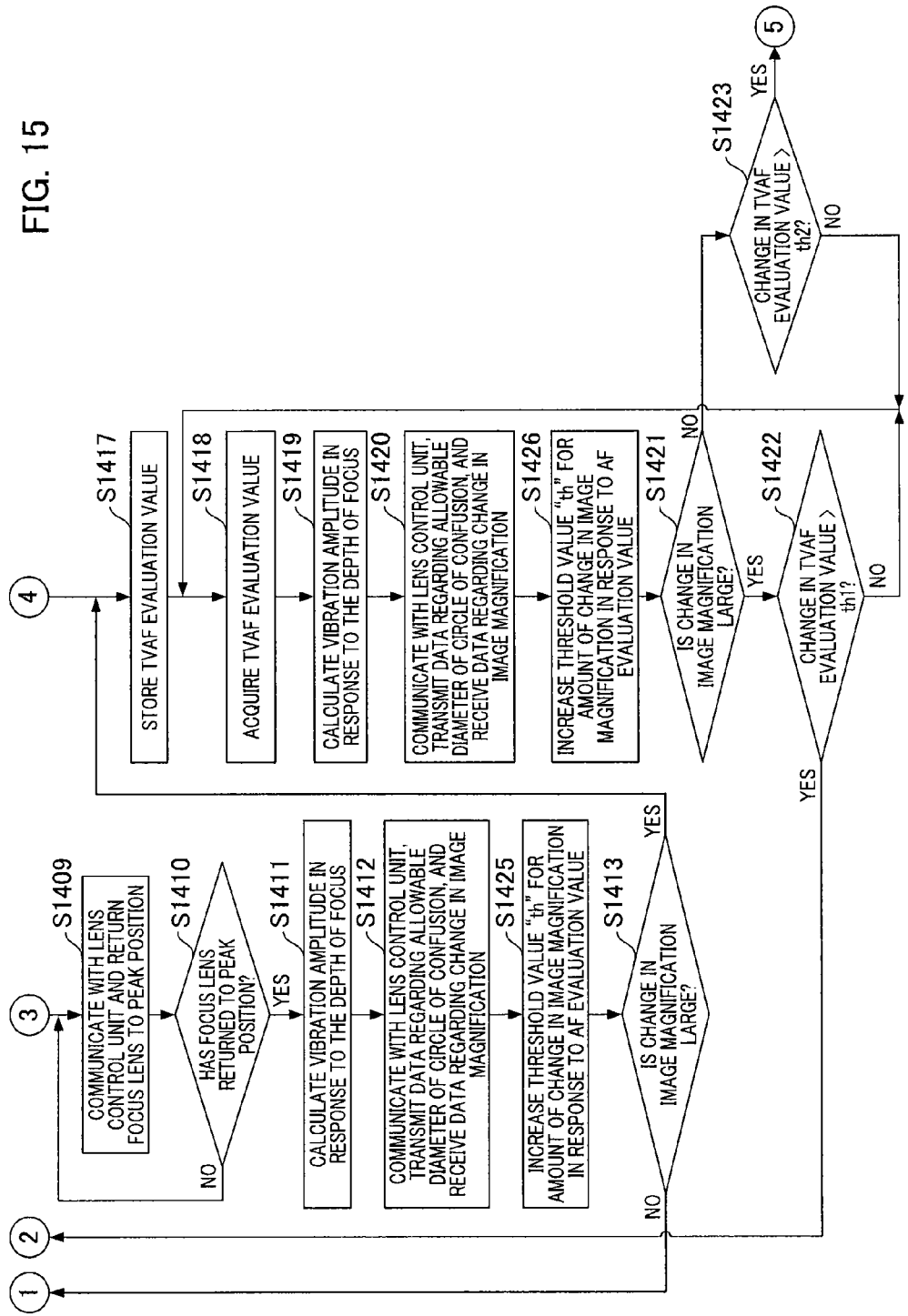
FIG. 15 is a flowchart illustrating the latter half of processing from the continuation of FIG. 14 in accordance with the first embodiment.

In step S1409 shown in FIG. 15, the camera control unit 116 transmits a drive command to the lens control unit 115 in order to shift the focus lens 105 to the peak position during the peak-climbing driving operation. In step S1410, the camera control unit 116 communicates with the lens control unit 115 to acquire position information about the focus lens 105. The camera control unit 116 determines whether or not the focus lens 105 has returned to the peak position. If the focus lens 105 has returned to the peak position, the process advances to step S1411, whereas if the focus lens 105 has not returned to the peak position, the process returns to step S1409. In step S1411, the camera control unit 116 calculates a vibration amplitude and a center shift amplitude in response to the depth of focus determined by an aperture, a zoom position, and the like.

In the next step S1412, the camera control unit 116 communicates with the lens control unit 115, and transmits data regarding the allowable diameter of the circle of confusion, which is determined by a pixel pitch or other parameters relating to the imaging element 106, to the lens control unit 115 and receives data regarding the change in image magnification per depth of focus from the lens control unit 115. In step S1425, the camera control unit 116 increases a threshold value "th" for a predetermined amount of change in image magnification when the TVAF evaluation value is small. The reason for this is because the change in image magnification does not involve a problem when a large blur occurs with an object image (when focusing degree is low or in other words the object is not strongly in focus). In step S1413, the camera control unit 116 determines whether or not the change in image magnification is greater than a threshold value by use of the vibration amplitude, the center shift amount, and data regarding the change in image magnification per depth of focus. If the amount of change in image magnification caused by the difference between a focus lens position at the close end and a focus lens position at the infinity end during the vibration of the focus lens in the vicinity of the focal point is equal to or less than a threshold value, the process returns to step S1405 shown in FIG. 14 and the micro-driving operation is performed. If the amount of change in image magnification caused by the difference between a focus lens position at the close end and a focus lens position at the infinity end during the vibration of the focus lens in the vicinity of the focal point exceeds a threshold value, the process advances to step S1417, and the camera control unit 116 stops the focus lens 105. In other words, if the amount of change in image magnification caused by the difference between a focus lens position at the close end and a focus lens position at the infinity end during the vibration of the focus lens in the vicinity of the focal point is greater than a threshold value, the micro-driving operation is inhibited.

Next, a description will be given of focus stop and reactivation determination processing when the process advances from step S1406 to step S1414 shown in FIG. 14. In step S1414, the camera control unit 116 acquires a TVAF evaluation value. In step S1415, the camera control unit 116 transmits a drive command to the lens control unit 115 in order to shift the focus lens 105 to the focus lens position determined to be in-focus. In step S1416, the camera control unit 116 receives position information about the focus lens 105 from the lens control unit 115 to thereby determine whether or not the focus lens 105 has shifted to a peak position corresponding to the focal point based on the TVAF evaluation value. If the camera control unit 116 determines that the focus lens 105 has shifted to the peak position, the process advances to S1417 shown in FIG. 15, whereas if otherwise, the process returns to step S1414. In step S1417, the camera control unit 116 stops the focus lens 105 at the peak position corresponding to the focal point and stores a TVAF evaluation value at the focal point. In step S1418, the camera control unit 116 acquires a new TVAF evaluation value. In step S1419, the camera control unit 116 calculates a vibration amplitude and a center shift amplitude in response to the depth of focus determined by an aperture, a zoom position, and the like.

In step S1420, the camera control unit 116 transmits data regarding the allowable diameter of the circle of confusion, which is determined by a pixel pitch or the like of the imaging element 106, to the lens control unit 115 and receives data regarding the change in image magnification per depth of focus from the lens control unit 115. In step S1426, the camera control unit 116 increases a threshold value "th" for a predetermined amount of change in image magnification when the TVAF evaluation value is small. The reason for this is because the change in image magnification does not involve a problem when a large blur occurs with an object image (when focusing degree is low). In step S1421, the camera control unit 116 determines whether or not the change in image magnification is greater than a threshold value by use of the vibration amplitude, the center shift amount, and data regarding the change in image magnification per depth of focus. If the amount of change in image magnification caused by the difference between a focus lens position at the close end and a focus lens position at the infinity end during the vibration of the focus lens in the vicinity of the focal point is greater than a threshold value, the process advances to step S1422. If the amount of change in image magnification caused by the difference between a focus lens position at the close end and a focus lens position at the infinity end during the vibration of the focus lens in the vicinity of the focal point is equal to or less than a threshold value, the process advances to step S1423.

In step S1422, the camera control unit 116 compares the TVAF evaluation value stored in step S1417 with the latest TVAF evaluation value acquired in step S1418 and determines the amount of change in TVAF evaluation value by calculating the amount of difference between two TVAF evaluation values to thereby determine whether or not the amount of change in TVAF evaluation value is greater than a first threshold value th1. If the amount of change in TVAF evaluation value is greater than the first threshold value th1 (predetermined value), the camera control unit 116 determines that an object has been changed and the process returns to step S1408 shown in FIG. 14 and then the camera control unit 116 performs the peak-climbing driving operation. If the amount of change in TVAF evaluation value is equal to or less than the first threshold value th1, the process returns to step S1418.

In step S1423, the camera control unit 116 compares the TVAF evaluation value stored in step S1417 with the latest TVAF evaluation value acquired in step S1418 and determines the amount of change in TVAF evaluation value by calculating the amount of difference between two TVAF evaluation values to thereby determine whether or not the amount of change in TVAF evaluation value is greater than a second threshold value th2. If the amount of change in TVAF evaluation value is greater than the second threshold value th2 (predetermined value), the camera control unit 116 determines that an object has been changed and the process returns to step S1405 shown in FIG. 14 and then the camera control unit 116 performs the micro-driving operation. If the amount of change in TVAF evaluation value is equal to or less than the second threshold value th2, the process returns to step S1418. Here, the first threshold value and the second threshold value are set in a relationship of so that the first threshold value is greater than the second threshold value i.e. "th1>th2". In other words, if the change in image magnification is large, the peak-climbing driving operation is performed only when an object has been reliably changed, whereas if the change in image magnification is small, the micro-driving operation is performed when there is any possibility that an object has been changed. In this manner, if the change in image magnification is large, the micro-driving can be inhibited and the frequency of reactivation can be reduced so that the change in image magnification caused by inadvertent movement of the focus lens 105 can be prevented from being noticeable.

Figure 16:
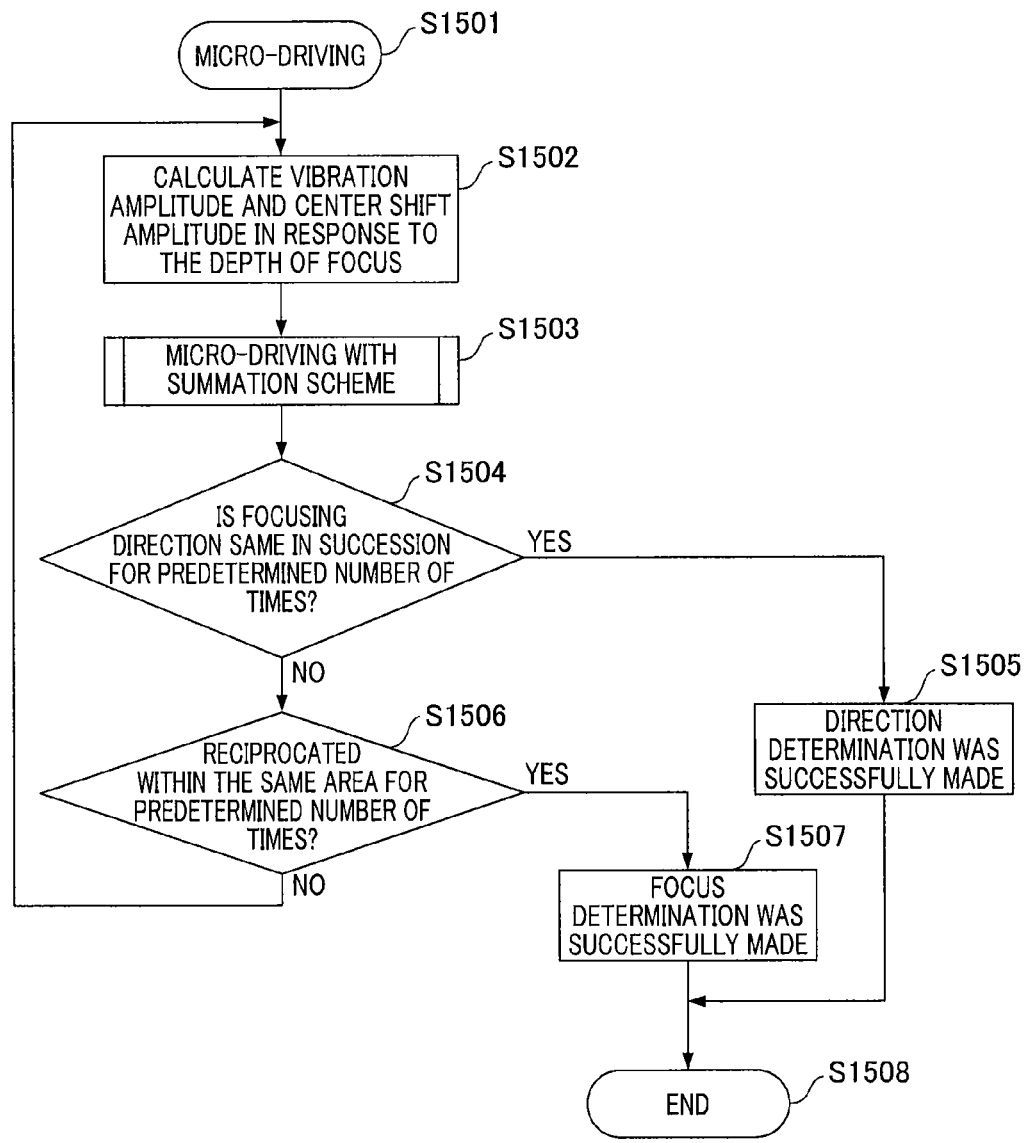
FIG. 16 is a flowchart illustrating an example of processing associated with micro-driving according to the first embodiment.

Next, a description will be given of the micro-driving operation with reference to FIG. 16. In step S1501, the process starts. In step S1502, the camera control unit 116 calculates a vibration amplitude and a center shift amplitude in response to the depth of focus determined by an aperture, a zoom position, and the like. In step S1503, the camera control unit 116 performs micro-driving with the summation scheme. Note that micro-driving with the subtraction scheme may also be employed depending on specifications. The processes in steps S1504 to S1508 are the same as those in steps S507 to S511 shown in FIG. 4, and thus, a description thereof will be omitted.

In addition to the effects of the first embodiment, this other variant example of the first embodiment can provide effects in which the micro-driving is inhibited and the frequency of reactivation is reduced if the change in image magnification is large. In this manner, an AF operation can be realized while the influence of the change in image magnification is not noticeable.

Second Embodiment

Figure 17:
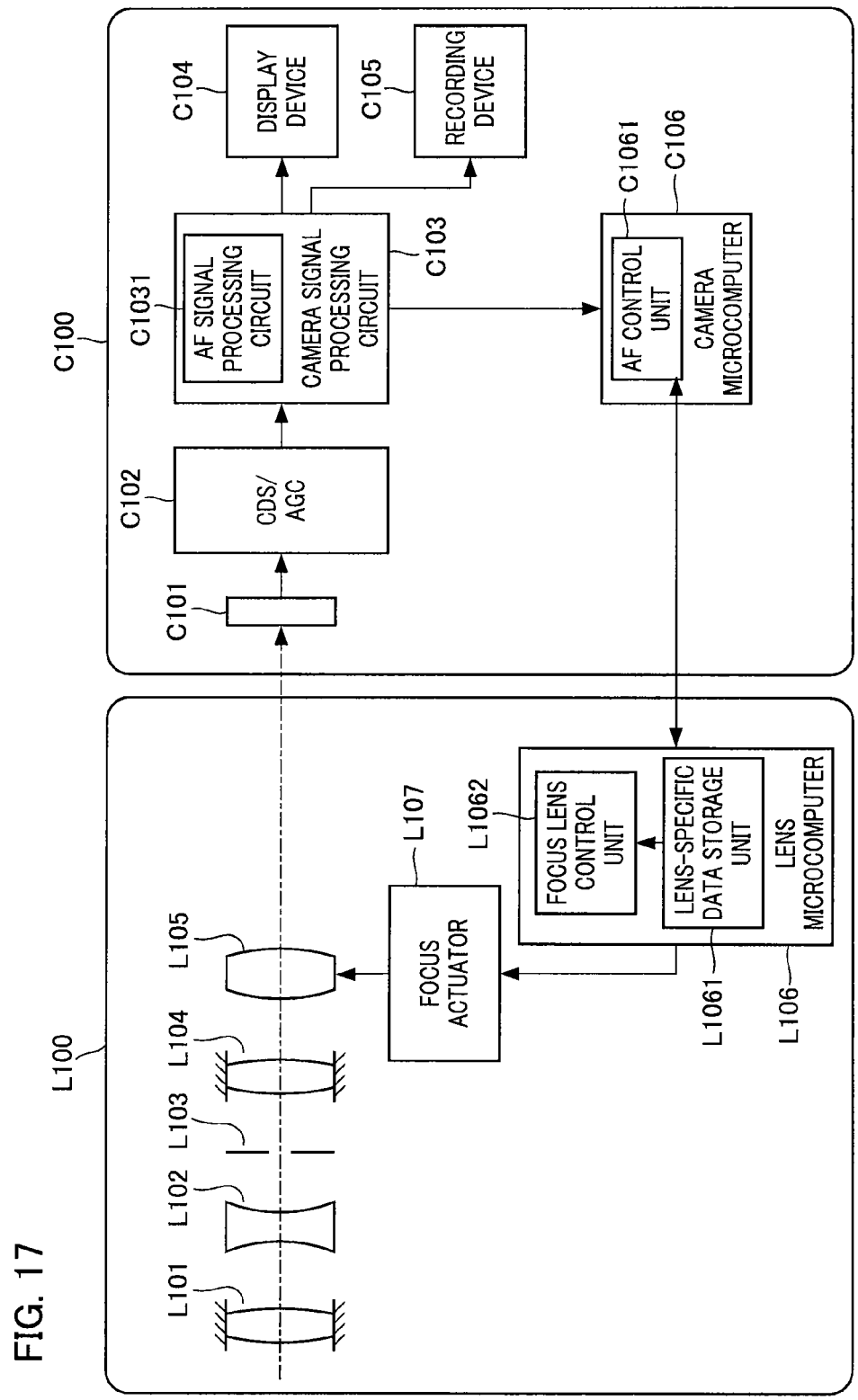
FIG. 17 is a block diagram illustrating the configuration of a video camera according to a second embodiment of the present invention.

FIG. 17 shows the configuration of a lens exchange type camera system that is constituted by an imaging apparatus and an interchangeable lens according to a second embodiment of the present invention. The reference numeral L100 denotes a lens unit that serves as an interchangeable lens. The reference numeral C100 denotes a camera body that serves as an imaging apparatus. The lens unit L100 is attachable to or detachable from the camera body C100.

The lens unit L100 supplies (transmits) information corresponding to a position control resolution of a focus lens (drive resolution of focus actuator) to be described below, a position sensitivity of a focus lens, and an aperture value (F-number). The camera body C100 calculates the amount of vibration amplitude and the shift amount of the vibration center upon micro vibration of a focus lens (to be described below) based on information received from the lens unit L100. The camera body C100 further calculates the depth of focus using information received from the lens unit L100 and information about an allowable diameter of the circle of confusion for the imaging element. The camera body C100 switches a center shift scheme upon micro vibration during AF control in response to the results of determination whether or not the focus lens shifts outside a predetermined range set on the basis of the depth of focus by means of the shift of the summation shift amount of the focus lens to be described below. The lens unit L100 receives a selected center shift scheme from the camera body C100 to thereby control the shift of the vibration center using the center shift scheme. The center shift scheme will be described below.

In FIG. 17, light reflected from an object passes through an imaging optical system provided in the lens unit L100 to thereby form an object image on an imaging element C101 provided within the camera body C100. The imaging optical system includes, in order from an object side, a first fixed lens group L101, a variable-power lens L102 for varying magnification by shifting in the optical axis direction, an aperture L103 for adjusting the quantity of light, and a second fixed lens group L104. Furthermore, the imaging optical system includes a focus lens L105 having a function for compensating image-plane fluctuation associated with zooming operations and a focusing function. The focus lens L105 is shifted along the optical axis direction by a focus actuator L107 that is constituted by a stepping motor, a DC motor, a vibrating motor, a voice coil motor, or the like.

Although, in FIG. 17, each lens group is described to be consisted of a single lens, each lens group may actually be consisted of a single lens or a plurality of lenses. In the present embodiment, although a description will be given of an imaging optical system of the rear focus type, an imaging optical system with the front focus type may also be employed.

On the other hand, in the camera body C100, the imaging element C101 is a photoelectric conversion element constituted by a CCD sensor or a CMOS sensor and outputs an analog signal by photoelectrically converting an object image. The imaging element C101 may also be provided for respective three primary colors of red (R), green (G), and blue (B).

Reference numeral C102 denotes a CDS/AGC/AD converter that samples the output of the imaging element C101 and further performs gain adjustment and digital conversion thereof. Reference numeral C103 denotes a camera signal processing circuit that generates an image signal by performing various image processing for an output signal from the CDS/AGC/AD converter C102. Reference numeral C1031 provided in the camera signal processing circuit C103 is an AF signal processing circuit.

The AF signal processing circuit C1031 extracts a brightness difference component or the like generated from a high frequency component or a high frequency signal from output signals of pixels within a region for use in focus detection among the output signals of all pixels of the imaging element C101 obtained from the CDS/AGC/AD converter C102 to thereby generate a focus signal. The focus signal is also referred to as a "contrast evaluation value signal", and represents the sharpness (contrast state) of an image to be generated on the basis of the output signal from the imaging element C101. Since sharpness may vary depending on the focus state of an imaging optical system, the resulting focus signal is a signal representing the focus state of an imaging optical system. The AF signal processing circuit C1031 corresponds to a focus signal generation unit.

Reference numeral C104 denotes a display device that displays an image signal from the camera signal processing circuit C103. Reference numeral C105 denotes a recording device that records an image signal from the camera signal processing circuit C103 in a recording medium such as a magnetic tape, an optical disk, a semiconductor memory, or the like. Reference numeral C106 is a camera microcomputer (imaging apparatus control unit: hereinafter referred to as a "camera microcomputer"). The camera microcomputer C106 outputs information for use in AF control to a lens microcomputer (lens control unit: hereinafter referred to as a "lens microcomputer") L106 provided in the lens unit L100 based on the output from the camera signal processing circuit C103.

In the present embodiment, AF control is a control for vibrating the focus lens L105 in a direction (close/infinity direction) of increasing/decreasing a focus signal (value thereof) by a slight amount and for shifting the center of vibration of the focus lens L105 in the focusing direction of increasing a focus signal (value thereof). In the following description, a slight amount of vibration is referred to as "micro vibration" and the amount of amplitude of the micro vibration is referred to as a "vibration amplitude amount". The center of micro vibration is referred to as a "vibration center", the shift of the center of micro vibration is referred to as a "center shift", and the shift amount of the center of micro vibration is referred to as a "center shift amount".

Information for use in AF control (hereinafter referred to as "AF control information") includes information such as operation steps of micro vibration, a focusing direction, a vibration amplitude amount, a direction along which the vibration center is shifted (focusing direction in close/infinity direction: hereinafter referred to as "center shift direction"), a shift amount of the vibration center, a center shift scheme, and the like.

Note that AF control is mainly performed by an AF control unit C1061 provided in the camera microcomputer C106. The details of the operation of the AF control unit C1061 will be described below.

The lens microcomputer L106 that is capable of receiving/transmitting information from/to the camera microcomputer C106 receives AF control information from the camera microcomputer C106. A lens-specific data storage unit L1061 is provided in the lens microcomputer L106. The lens-specific data storage unit L1061 stores lens unit-specific data including information about the drive resolution of the focus actuator L107 (i.e., the position control resolution of the focus lens L105), information about the position sensitivity of the focus lens L105, and the like.

Also, a focus lens control unit L1062 is provided in the lens microcomputer L106. The focus lens control unit L1062 computes the target position and the target speed for shifting the focus lens L105 based on data stored in the lens-specific data storage unit L1061 and AF control information received from the AF control unit C1061. The drive of the focus actuator L107 is controlled in response to the results of computation. In this manner, the position of the focus lens L105 is controlled so that a focused state is obtained.

Figure 18:
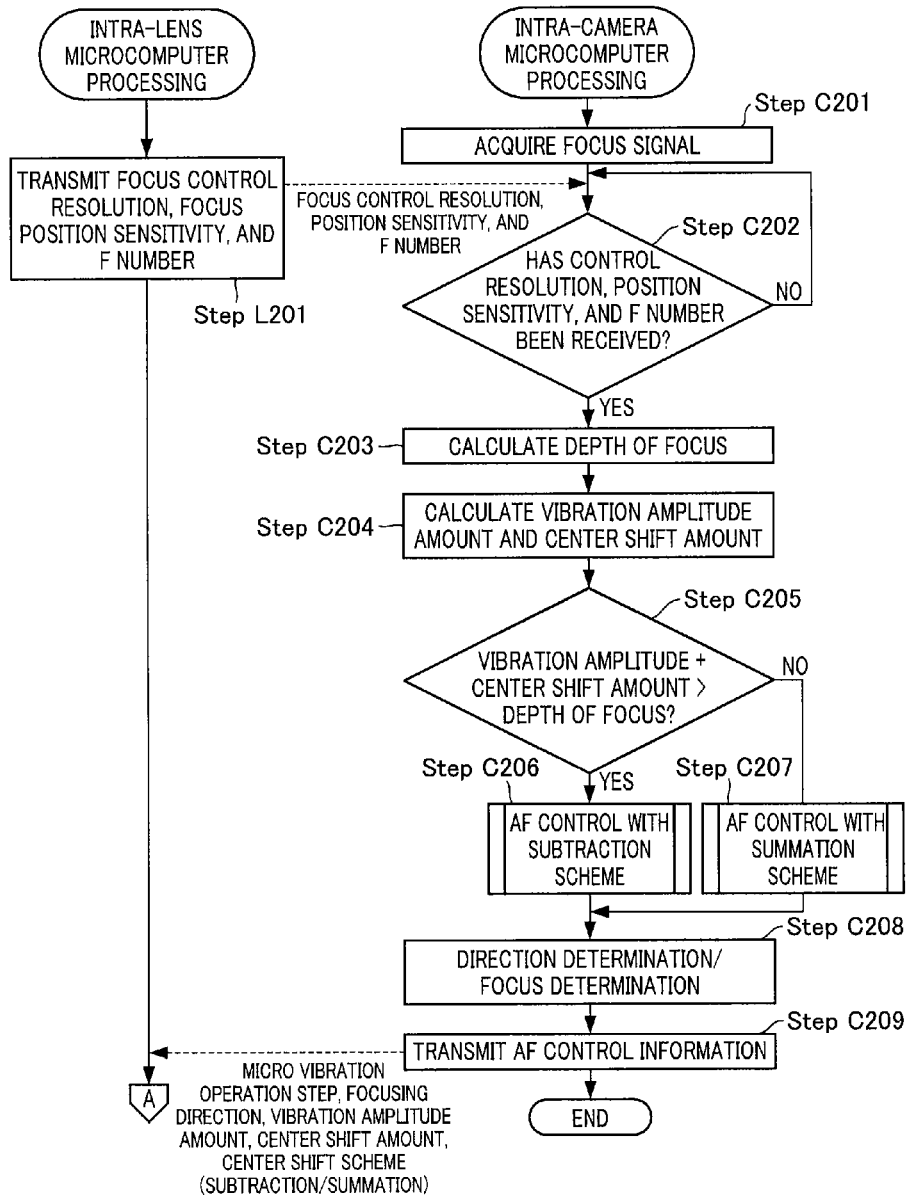
FIG. 18 is a flowchart illustrating the former half of processing in order to explain AF control according to the second embodiment in conjunction with FIG. 19.

Next, a description will be given of AF control performed by the lens microcomputer L106 (mainly, the focus lens control unit L1062) and the camera microcomputer C106 (mainly, the AF control unit C1061) with reference to FIGS. 18 to 23. FIG. 18 is a flowchart illustrating AF control performed by the lens microcomputer L106 and the camera microcomputer C106. The lens microcomputer L106 and the camera microcomputer C106 preferably execute AF control in accordance with a computer program executed thereon respectively.

In Step L201, the lens microcomputer L106 transmits information about the drive resolution of the focus actuator L107 (the position control resolution of the focus lens L105) and the position sensitivity of the focus lens L105 corresponding to the vibration center of micro vibration to the camera microcomputer C106.

In the following description, the drive resolution of the focus actuator L107 and the position control resolution of the focus lens L105 are collectively referred to as "focus control resolution". For example, high focus control resolution means that the shift amount of the focus lens L105 per one drive step of the focus actuator L107 is small. Also, the position sensitivity of the focus lens L105 is the ratio of the focus shift amount to the shift amount of the focus lens L105, and the position sensitivity of the focus lens L105 corresponding to the vibration center of micro vibration is referred to simply as "focus position sensitivity" in the following description. For example, high focus position sensitivity means that the focus shift amount relative to the shift amount of the focus lens L105 is large.

In the same Step L201, the lens microcomputer L106 further transmits an F-number of an imaging optical system determined from the aperture value of the aperture L103 to the camera microcomputer C106. Then, the process advances to Step L201.

On the other hand, in Step C201, the camera microcomputer C106 acquires a focus signal generated by the AF signal processing circuit C1031 provided in the camera signal processing circuit C103.

Next, in Step C202, the camera microcomputer C106 determines whether or not focus control resolution, focus position sensitivity and F-number have been received from the lens microcomputer L106. Only if the above information has been received, the process advances to Step C203.

In Step C203, the camera microcomputer C106 calculates the depth of focus Fδ using the allowable diameter of the circle of confusion δ calculated from the size of one pixel (pixel pitch) determined by the size of the imaging element C101 and the number of pixels thereof and the received F-number. Then, the process advances to Step C204.

In Step C204, the camera microcomputer C106 converts an amount of defocus (image-plane amplitude amount) on the image capturing surface of the imaging element C101 due to micro vibration of the focus lens L105 in AF control into a vibration amplitude amount based on the focus control resolution and the focus position sensitivity. Also, the camera microcomputer C106 converts an amount of defocus (image-plane center shift amount) on an image capturing surface due to center shift into a center shift amount based on the focus control resolution and the focus position sensitivity. Then, the process advances to Step C205.

Here, in general, the image-plane amplitude amount and the image-plane center shift amount are set on the basis of the depth of focus Fδ and are set to values smaller than the depth of focus Fδ so that any blur on an image is not appeared. For example, the image-plane amplitude amount is assumed to be a value obtained by multiplying the depth of focus Fδ by a predetermined ratio α (<1). At this time, in consideration of the focus control resolution ΔF, i.e., the shift amount of the focus lens L105 per one drive step of the focus actuator L107 and the focus position sensitivity γc, the vibration amplitude amount is calculated by Formula (1).

$$\text{Vibration amplitude amount} = (F\delta \times \alpha/\gamma c)/\Delta F \quad (1)$$

Also, the image-plane center shift amount is assumed to be a value obtained by multiplying the depth of focus F6 by a predetermined ratio β (<1). At this time, in consideration of the focus control resolution ΔF and the focus position sensitivity γc, the center shift amount is calculated by Formula (2).

$$\text{Center shift amount} = (F\delta \times \beta/\gamma c)/\Delta F \quad (2)$$

If the focus control resolution ΔF is large (coarse) or if the focus position sensitivity γc is high, a position range in which the focus lens L105 can be stopped within the range of the depth of focus Fδ (hereinafter referred to as "focus depth range") becomes small. Even if the focus actuator L107 is driven by a fewer number of drive steps, there is a high probability that the focus lens L105 shifts beyond the focus depth range (shifts outside the range of the depth of focus).

In Step C205, the camera microcomputer C106 determines whether or not the focus shift amount, which is a summation shift amount obtained by adding the vibration amplitude amount calculated in Step C204 to the center shift amount, exceeds the focus depth range, that is, determines whether or not the focus lens L105 shifts beyond the focus depth range. The focus depth range corresponds to a predetermined range set on the basis of the depth of focus. If the camera microcomputer C106 determines that the focus lens L105 shifts beyond the focus depth range (second case), the process advances to Step C206, whereas if the camera microcomputer C106 determines that the focus lens L105 does not shift beyond the focus depth range (first case), the process advances to Step C207. In other words, in a camera body using the imaging element C101 that has a fine pixel pitch and easily becomes a shallow depth of focus, when micro vibration is performed at a coarse focus control resolution, the center shift scheme is switched so that a focusing fluctuation of an image upon center shift is not occurred. In the present embodiment, there are two center shift schemes, i.e., the subtraction scheme and the summation scheme to be described below.

As shown in FIG. 28, when the focus lens L105 is shifted by the focus shift amount described above upon center shift and the focus lens L105 shifts beyond the focus depth range, the process advances to Step C206 and the camera microcomputer C106 selects the subtraction scheme. The detailed description will be given below of the subtraction scheme. In Step C206, the camera microcomputer C106 generates the aforementioned AF control information including the subtraction scheme as the center shift scheme.

On the other hand, when the depth of focus is deep even if the shift amount of the focus lens L105 is the same as the focus shift amount described above, in other words, when the focus control resolution relative to the focus depth range is sufficiently small (fine), there is a low probability of the focus lens L105 shifting beyond the focus depth range. Even if the focus lens L105 shifts beyond the focus depth range, the amount of the shift in excess of the focus depth range is small. Thus, a focusing fluctuation of an image upon center shift does not occur or is not noticeable. In this case, the process advances to Step C207 and the camera microcomputer C106 selects the summation scheme. The detailed description will also be given below of the summation scheme. In Step C207, the camera microcomputer C106 generates the aforementioned AF control information including the summation scheme as the center shift scheme.

In Step C208, the camera microcomputer C106 performs focusing direction determination and focus determination, and the process advances to Step C209. Focusing direction determination is to determine that, when the center shift to the focusing direction of increasing the focus signal detected by micro vibration of the focus lens L105 is performed in succession for a predetermined number of times, the focusing direction is a direction along which the true focused position is present. When focusing direction determination is made, peak-climbing driving for searching the focused position at which the focus signal reaches its peak while shifting the focus lens L105 in the focusing direction at a constant speed is performed. The operation of peak-climbing driving is well-known, and thus, a detailed description thereof will be omitted.

Furthermore, when a focused position is found by peak-climbing driving, the camera microcomputer C106 subjects the focus lens L105 to micro vibration again and monitors an increase or decrease in focus signal. Focus determination is to determine that the focused position is the true focused position by the fact that micro vibration has repeated for a predetermined number of times within the same range.

In Step C209, the camera microcomputer C106 transmits AF control information set in Steps C206 and C207 to the lens microcomputer L106. Then, the process returns to Step C201.

Figure 20:
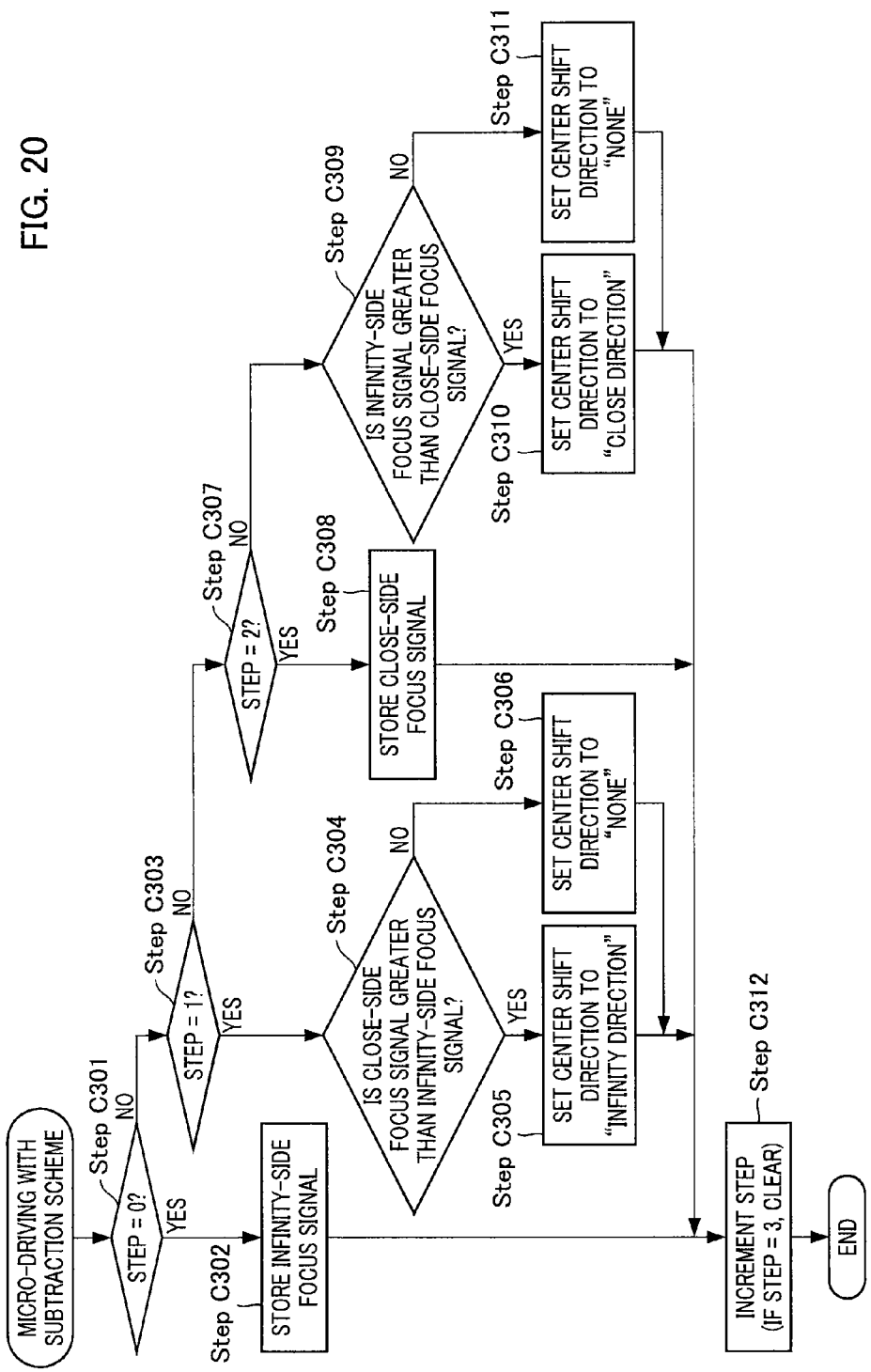
FIG. 20 is a flowchart illustrating subtraction scheme micro vibration control according to the second embodiment.

Next, a description will be given of AF control with the subtraction scheme with reference to the flowchart shown in FIG. 20. In Step C301, the camera microcomputer C106 determines the current micro vibration operation step. If the current step is zero, the process advances to Step C302, whereas if otherwise, the process advances to Step C303.

In Step C302, the camera microcomputer C106 stores a focus signal for use in processing performed when the focus lens L105 is located at the close-side. Here, the focus signal is a signal generated from an output signal of the imaging element C101 when the focus lens L105 is located at the infinity-side.

In Step C303, the camera microcomputer C106 determines the current operation step. If the current operation step is one, the process advances to Step C304 and subsequent steps, whereas if otherwise, the process advances to Step C307.

In Step C304, the camera microcomputer C106 compares the level (value) of the infinity-side focus signal stored in Step C302 with the level of the close-side focus signal stored in Step C308 to be described below. If the level of the close-side focus signal is greater than that of the infinity-side focus signal, the process advances to step C305, whereas the level of the infinity-side focus signal is greater than the level of the close-side focus signal, the process advances to Step C306.

In Step C305, the camera microcomputer C106 sets the center shift direction in AF control information to "infinity direction".

In Step C306, the camera microcomputer C106 sets the center shift direction to "none". In the following processing, the camera microcomputer C106 transmits AF control information including information about the center shift direction to the lens microcomputer L106. In this manner, the camera microcomputer C106 causes the lens microcomputer L106 to control the drive of the focus actuator L107 (the position of the focus lens L105) based the AF control information.

In Step C307, the camera microcomputer C106 determines the current operation step. If the current operation step is two, the process advances to Step C308 to thereby perform processing when the focus lens is located at the infinity-side, whereas if otherwise, the process advances to Step C309.

In Step C308, the camera microcomputer C106 stores a focus signal for use in processing performed when the focus lens L105 is located at the infinity-side. Here, the focus signal is a signal generated from an output signal of the imaging element C101 when the focus lens L105 is located at the close-side.

In Step C309, the camera microcomputer C106 compares the level of the close-side focus signal stored in Step C308 with the level of the infinity-side focus signal stored in Step C302. If the level of the infinity-side focus signal is greater than that of the close-side focus signal, the process advances to step C310, whereas the level of the close-side focus signal is greater than the level of the infinity-side focus signal, the process advances to Step C311.

In Step C310, the camera microcomputer C106 sets the center shift direction in AF control information to "close direction". In Step C311, the camera microcomputer C106 sets the center shift direction to "none".

In Step C312, the camera microcomputer C106 increments the micro vibration operation step by one. If the current operation step is three, the current operation step is, instead of being incremented further, cleared to zero.

Figure 21:
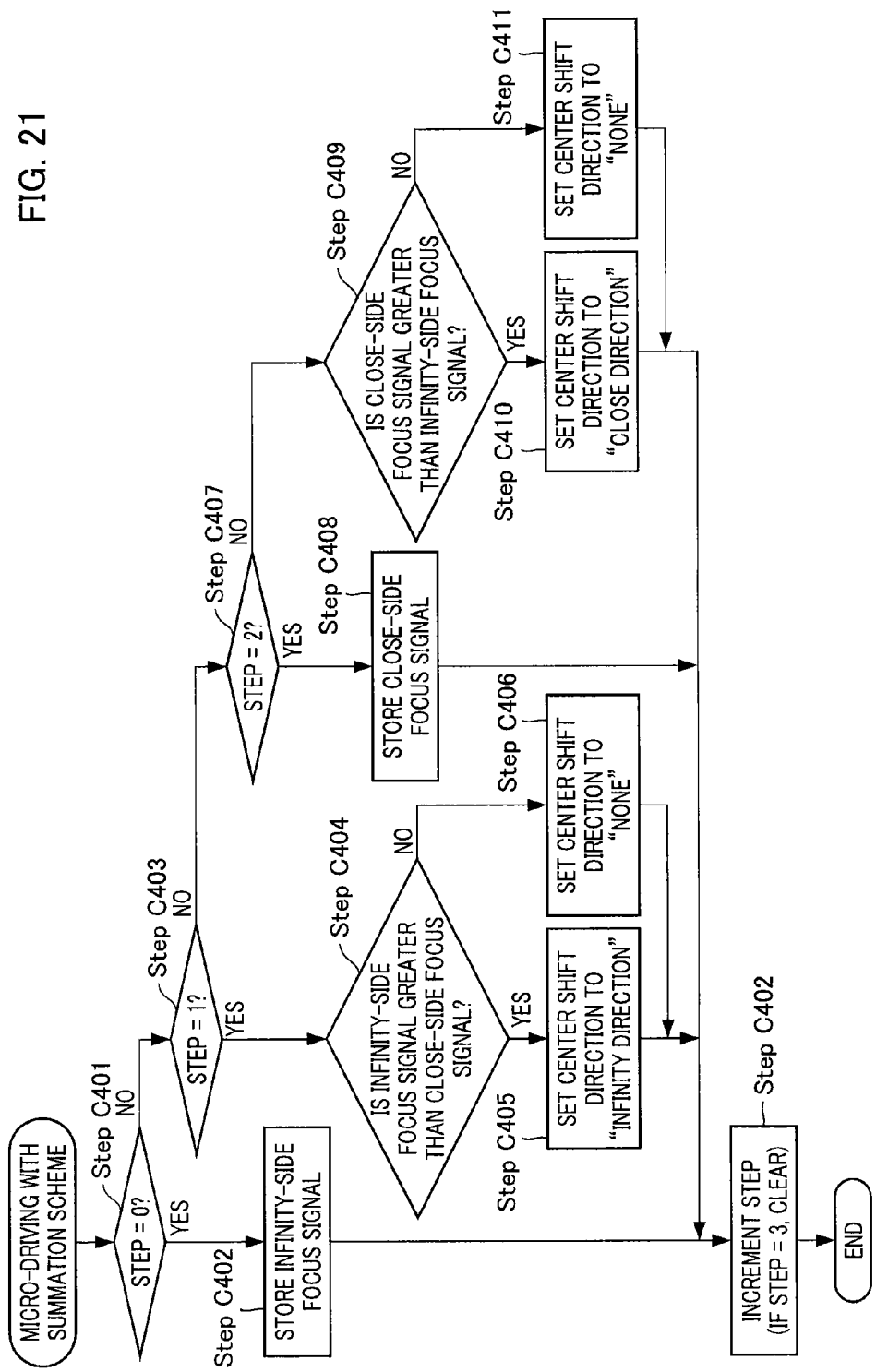
FIG. 21 is a flowchart illustrating summation scheme micro vibration control according to the second embodiment.

Next, a description will be given of AF control with the summation scheme with reference to the flowchart shown in FIG. 21. In Step C401, the camera microcomputer C106 determines the current micro vibration operation step. If the current step is zero, the process advances to Step C402, whereas if otherwise, the process advances to Step C403.

In Step C402, the camera microcomputer C106 stores a focus signal for use in processing performed when the focus lens L105 is located at the close-side. Here, the focus signal is a signal generated from an output signal of the imaging element C101 when the focus lens L105 is located at the infinity-side.

In Step C403, the camera microcomputer C106 determines the current operation step. If the current operation step is one, the process advances to Step C404 and subsequent steps, whereas if otherwise, the process advances to Step C407.

In Step C404, the camera microcomputer C106 compares the level (value) of the infinity-side focus signal stored in Step C402 with the level of the close-side focus signal stored in Step C408 to be described below. If the level of the infinity-side focus signal is greater than the level of the close-side focus signal, the process advances to Step C405, whereas if the level of the close-side focus signal is greater than that of the infinity-side focus signal, the process advances to step C406.

In Step C405, the camera microcomputer C106 sets the center shift direction in AF control information to "infinity direction".

In Step C406, the camera microcomputer C106 sets the center shift direction to "none". In the following processing, the camera microcomputer C106 transmits AF control information including information about the center shift direction to the lens microcomputer L106. In this manner, the camera microcomputer C106 causes the lens microcomputer L106 to control the drive of the focus actuator L107 (the position of the focus lens L105) based on the AF control information.

In Step C407, the camera microcomputer C106 determines the current operation step. If the current operation step is two, the process advances to Step C408, whereas if otherwise, the process advances to Step C409.

In Step C408, the camera microcomputer C106 stores a focus signal for use in processing performed when the focus lens L105 is located at the infinity-side. Here, the focus signal is a signal generated from an output signal of the imaging element C101 when the focus lens L105 is located at the close-side.

In Step C409, the camera microcomputer C106 compares the level of the close-side focus signal stored in Step C408 with the level of the infinity-side focus signal stored in Step C402. If the level of the close-side focus signal is greater than that of the infinity-side focus signal, the process advances to step C410, whereas the level of the infinity-side focus signal is greater than the level of the close-side focus signal, the process advances to Step C411.

In Step C410, the camera microcomputer C106 sets the center shift direction in AF control information to "close direction". In Step C411, the camera microcomputer C106 sets the center shift direction to "none".

In Step C412, the camera microcomputer C106 increments the micro vibration operation step by one. If the current operation step is three, the current operation step is cleared to zero.

Figure 19:
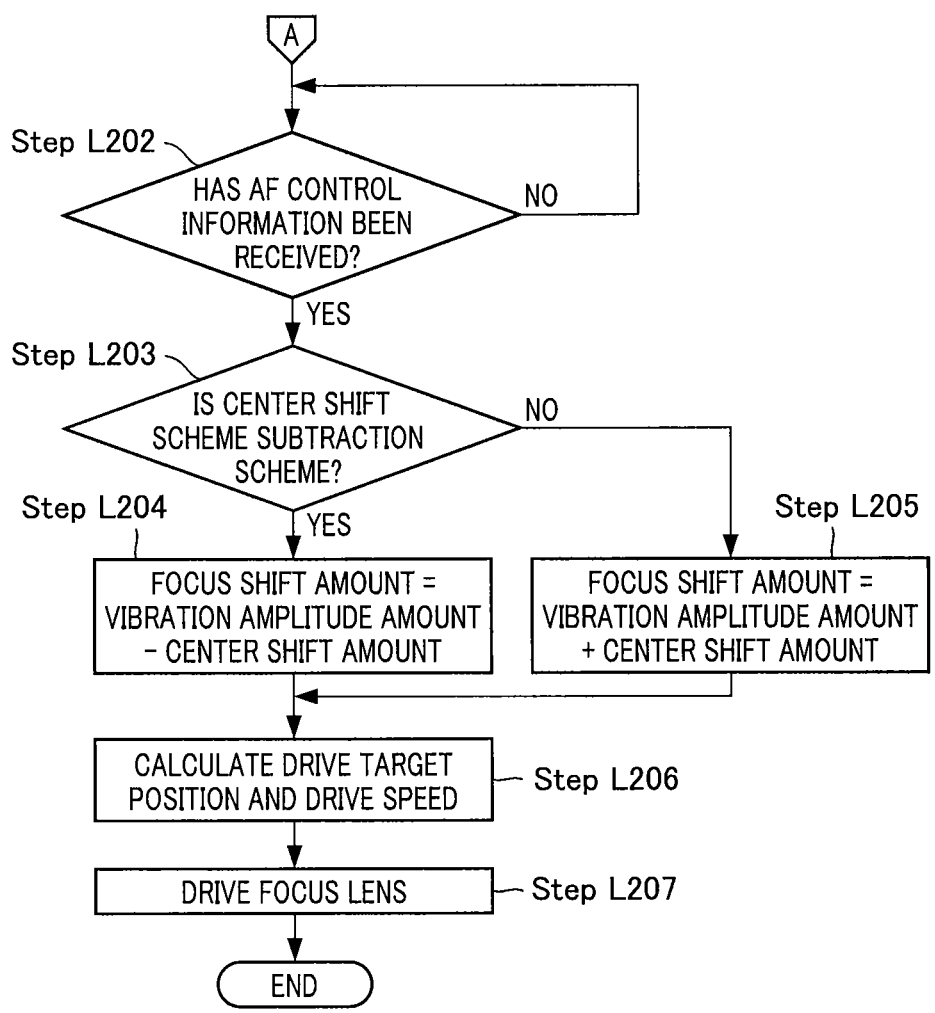
FIG. 19 is a flowchart illustrating the latter half of processing in order to explain AF control according to the second embodiment in conjunction with FIG. 18.

The description turns to processing shown in FIG. 19 performed by the lens microcomputer L106. In Step L202, the lens microcomputer L106 determines whether or not the aforementioned AF control information has been received from the camera microcomputer C106 provided in the camera body C100 attached with the lens unit L100. Only if the above information has been received, the process advances to Step L203.

In Step L203, the lens microcomputer L106 determines whether the center shift scheme included in the received AF control information is either the subtraction scheme or the summation scheme. If the center shift scheme is the subtraction scheme, the process advances to Step L204, whereas if the center shift scheme is the summation scheme, the process advances to Step L205.

In Step L204, the lens microcomputer L106 subtracts a center shift amount "b" from a vibration amplitude amount "a" included in the received AF control information to thereby calculate a focus shift amount as a subtraction shift amount. In other words, the focus shift amount is calculated using the relationship: the focus shift amount=the vibration amplitude amount "a"−the center shift amount "b".

On the other hand, in Step L205, the lens microcomputer L106 adds the center shift amount "b" to the vibration amplitude amount "a" included in the received AF control information to thereby calculate a focus shift amount as a summation shift amount. In other words, the focus shift amount is calculated using the relationship: the focus shift amount=the vibration amplitude amount "a"+the center shift amount "b".

In Step L206, the lens microcomputer L106 calculates the target position and the shift speed of the focus lens L105 using the calculated focus shift amount, and the process advances to Step L207.

In Step L207, the lens microcomputer L106 shifts the focus lens L105 by controlling the drive of the focus actuator L107 in accordance with the calculated target position and shift speed. Then, the process returns to Step L201.

FIG. 29 illustrates the relationship between the position and the focus depth range of the focus lens L105 that is shifted by the calculated focus shift amount with the subtraction scheme, where time is plotted on the horizontal axis and the position of the focus lens L105 (focused position) is plotted on the vertical axis. Horizontal dotted lines denote a position at which the focus lens L105 corresponding to focus control resolution can be stopped.

In FIG. 29, the focus depth range is set to the length of four pulses as calculated in terms of the shift amount of the focus lens L105, whereas the vibration amplitude amount is set to the length of one pulse from the vibration center to both the close-side and the infinity-side (two pulses in total). The vibration center is repeatedly shifted between the close-side and the infinity-side.

Upon center shift in AF control with the subtraction scheme, the focus shift amount (two pulses) obtained by subtracting the center shift amount from the vibration amplitude amount is set. In other words, in AF control with the subtraction scheme, the focus shift amount is set to be smaller than the focus shift amount (three pulses) obtained by adding the center shift amount to the vibration amplitude amount, where the focus shift amount (three pulses) is set upon center shift with the summation scheme.

In other words, in the summation scheme, the focus lens L105 is shifted by the vibration amplitude amount (two pulses) plus the center shift amount (one pulse) in the same direction as the center shift direction which is the focusing direction. In contrast, in the subtraction scheme, the focus lens L105 is shifted by the amount obtained by subtracting the center shift amount (one pulse) from the vibration amplitude amount (two pulses) in the direction opposite to the center shift direction.

With the aid of AF control with the subtraction scheme, the focus shift amount can be set small as compared with that in AF control with the summation scheme while the vibration center is shifted in the focusing direction upon center shift, whereby the possibility of shifting the focus lens L105 outside the range of the shallow depth of focus can be reduced. Consequently, it can be ensured that a focusing fluctuation of an image due to micro vibration of the focus lens L105 including center shift does not occur or is not noticeable.

When the focus lens L105 is shifted by an amount of micro vibration in the direction opposite to the center shift direction in the subtraction scheme, it is preferable that the focusing direction is prevented from being determined by using the change in the focus signal at this time.

On the other hand, the focus shift amount upon center shift is sufficiently increased by AF control with the summation scheme, whereby an excellent responsiveness to AF control can be ensured.

Figure 22:
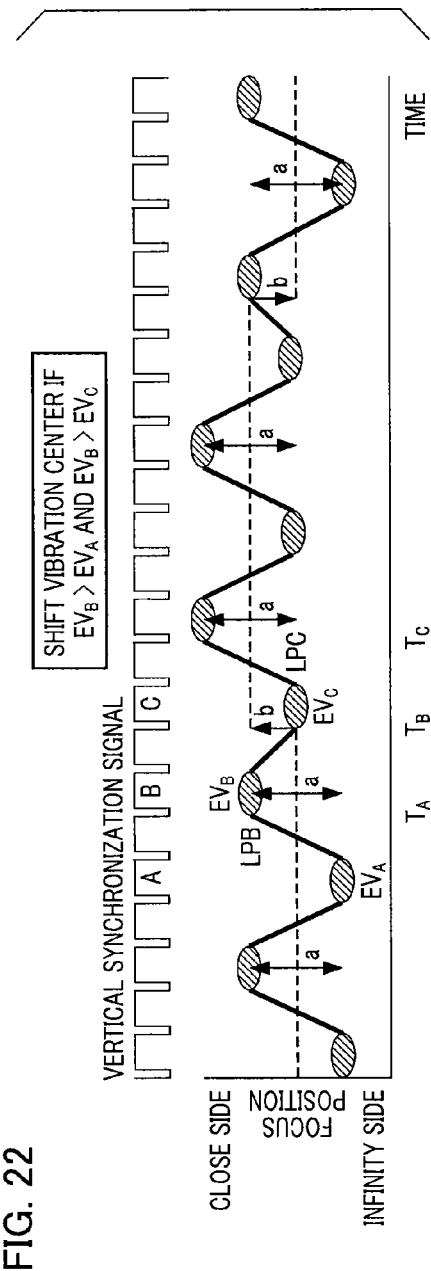
FIG. 22 is a conceptual diagram illustrating subtraction scheme micro vibration control according to the second embodiment.

FIG. 22 shows a case where the focus lens L105 is subject to micro vibration under AF control with the subtraction scheme, where time is plotted on the horizontal axis and the position of the focus lens L105 (focused position) is plotted on the vertical axis, and a single cycle of a vertical synchronization signal of a visible-image signal generated by the imaging element C101 is used as a unit time.

A focus signal $EV_A$ generated from electric charges (see a shaded ellipse) accumulated in the imaging element C101 at a time A is captured by the camera microcomputer C106 at a time $T_A$. A focus signal $EV_B$ generated from electric charges accumulated in the imaging element C101 at a time B is captured by the camera microcomputer C106 at a time $T_B$. Furthermore, a focus signal $EV_C$ generated from electric charges accumulated in the imaging element C101 at a time C is captured by the camera microcomputer C106 at a time $T_C$.

At the time $T_C$, the camera microcomputer C106 compares the focus signals $EV_A$, $EV_B$, and $EV_C$ with each other. If the camera microcomputer C106 determines that $EV_B > EV_A$ and $EV_B > EV_C$, the camera microcomputer C106 performs center shift, whereas if the condition is not satisfied, center shift is not performed. FIG. 22 shows how the vibration center is shifted by an amount of "b" to the close-side when $EV_B > EV_A$ and $EV_B > EV_C$, where the shift amount obtained when the focus lens L105 is shifted from the lens position LPB to the close-side lens position LPC is equal to the amount of the vibration amplitude amount "a"−the center shift amount "b". In other words, the shift of the vibration center is performed by setting the focus shift amount obtained when the direction for shifting the vibration center and the actual direction along which the focus lens L105 is shifted are the same as each other to the amount of the vibration amplitude amount "a"−the center shift amount "b".

After performing the center shift, a new focus signal is acquired by imparting the focus lens L105 to micro vibration with respect to a new vibration center, and then, it is determined whether or not center shift is performed. In this manner, although the period of time until focus determination is completed may be slightly increased in comparison with that to be taken in AF control with the summation scheme, the number of times that center shift is successively performed in the same direction is reduced, so that the shift amount of the focus lens L105 including the center shift can be reduced as shown in FIG. 29.

In other words, in the subtraction scheme, the maximum amplitude amount of the focus lens L105 is equal to the vibration amplitude amount, and the focus lens L105 is subject to micro vibration from the vibration center obtained after the center shift to thereby acquire a new focus signal. Thus, AF control can be realized such that the focus lens L105 is prevented from being overshot by delayed determination when the focus signal begins to decrease, or a focusing fluctuation of an image caused by the shift of the focus lens L105 well beyond the focus depth range does not occur or is not noticeable.

Figure 23:
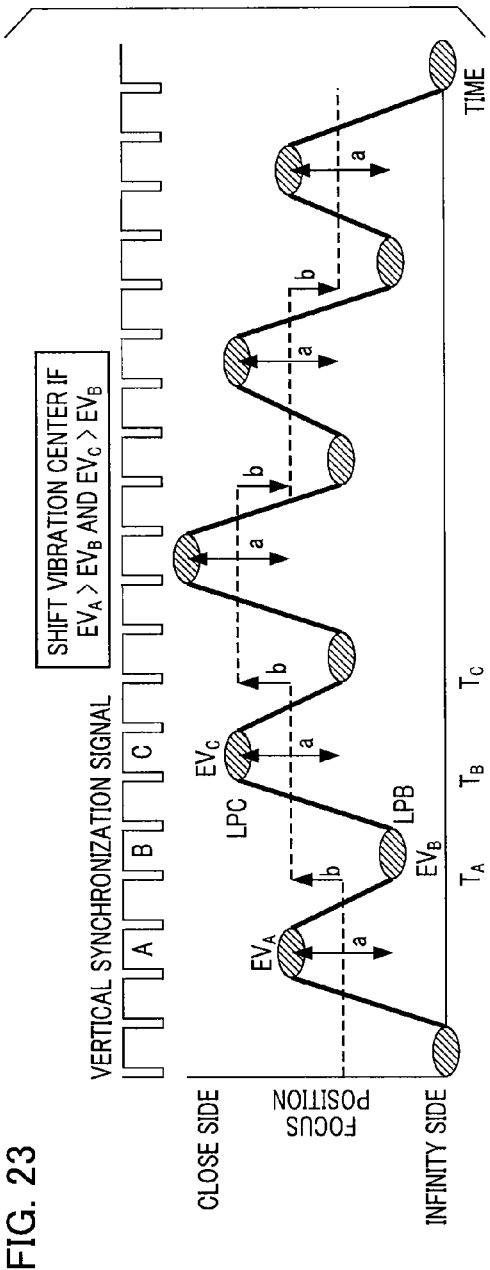
FIG. 23 is a conceptual diagram illustrating summation scheme micro vibration control according to the second embodiment.

FIG. 23 shows a case where the focus lens L105 is subject to micro vibration under AF control with the summation scheme. As in FIG. 22, time is plotted on the horizontal axis and the position of the focus lens L105 (focused position) is plotted on the vertical axis, and a single cycle of a vertical synchronization signal is used as a unit time.

As in FIG. 22, a focus signal $EV_A$ generated from electric charges (see a shaded ellipse) accumulated in the imaging element C101 at a time A is captured by the camera microcomputer C106 at a time $T_A$. A focus signal $EV_B$ generated from electric charge accumulated in the imaging element C101 at a time B is captured by the camera microcomputer C106 at a time $T_B$. Furthermore, a focus signal $EV_C$ generated from electric charge accumulated in the imaging element C101 at a time C is captured by the camera microcomputer C106 at a time $T_C$.

At the time $T_C$, the camera microcomputer C106 compares the focus signals $EV_A$, $EV_B$, and $EV_C$ with each other. If the camera microcomputer C106 determines that $EV_A > EV_B$ and $EV_C > EV_B$, the camera microcomputer C106 performs center shift, whereas if the condition is not satisfied; center shift is not performed. FIG. 23 shows how the vibration center is shifted by an amount of "b" to the close-side when $EV_A > EV_B$ and $EV_C > EV_B$, where the shift amount obtained when the focus lens L105 is shifted from the lens position LPB to the infinity-side lens position LPC is equal to the amount of the vibration amplitude amount "a"+the center shift amount "b". In other words, the shift of the vibration center is performed by setting the focus shift amount obtained when the direction for shifting the vibration center and the actual direction along which the focus lens L105 is shifted are opposite to each other to the amount of the vibration amplitude amount "a"+the center shift amount "b".

In the summation scheme, the maximum amplitude amount of the focus lens L105 is equal to the summation of the vibration amplitude amount and the center shift amount and center shift is successively performed. Consequently, the focus lens L105 may overshoot due to delayed determination when the focus signal begins to decrease. However, when the focus lens L105 is shifted successively in the same direction, a focused state can be achieved quickly. Thus, an excellent responsiveness to AF control can be ensured.

As described above, according to the present embodiment, when the depth of focus of the camera body C100 is shallow, the focus shift amount upon center shift during micro vibration is set small (selects the subtraction scheme) as compared with the case where the depth of focus is deep. In this manner, even if the focus control resolution of the lens unit L100 is coarse, the occurrence of a focusing fluctuation of an image or a noticeable focusing fluctuation of an image due to the shift of the focus lens L105 beyond the range of the shallow depth of focus can be avoided. In addition, when the depth of focus is deep, the focus shift amount upon center shift during micro vibration is set large (selects the summation scheme) as compared with the case where the depth of focus is shallow, and thus, AF control exhibiting an excellent responsiveness can be performed. Therefore, even when various types of lens unit are combined with a camera body, a focusing fluctuation due to micro vibration of the focus lens can be suppressed while ensuring an excellent responsiveness to AF control.

In other words, in the present invention, it is determined whether or not the focus lens shifts outside a predetermined range set on the basis of the depth of focus, which is calculated by using the F-number of an interchangeable lens, when the focus lens by the summation shift amount is shifted. When it is determined that the focus lens does not shift outside the predetermined range even if the focus lens shifts by the summation shift amount, the focus lens is shifted by the summation shift amount, whereby an excellent responsiveness to AF control can be ensured. On the other hand, when it is determined that the focus lens shifts outside the predetermined range if the focus lens shifts by the summation shift amount, the vibration center is shifted in the focusing direction without shifting the focus lens outside the range of the depth of focus, whereby a focusing fluctuation of an image can be avoided. As described above, even when the imaging apparatus of the present invention is combined with various types of interchangeable lenses, an excellent responsiveness to AF control can be ensured so that a focusing fluctuation of an image due to micro vibration of a focus lens in a case of a shallow depth of focus can be set so as not to be recognized by a user.

In the present embodiment, a description has been given of the case where the drive scheme is switched to either the summation scheme or the subtraction scheme depending on whether or not the focus lens L105 shifts beyond the focus depth range by being shifted by the summation shift amount which is the summation of the vibration amplitude amount and the center shift amount. However, the drive scheme may also be switched to either the summation scheme or the subtraction scheme depending on whether or not the focus lens L105 shifts beyond the predetermined ratio of a range (predetermined range set on the basis of the depth of focus) to the focus depth range.

Variant Example of Second Embodiment

In the second embodiment, a description has been given of the case where the camera body calculates the vibration amplitude amount, the center shift amount, and the depth of focus of the focus lens based on the lens unit-specific data received from the lens unit and switches the center shift scheme for use in AF control using the calculated information. However, the vibration amplitude amount and the center shift amount calculated by the camera body are values calculated in consideration of focus position sensitivity at the current vibration center based on an amount of defocus (image-plane amplitude amount and image-plane center shift amount) on an image capturing surface.

In other words, these values are not taken into account; the position of the focus lens after being shifted by the vibration amplitude amount and position sensitivity at the position of the focus lens after center shift. Thus, it may not be accurately determined whether or not the actual focus lens position has exceeded the focus depth range. Therefore, even if the vibration amplitude amount is set such that the change in the focus signal during micro vibration is equal between the close-side and the infinity-side, it is preferable that the vibration amplitude amount be calculated based on the focus position sensitivity after center shift by taking into consideration the change in focus position sensitivity depending on the position of the focus lens.

Figures 30, 31:
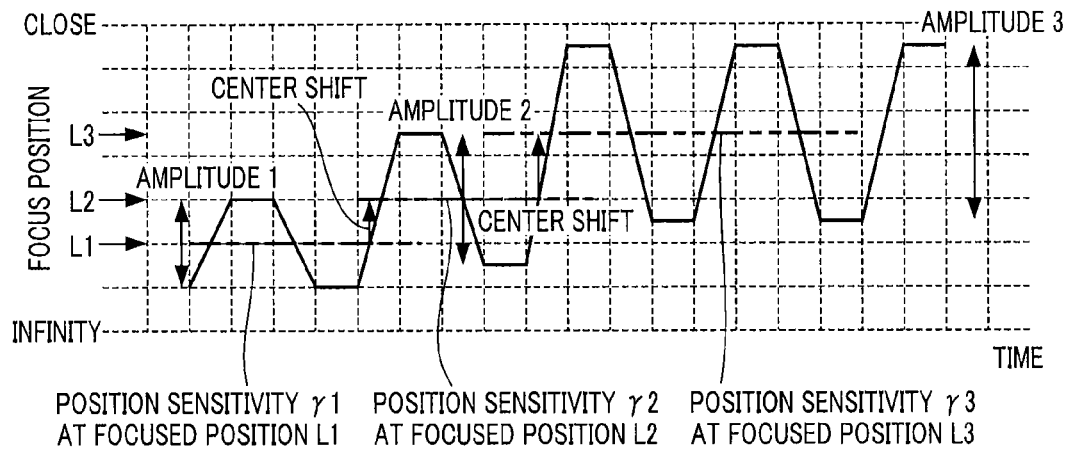
FIG. 30 is a conceptual diagram illustrating micro vibration control in consideration of focus position sensitivity for each focus lens position.
FIG. 31 is a diagram illustrating an example of table data indicating focus position sensitivity for each focus lens position.

In the second embodiment of the present invention, a more desirable vibration amplitude amount is calculated as described above. FIG. 30 illustrates the relationship between the focus lens position upon micro vibration in AF control of the present embodiment and the focus position sensitivity, where time is plotted on the horizontal axis and focus lens position (focus position) is plotted on the vertical axis. Horizontal dotted lines denote a position at which a focus lens corresponding to focus control resolution can be stopped.

In FIG. 30, the focus position sensitivity $\gamma 2$ at the vibration center (focus position L2) after the first center shift is assumed to be $2/3$ of the focus position sensitivity $\gamma 1$ at the vibration center (focus position L1) prior to the first center shift. Also, the focus position sensitivity $\gamma 3$ at the vibration center (lens position L3) after the second center shift is assumed to be $1/2$ of the focus position sensitivity $\gamma 1$ at the vibration center (lens position L1) prior to the second center shift. Also the vibration amplitude amounts (amplitude 2, amplitude 3) after the first and the second center shift are assumed to be 1.5 times and 2 times of the vibration amplitude amount (amplitude 1) prior to the first and the second center shift, respectively.

In the second embodiment, a description has been given of the case where the position of the focus lens after the shift including the center shift is controlled so as to barely exceed the focus depth range. However, the vibration amplitude amount after the center shift to the close-side may actually increase as shown in FIG. 30. In this case, even if the subtraction scheme is employed, the focus lens position exceeds the focus depth range, whereby a focusing fluctuation of an image may be recognized by user.

In other words, even if a summation shift amount is calculated in consideration only of the focus position sensitivity $\gamma c$ at the current vibration center, and then, the center shift scheme is switched to the subtraction scheme based on the summation shift as described in the second embodiment, the position of the focus lens may actually exceed the focus depth range.

Thus, in a variant example of the second embodiment, not only the focus position sensitivity at the current vibration center but also the position sensitivity at the position of the focus lens after being shifted are taken into consideration. If the position sensitivity for each focus lens position is known in advance, the position of the focus lens after being shifted by the vibration amplitude amount, and the vibration amplitude amount and the center shift amount at the position of the focus lens after center shift can be calculated with high accuracy. Thus, it can be determined whether or not the focus lens shifts beyond the focus depth range more accurately than that in the first described variant example of the second embodiment.

As shown in FIG. 31, the focus position sensitivity is lens unit-specific data that is determined for each variable-power lens position (zoom position) and each focus lens position (focused position). As shown in FIG. 31, focus position sensitivity data may be stored in a memory as focus position sensitivity table data corresponding to a plurality of zoom positions and a plurality of focus positions.

In the table data shown in FIG. 31, zoom position (focal distance) is arranged in a row direction in which the variable "v" changes and focused position (object distance) is arranged in a column direction in which the variable "n" changes. An infinity object distance is represented by n=0, and the object distance changes to the close end side as the variable "n" increases. Also, a wide end is represented by v=0. The focal distance increases as the variable "v" increases, and a telephoto end is represented by v=s. The focus position sensitivity corresponding to a zoom position v and a focused position n is represented by the product of $\gamma$, v, and n.

If such table data is supplied (transmitted) from a lens unit to a camera body, the camera body can determine whether or not the focus lens shifts beyond the focus depth range more accurately than that of the second embodiment. However, the data amount of focus position sensitivity is large in amount, and thus, it is impractical to transmit table data to the camera body via communication each time an interchangeable lens is replaced. In addition, since focus position sensitivity is determined not only by the position of the focus lens but also by the relationship with other lenses, it is difficult to store table data corresponding to numerous interchangeable lenses including various types of optical systems in a memory provided in a camera body in advance.

Accordingly, in the present embodiment, an allowable diameter of the circle of confusion for the imaging element, AF control information (micro vibration drive operation steps, center shift direction and an amount of defocus), and the like are transmitted from a camera body to a lens unit. The lens unit calculates the shift amount of the focus lens based on information received from the camera body to thereby control the position of the focus lens. Furthermore, the lens unit determines whether or not the center shift scheme is switched using lens unit-specific data such as focus control resolution, focus position sensitivity, or the like and AF control information acquired from the camera body. If the center shift scheme is switched, a switching instruction is transmitted from the lens unit to the camera body. The camera body receives the instruction to thereby switch the center shift scheme.

Figure 24:
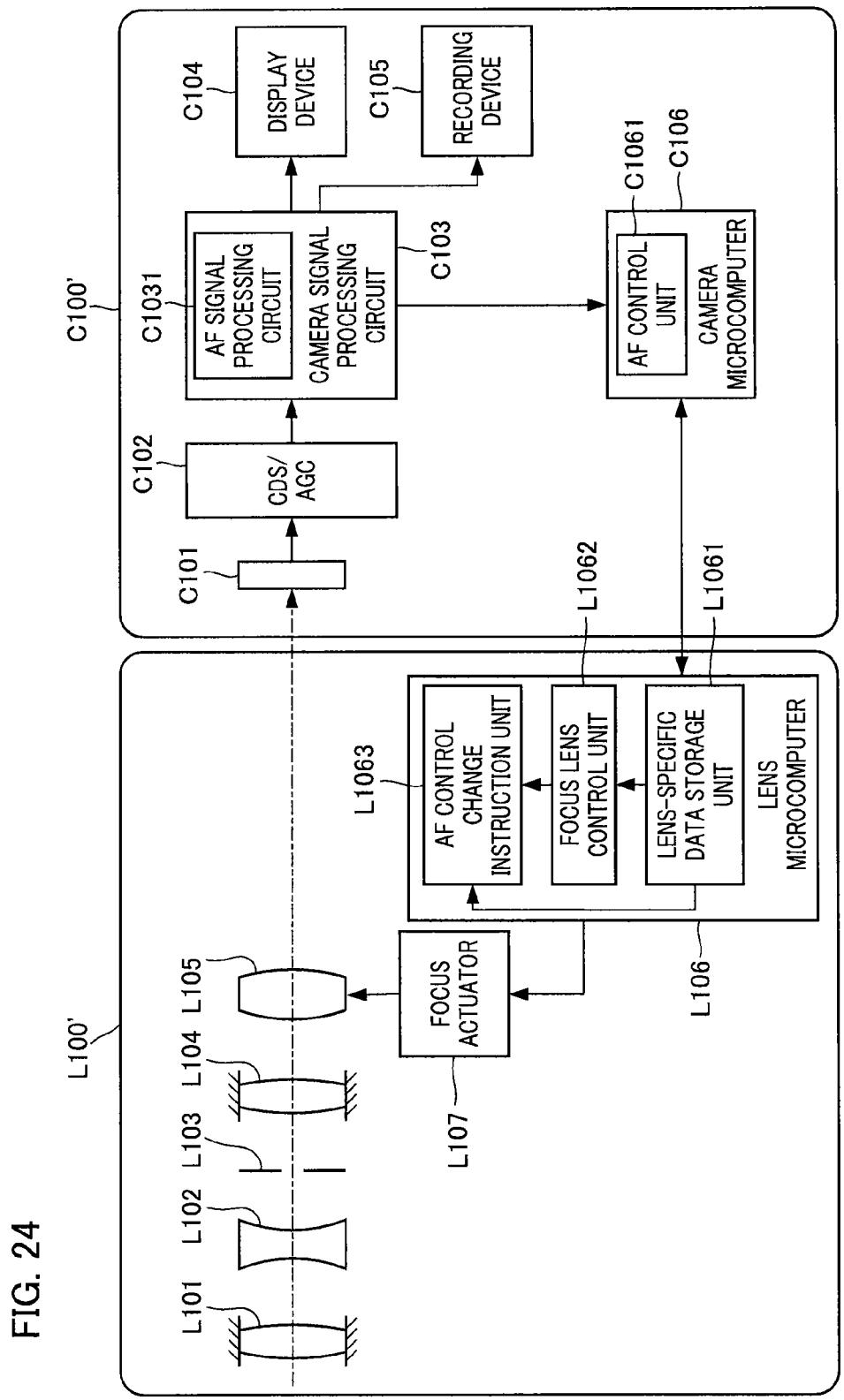
FIG. 24 is a block diagram illustrating the configuration of a video camera according to a variant example of the second embodiment.

FIG. 24 shows the configuration of a lens exchange type camera system that is constituted by an interchangeable lens and an imaging apparatus according to a variant example of the second embodiment of the present invention. The reference numeral L100' denotes a lens unit that serves as an interchangeable lens. The reference numeral C100' denotes a camera body that serves as an imaging apparatus. The lens unit L100' is attachable to or detachable from the camera body C100'. In the present variant example, an AF control change instruction unit L1063 is provided in the lens microcomputer L106'. The AF control change instruction unit L1063 determines whether or not the center shift scheme for use in AF control is switched (changed) based on lens unit-specific data stored in the lens-specific data storage unit L1061 and AF control information generated by the focus lens control unit L1062. The AF control change instruction unit L1063 transmits the change instruction to the AF control unit C1061 within the camera microcomputer C106' provided in the camera body C100'. The other configuration is the same as that shown in FIG. 17, and the same components as those shown in FIG. 17 are designated by the same reference numerals and explanation thereof will be omitted.

Figure 25:
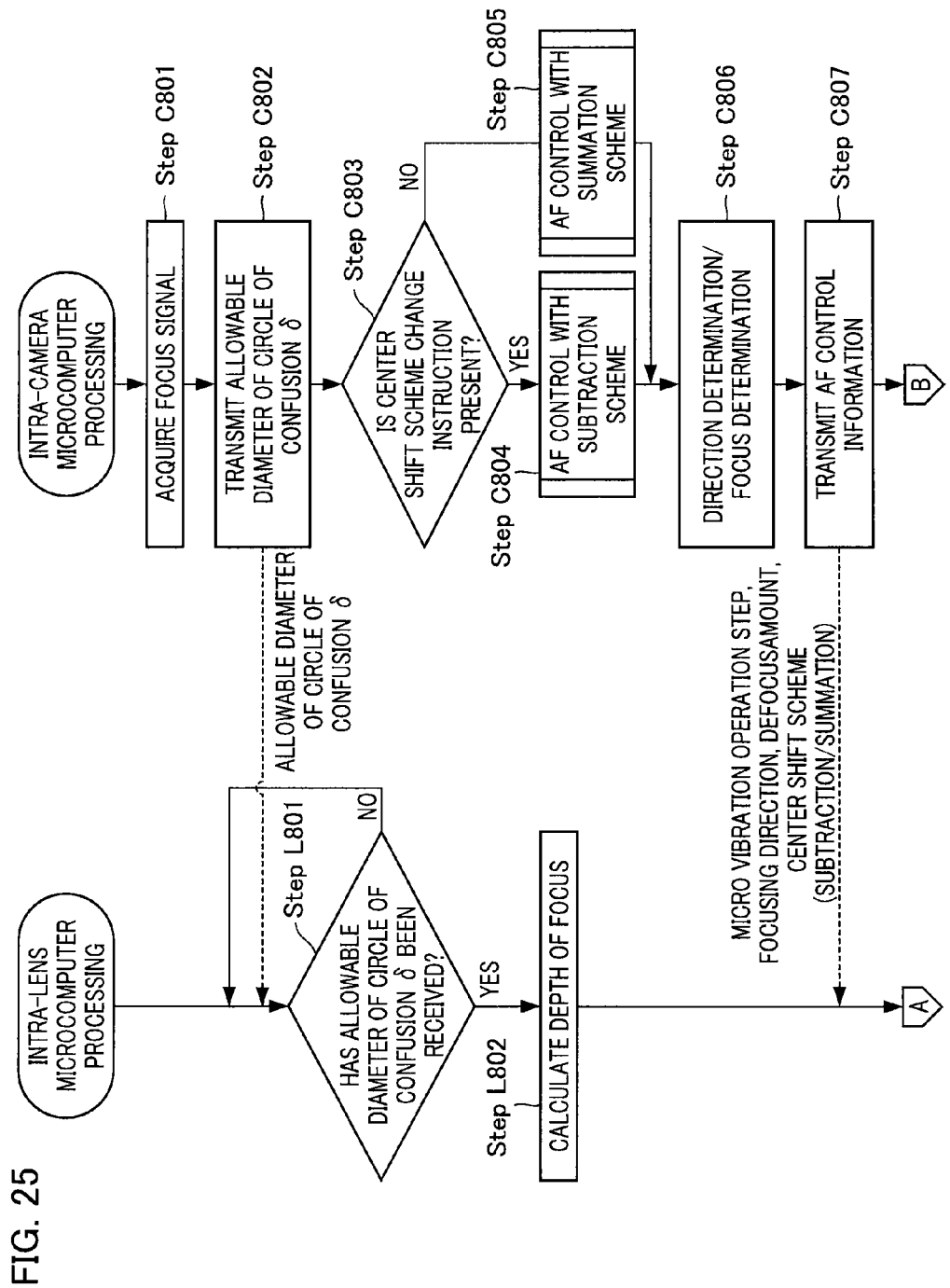
FIG. 25 is a flowchart illustrating the former half of processing in order to explain AF control according to a variant example of the second embodiment in conjunction with FIG. 26.

Next, a description will be given of AF control performed by the lens microcomputer L106' (mainly, the focus lens control unit L1062) and the camera microcomputer C106' (mainly, the AF control unit C1061) with reference to the flowchart shown in FIGS. 25 and 26. The lens microcomputer L106' and the camera microcomputer C106' execute AF control in accordance with a computer program.

In Step L801, the lens microcomputer L106' determines whether or not the allowable diameter of the circle of confusion δ has been received from the camera microcomputer C106'. Only if the allowable diameter of the circle of confusion δ has been received, the process advances to Step L802.

On the other hand, in Step C801, the camera microcomputer C106' acquires a focus signal generated by the AF signal processing circuit C1031 provided in the camera signal processing circuit C103.

In Step C802, the camera microcomputer C106' transmits information about the allowable diameter of the circle of confusion δ to the lens microcomputer L106'.

In Step C803, the camera microcomputer C106' determines whether or not a center shift scheme change instruction to be described below has been provided from the lens microcomputer L106'. If the change instruction has been provided, the process advances to Step C804, whereas if the change instruction has not been provided, the process advances to Step C805.

In Step C804, the camera microcomputer C106' performs AF control with the subtraction scheme described in the second embodiment using the focus signal acquired in Step C801. Then, AF control information including information such as operation steps of micro-driving in AF control, a center shift direction (infinity direction/close direction), an amount of defocus on an image plane (image-plane amplitude amount and image-plane center shift amount), a center shift scheme, and the like is set.

In Step C805, the camera microcomputer C106' performs AF control with the summation scheme described in the second embodiment using the focus signal acquired in Step C801 to thereby set AF control information as in Step C204.

In Step C806, the camera microcomputer C106' performs the aforementioned focusing direction determination and focus determination, and the process advances to Step C807.

In Step C807, the camera microcomputer C106' transmits the AF control information set in Steps C804 and C805 to the lens microcomputer L106.

On the other hand, in Step L802, the lens microcomputer L106' calculates the depth of focus Fδ based on the allowable diameter of the circle of confusion δ received from the camera microcomputer C106' and the F-number determined by the aperture value.

Figure 26:
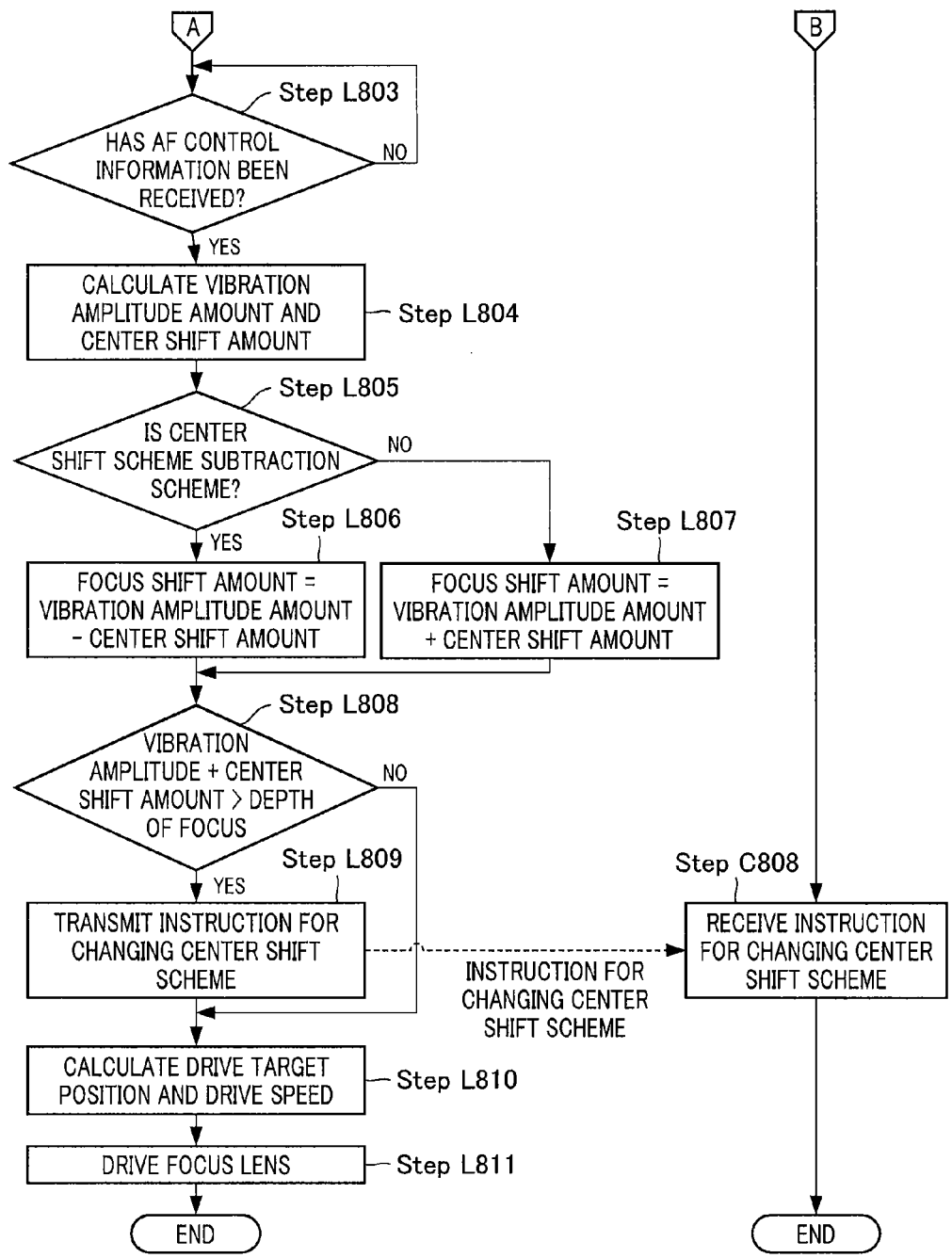
FIG. 26 is a flowchart illustrating the latter half of processing in order to explain AF control according to a variant example of the second embodiment in conjunction with FIG. 25
Figure 27:
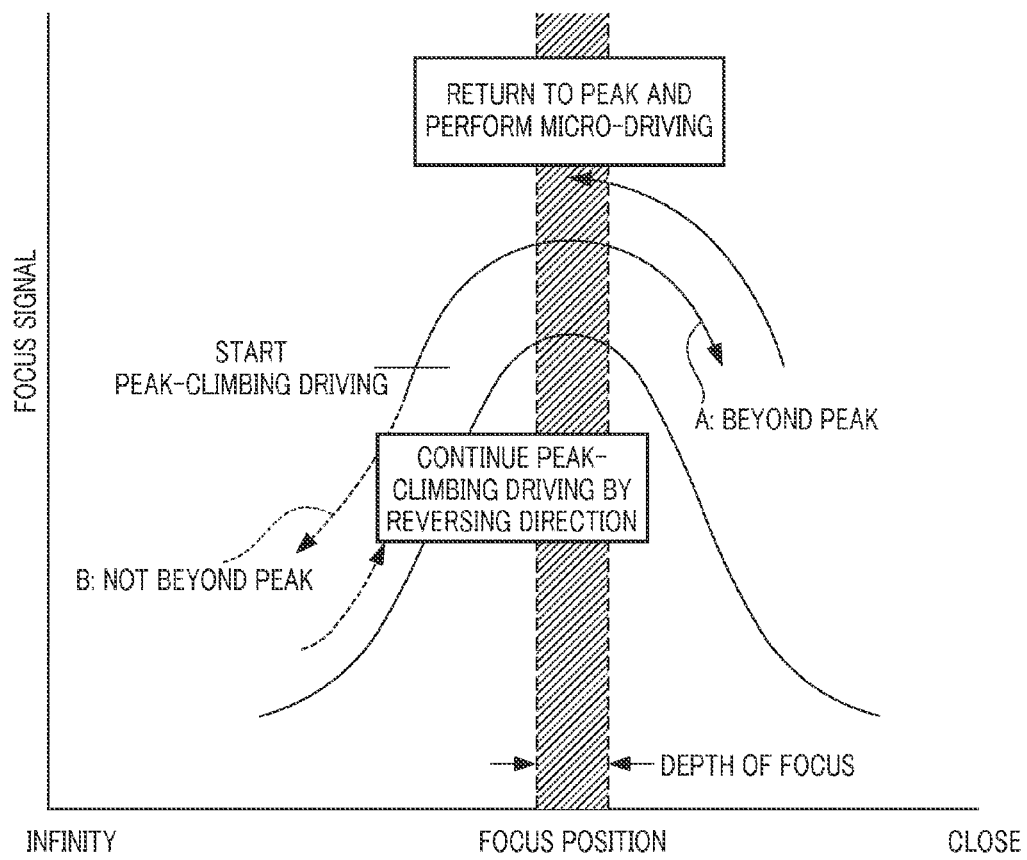
FIG. 27 is a conceptual diagram illustrating peak-climbing driving control during AF control.

Turning to FIG. 26, in Step L803, the lens microcomputer L106' determines whether or not the aforementioned AF control information has been received from the camera microcomputer C106'. Only if the aforementioned AF control information has been received, the process advances to Step L804.

In Step L804, the lens microcomputer L106' calculates a vibration amplitude amount and a center shift amount based on the received AF control information and the focus control resolution and the focus position sensitivity stored in the lens-specific data storage unit L1061. Then, the process advances to Step L805.

For example, the image-plane amplitude is assumed to be a value obtained by multiplying the depth of focus Fδ by a predetermined ratio α (<1). At this time, in consideration of the focus control resolution ΔF and the focus position sensitivity γvn corresponding to the zoom position v and the focused position n, the vibration amplitude amount can be calculated by Formula (3).

$$\text{Vibration amplitude amount} = (F\delta \times \alpha / \gamma vn)/\Delta F \quad (3)$$

Also, the image-plane center shift amount is assumed to be a value obtained by multiplying the depth of focus Fδ by a predetermined ratio β (<1). At this time, in consideration of the focus control resolution ΔF and the focus position sensitivity γvn corresponding to the zoom position v and the focused position n, the center shift amount can be calculated by Formula (4).

$$\text{Center shift amount} = (F\delta \times \beta / \gamma vn)/\Delta F \quad (4)$$

In Step L805, the lens microcomputer L106' determines whether the center shift scheme received from the camera microcomputer C106' is either the subtraction scheme or the summation scheme. If the center shift scheme is the subtraction scheme, the process advances to Step L806, whereas if the center shift scheme is the summation scheme, the process advances to Step L807.

In Step L806, the lens microcomputer L106' subtracts the center shift amount from the vibration amplitude amount included in the AF control information received from the camera microcomputer C106' to thereby calculate a focus shift amount as a subtraction shift amount. In other words, the focus shift amount is calculated using the relationship: the focus shift amount=the vibration amplitude amount−the center shift amount.

As in the second embodiment, upon center shift in AF control with the subtraction scheme, the focus shift amount (two pulses) obtained by subtracting the center shift amount from the vibration amplitude amount is set. In other words, in AF control with the subtraction scheme, the focus shift amount is set to be smaller than the focus shift amount (three pulses) obtained by adding the center shift amount to the vibration amplitude amount, where the focus shift amount (three pulses) is set upon center shift with the summation scheme.

In other words, in the subtraction scheme, the focus lens L105 is shifted by an amount obtained by subtracting the center shift amount (one pulse) from the vibration amplitude amount (two pulses) in the direction opposite to the center shift direction.

In this manner, the focus shift amount can be set small as compared with that in AF control with the summation scheme while the vibration center is shifted in the focusing direction, whereby the possibility of shifting the focus lens L105 outside the range of the shallow depth of focus can be reduced. Consequently, it can be ensured that a focusing fluctuation of an image due to micro vibration of the focus lens L105 including center shift does not occur or is not noticeable.

On the other hand, in Step L807, the lens microcomputer L106' adds the center shift amount "b" to the vibration amplitude amount "a" included in the AF control information received from the camera microcomputer C106' to thereby calculate a focus shift amount as a summation shift amount. In other words, the focus shift amount is calculated using the relationship: the focus shift amount=the vibration amplitude amount "a"+the center shift amount "b".

As described above, in the summation scheme, the focus lens L105 is shifted by the vibration amplitude amount (two pulses) plus the center shift amount (one pulse) in the same direction as the center shift direction. In this manner, the focus shift amount including center shift is sufficiently increased, whereby an excellent responsiveness to AF control can be ensured.

In Step L808, the lens microcomputer L106' determines whether or not the focus shift amount, which is a summation shift amount obtained by adding the vibration amplitude amount to the center shift amount, exceeds the focus depth range, that is, determines whether or not the focus lens L105 shifts beyond the focus depth range. The focus depth range corresponds to a predetermined range set on the basis of the depth of focus. If the lens microcomputer L106' determines that the focus lens L105 shifts beyond the focus depth range (second case), the process advances to Step L809, whereas if the lens microcomputer L106' determines that the focus lens L105 does not shift beyond the focus depth range (first case), the process advances to Step L801.

In Step L809, the lens microcomputer L106' transmits an instruction for changing the center shift scheme from the summation scheme to the subtraction scheme to the camera microcomputer C106.

In Step L810, the lens microcomputer L106' calculates the target position and the shift speed of the focus lens L105 from the calculated focus shift amount, and the process advances to Step L811.

In Step L811, the lens microcomputer L106' shifts the focus lens L105 by controlling the drive of the focus actuator L107 in accordance with the calculated target position and shift speed. Then, the process returns to Step L801.

On the other hand, in Step C808, the camera microcomputer C106' receives the center shift scheme change instruction transmitted from the lens microcomputer L106'. The camera microcomputer C106' switches the center shift scheme to either the subtraction scheme or the summation scheme in the processes in Steps C803 to C805 in response to the change instruction.

As described above, in the present variant example, the allowable diameter of the circle of confusion and AF control information are supplied from the camera body C100' to the lens unit L100'. Then, the lens unit L100' calculates the focus depth range and the focus shift amount using information to thereby determine whether or not a focusing fluctuation of an image due to micro vibration of the focus lens including center shift occurs (is noticeable) based on the calculated relationship between the two. Furthermore, the lens unit L100' transmits an instruction for switching the center shift scheme based on the results of determination. In this manner, even if the depth of focus of the camera body C100' is shallow and the focus control resolution of the lens unit L100' is coarse, the occurrence of a focusing fluctuation of an image or a noticeable focusing fluctuation of an image due to micro vibration of the focus lens including center shift can be avoided. On the other hand, when the depth of focus is deep, an excellent responsiveness to AF control can be ensured.

Therefore, even when various types of lens unit are combined with a camera body, a focusing fluctuation due to micro vibration of the focus lens can be suppressed while ensuring an excellent responsiveness to AF control.

As described above, according to the imaging apparatuses of the embodiments, an imaging apparatus and an interchangeable lens that can perform AF control exhibiting an excellent responsiveness while suppressing a focusing fluctuation of an image due to micro vibration of the focus lens may be provided.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-004559 filed Jan. 13, 2012, and Japanese Patent Application No. 2012-004531 filed Jan. 13, 2012 which are hereby incorporated by reference herein in their entirety.

What is claimed is:

1. An imaging apparatus for communicating with a lens apparatus comprising a focus lens, the imaging apparatus comprising:
   a signal processing unit configured to generate an evaluation value for focus adjustment from an imaging signal obtained by an imaging element;
   a transmitting unit configured to transmit information corresponding to the vibration center and the vibration amplitude of the focus lens, wherein the lens apparatus is configured to vibrate the focus lens based on the received information corresponding to the vibration center and the vibration amplitude;

a camera controlling unit configured to transmit to the lens apparatus a drive command for shifting the focus lens to a position corresponding to a focal point detected by use of the evaluation value, wherein the camera controlling unit is operable to instruct to control a wobbling operation which is an operation that vibrates the focus lens in an optical axis direction at a predetermined amplitude; and an acquiring unit configured to acquire from the lens apparatus data indicating the amount of a change in image magnification, wherein the camera controlling unit is configured to determine a first direction which is a direction that the evaluation value increases by the wobbling operation, wherein the camera controlling unit is configured to, in a case of performing center shift for shifting the vibration center of the focus lens in the first direction, (a) perform control so as to shift the vibration center of the focus lens in the first direction in a first mode if the amount of change in image magnification relative to the shift amount of the focus lens is a first amount of change, which is greater than a second amount of change, (b) perform control so as to shift the vibration center of the focus lens in the first direction in a second mode if the amount of change in image magnification relative to the shift amount of the focus lens is the second amount of change, and (c) perform control so as to restrict shifting the vibration center of the focus lens in the first direction if the amount of change in image magnification relative to the shift amount of the focus lens is greater than the first amount of change, and wherein, in the first mode, the shift amount of the focus lens becomes less than the predetermined amplitude when the focus lens shifts in a direction opposite to the first direction, and, in the second mode, the shift amount of the focus lens becomes greater than the predetermined amplitude when the focus lens shifts in a direction corresponding to the first direction.

2. The imaging apparatus according to claim 1, wherein the second amount of change indicates a threshold value, the camera controlling unit is configured to increase the vibration amplitude when the amount of change in image magnification relative to the shift amount of the focus lens is equal to or less than the threshold amount.

3. The imaging apparatus according to claim 1, wherein, the camera controlling unit is configured to, in the case of determining that the amount of change in image magnification relative to the shift amount of the focus lens in the vicinity of the focal point is greater than the first amount of change, change a drive scheme to a first drive scheme in which drive amplitude upon center shift is limited to be less than amplitude upon vibration, and in the case of determining that the amount of change in image magnification relative to the shift amount of the focus lens in the vicinity of the focal point is equal to or less than the second amount of change, changes a drive scheme to a second drive scheme in which drive amplitude upon center shift can be set to be greater than the amplitude upon vibration.

4. The imaging apparatus according to claim 3, wherein, the camera controlling unit is configured to in a case of changing the drive scheme to the first drive scheme, subtract a center shift amplitude, which is the shift width of the vibration center, from the amplitude upon vibration, and in the case of changing the drive scheme to the second drive scheme, add the center shift amplitude to the amplitude upon vibration.

5. The imaging apparatus according to claim 1, wherein, the camera controlling unit is configured to, in a case of determining that the amount of change in image magnification relative to the shift amount of the focus lens in the vicinity of the focal point is greater than a threshold value, determine a drive direction by comparing a previous focus evaluation value with a current focus evaluation value and shift the focus lens by a predetermined amount in the determined direction.

6. The imaging apparatus according to claim 1, wherein, the camera controlling unit is configured to, in the case of determining that the amount of change in image magnification relative to the shift amount of the focus lens in the vicinity of the focal point is greater than a threshold value, perform drive control for determining the drive direction of the focus lens by detecting a focusing direction on the basis of a change in the evaluation value obtained when the focus lens is shifted without vibration in the optical axis direction, and wherein, the camera controlling unit is configured to, in a case of determining that the amount of change in image magnification relative to the shift amount of the focus lens in the vicinity of the focal point is equal to or less than the threshold value, perform drive control for determining the drive direction of the focus lens by detecting a focusing direction on the basis of the change in evaluation value obtained when the focus lens is vibrated in the optical axis direction and perform drive control for shifting the vibration center of the focus lens in the detected focusing direction.

7. The imaging apparatus according to claim 1, wherein, the camera controlling unit is configured to, in a case of the amount of change in image magnification relative to the shift amount of the focus lens in the vicinity of the focal point is greater than the threshold amount, perform a control to shift the focus lens to a position corresponding to the focal point after focus determination and then acquire an evaluation value from the signal processing unit, and in a case of determining that a difference amount between the evaluation value and the previously acquired evaluation value is equal to or less than a threshold value, perform control to inhibit vibration or shift of the focus lens.

8. The imaging apparatus according to claim 1, wherein the camera controlling unit is configured to transmit data for allowable circle of confusion to the lens apparatus, and in response receive, from the lens apparatus, data indicating an amount of change in image magnification per the depth of focus, which has been computed by the lens apparatus on the basis of the transmitted data for allowable circle of confusion.

9. A lens apparatus for communicating with an imaging apparatus, the imaging apparatus comprising a signal processing unit configured to generate an evaluation value for focus adjustment from an imaging signal obtained by an imaging element and a camera controlling unit configured to transmit to the lens apparatus a drive command for shifting the focus lens to a position corresponding to a focal point detected by use of the evaluation value, wherein the camera controlling unit is operable to instruct to control a wobbling operation which is an operation that vibrates the focus lens in an optical axis direction at a predetermined amplitude, the lens apparatus comprising:

a transmitting unit configured to transmit data indicating an amount of change in image magnification relative to the shift amount of the focus lens to the imaging apparatus, wherein the transmission of the amount of change in image magnification is periodically repeated; and a lens control unit configured to receive information corresponding to the vibration center and the vibration amplitude of the focus lens from the camera control unit and vibrate the focus lens based on the received the information corresponding to the vibration center and the vibration amplitude, wherein the receipt of the information is periodically repeated, and wherein the camera controlling unit is configured to determine a first direction which is a direction that the evaluation value increases by the wobbling operation, wherein the camera controlling unit is configured to, in a case of performing center shift for shifting the vibration center of the focus lens in the first direction, (a) perform control so as to shift the vibration center of the focus lens in the first direction in a first mode if the amount of change in image magnification relative to the shift amount of the focus lens is a first amount of change, which is greater than a second amount of change, (b) perform control so as to shift the vibration center of the focus lens in the first direction in a second mode if the amount of change in image magnification relative to the shift amount of the focus lens is the second amount of change, and (c) perform control so as to restrict shifting the vibration center of the focus lens in the first direction if the amount of change in image magnification relative to the shift amount of the focus lens is greater than the first amount of change, and wherein, in the first mode, the shift amount of the focus lens becomes less than the predetermined amplitude when the focus lens shifts in a direction opposite to the first direction, and, in the second mode, the shift amount of the focus lens becomes greater than the predetermined amplitude when the focus lens shifts in a direction corresponding to the first direction.

10. The lens apparatus according to claim 9, wherein the second amount of change indicates a threshold value, the vibration amplitude is increased when the amount of change in image magnification relative to the shift amount of the focus lens is equal to or less than the threshold amount.

11. The lens apparatus according to claim 9, wherein the lens control unit is configured to receive data for an allowable circle of confusion from the camera controlling unit, and to compute data indicating the amount of change in image magnification per the depth of focus based on the data for allowable circle of confusion and to transmit the computed data to the camera controlling unit.

12. The lens apparatus according to claim 9, wherein a time period of the transmission of the amount of change in image magnification is the same as the time period of the receipt of the information corresponding to the vibration center and the vibration amplitude.

13. The lens apparatus according to claim 9, wherein, when the camera controlling unit determines that the amount of change in image magnification relative to the shift amount of the focus lens in the vicinity of the focal point is greater than the second amount of change, the camera controlling unit changes a drive scheme to a first drive scheme in which drive amplitude upon center shift is limited to be less than amplitude upon vibration, whereas when the camera controlling unit determines that the amount of change in image magnification relative to the shift amount of the focus lens in the vicinity of the focal point is equal to or less than the second amount of change, the camera controlling unit changes a drive scheme to a second drive scheme in which drive amplitude upon center shift set to be greater than amplitude upon vibration.

14. The lens apparatus according to claim 13, wherein, when the camera controlling unit changes the drive scheme to the first drive scheme, the camera controlling unit subtracts center shift amplitude, which is the shift width of the vibration center, from amplitude upon vibration, whereas when the camera controlling unit changes the drive scheme to the second drive scheme, the camera controlling unit adds the center shift amplitude to the amplitude upon vibration.

15. The lens apparatus according to claim 9, wherein, when the camera controlling unit determines that the amount of change in image magnification relative to the shift amount of the focus lens in the vicinity of the focal point is greater than a threshold value, the camera controlling unit determines a drive direction by comparing a previous evaluation value with a current evaluation value and the lens control unit shifts the focus lens by a predetermined amount in the determined direction.

16. The lens apparatus according to claim 9, wherein, when the camera controlling unit determines that the amount of change in image magnification relative to the shift amount of the focus lens in the vicinity of the focal point is greater than a threshold value, the camera controlling unit performs drive control for determining the drive direction of the focus lens by detecting a focusing direction on the basis of the change in the evaluation value obtained when the focus lens is shifted without vibration in the optical axis direction, and wherein, when the camera controlling unit determines that the amount of change in image magnification relative to the shift amount of the focus lens in the vicinity of the focal point is equal to or less than a threshold value, the camera controlling unit detects a focusing direction on the basis of the change in the evaluation value obtained when the focus lens is vibrated in the optical axis direction and performs drive control for shifting the vibration center of the focus lens in the detected focusing direction.

17. The lens apparatus according to claim 9, wherein, when the amount of change in image magnification relative to the shift amount of the focus lens in the vicinity of the focal point is greater than a threshold value, the camera controlling unit controls to shift the focus lens to a position corresponding to the focal point after focus determination and then acquires the evaluation value from the signal processing unit, and when the camera controlling unit determines that a difference amount between the evaluation value and the previously acquired evaluation value is equal to or less than the threshold value, the camera controlling unit inhibits vibration or shift of the focus lens.

18. The lens apparatus according to claim 9, wherein the camera controlling unit transmits data for allowable circle of confusion to the lens apparatus, and receives data indicating the amount of change in image magnification per the depth of focus, which has been computed on the basis of the data for allowable circle of confusion, from the lens apparatus.

19. A method performed by an imaging apparatus for detachably mounting a lens apparatus comprising a focus lens, the method comprising:

generating, by a signal processing unit, an evaluation value for focus adjustment from an imaging signal obtained by an imaging element of the imaging apparatus;

transmitting, by a transmitting unit, information corresponding to the vibration center and the vibration amplitude of the focus lens for vibrating the focus lens based on the received information corresponding to the vibration center and the vibration amplitude;

transmitting, by a camera controlling unit, a drive command for shifting the focus lens to a position corresponding to a focal point detected by use of the evaluation value to the lens apparatus, wherein the camera controlling unit is operable to instruct to control a wobbling operation which is operation that vibrates the focus lens in an optical axis direction at a predetermined amplitude; and acquiring, by an acquiring unit, data indicating an amount of change in image magnification relative to the shift amount of the focus lens from the lens apparatus; and wherein, in the transmitting the drive command by the camera controlling unit, determining a first direction which is a direction that the evaluation value increases by the wobbling operation, performing control in a case of performing center shift for shifting the vibration center of the focus lens in the first direction, (a) so as to shift the vibration center of the focus lens in the first direction in a first mode if the amount of change in image magnification relative to the shift amount of the focus lens is a first amount of change, which is greater than a second amount of change, (b) so as to shift the vibration center of the focus lens in the first direction in a second mode if the amount of change in image magnification relative to the shift amount of the focus lens is the second amount of change, and (c) so as to restrict shifting the vibration center of the focus lens in the first direction if the amount of change in image magnification relative to the shift amount of the focus lens is greater than the first amount of change, and wherein, in the first mode, the shift amount of the focus lens becomes less than the predetermined amplitude when the focus lens shifts in a direction opposite to the first direction, and, in the second mode, the shift amount of the focus lens becomes greater than the predetermined amplitude when the focus lens shifts in a direction corresponding to the first direction.

20. A method performed by an imaging apparatus detachably mounting a lens apparatus provided with a focus lens, the method comprising:

generating an evaluation value for focus adjustment from an imaging signal obtained by an imaging element of the imaging apparatus;

transmitting information corresponding to the vibration center and the vibration amplitude of the focus lens to the lens apparatus wherein the lens apparatus is configured to vibrate the focus lens based on the received information corresponding to the vibration center and the vibration amplitude;

transmitting to the lens apparatus a drive command for shifting the focus lens to a position corresponding to a focal point detected by use of the evaluation value; and acquiring from the lens apparatus data indicating an amount of change in image magnification, determining whether or not the amount of change in image magnification relative to the shift amount of the focus lens in the vicinity of a focal point is greater than a threshold value using the data indicating the amount of change in image magnification, the vibration amplitude for vibrating the focus lens, and the amount of center shift;

performing, if it is determined, in the determining, that the amount of change in image magnification relative to the vibration amplitude is greater than a threshold value, drive control for determining the drive direction of the focus lens by detecting a focusing direction on the basis of the change in evaluation value obtained when the focus lens is shifted without vibration in the optical axis direction; and detecting, if it is determined, in the determining, that the amount of change in image magnification relative to the vibration amplitude is equal to or less than a threshold value, a focusing direction on the basis of the change in the evaluation value obtained when the focus lens is vibrated in the optical axis direction and performing drive control for shifting the vibration center of the focus lens in the detected focusing direction.

21. A method performed by a lens apparatus for communicating with an imaging apparatus comprising signal processing unit for generating an evaluation value for focus adjustment from an imaging signal obtained by an imaging element and camera controlling unit for transmitting to the lens apparatus a drive command for shifting the focus lens to a position corresponding to a focal point detected by use of the evaluation value, wherein the camera controlling unit is operable to instruct to control a wobbling operation which is operation that vibrates the focus lens in an optical axis direction at a predetermined amplitude, the method comprising:

transmitting, by a transmitting unit, data indicating an amount of change in image magnification relative to a shift amount of the focus lens to the imaging apparatus, wherein the transmission of the amount of change in image magnification is periodically repeated; and receiving periodically, by a lens control unit, information corresponding to the vibration center and the vibration amplitude of the focus lens from the camera control unit; and vibrating, by the lens control unit, the focus lens based on the received the information corresponding to the vibration center and the vibration amplitude; and wherein, in the vibrating the focus lens by the lens control unit, determining a first direction which is a direction that the evaluation value increases by the wobbling operation, performing control, in a case of performing center shift for shifting the vibration center of the focus lens in the first direction, (a) so as to shift the vibration center of the focus lens in the first direction in a first mode if the amount of change in image magnification relative to the shift amount of the focus lens is a first amount of change, which is greater than a second amount of change, (b) so as to shift the vibration center of the focus lens in the first direction in a second mode if the amount of change in image magnification relative to the shift amount of the focus lens is the second amount of change, and (c) so as to restrict shifting the vibration center of the focus lens in the first direction if the amount of change in image magnification relative to the shift amount of the focus lens is greater than the first amount of change, and wherein, in the first mode, the shift amount of the focus lens becomes less than the predetermined amplitude when the focus lens shifts in a direction opposite to the first direction, and, in the second mode, the shift amount of the focus lens becomes greater than the predetermined amplitude when the focus lens shifts in a direction corresponding to the first direction.

22. A non-transitory storage medium on which is stored a computer program comprising computer executable instructions which are arranged so that upon execution by a computer they cause an imaging apparatus to perform a method according to claim 19, or they cause a lens apparatus to perform the method according to claim 21.

23. An imaging system comprising an imaging apparatus as claimed in claim 1 and a lens apparatus as claimed in claim 9.

* * * * *